United States Patent
Mochizuki et al.

(10) Patent No.: US 10,412,712 B2
(45) Date of Patent: *Sep. 10, 2019

(54) COMMUNICATION SYSTEM, BASE STATION, AND COMMUNICATION TERMINAL

(71) Applicant: Mitsubishi Electric Corporation, Chiyoda-ku (JP)

(72) Inventors: Mitsuru Mochizuki, Tokyo (JP); Miho Maeda, Tokyo (JP); Yasushi Iwane, Tokyo (JP); Takayuki Nonami, Tokyo (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/230,486

(22) Filed: Dec. 21, 2018

(65) Prior Publication Data

US 2019/0116580 A1     Apr. 18, 2019

Related U.S. Application Data

(60) Continuation of application No. 15/956,384, filed on Apr. 18, 2018, now Pat. No. 10,200,976, which is a
(Continued)

(30) Foreign Application Priority Data

Jan. 7, 2011   (JP) ................. 2011-001684

(51) Int. Cl.
  *H04W 72/04*   (2009.01)
  *H04L 5/00*   (2006.01)

(52) U.S. Cl.
  CPC ............ *H04W 72/04* (2013.01); *H04L 5/003* (2013.01); *H04W 72/042* (2013.01); *H04L 5/001* (2013.01); *H04L 5/0053* (2013.01)

(58) Field of Classification Search
  CPC .... H04W 72/04; H04W 72/042; H04L 5/003; H04L 5/001; H04L 5/0053
  See application file for complete search history.

(56) References Cited

U.S. PATENT DOCUMENTS 8,498,649 B2   7/2013   Seo et al.
9,001,793 B2   4/2015   Takano
(Continued)

FOREIGN PATENT DOCUMENTS

JP   2009-542042 A   11/2009
JP   2012-99875 A    5/2012
(Continued)

OTHER PUBLICATIONS

International Search Report dated Mar. 27, 2012 in PCT/JP2011/079484.
(Continued)

*Primary Examiner* — Brandon J Miller
(74) *Attorney, Agent, or Firm* — Oblon, McClelland, Maier & Neustadt, L.L.P.

(57) ABSTRACT

A cell2 configured by only a DL CC2 being a resource for downlink is configured. The cell2 does not include a resource for uplink, that is, a UL CC to be associated with the DL CC2 by a DL/UL link. The link information indicating the above is notified a communication terminal device by a base station device using the DL CC2. A DL CC1 and a UL CC1 constitute a cell1. The downlink communication from the base station device to the communication terminal device is performed using the cell1 and the cell2, and the uplink communication from the communication terminal device to the base station device is performed using the cell1.

3 Claims, 36 Drawing Sheets

Related U.S. Application Data division of application No. 15/163,216, filed on May 24, 2016, now Pat. No. 9,980,251, which is a division of application No. 13/978,622, filed as application No. PCT/JP2011/079484 on Dec. 20, 2011, now Pat. No. 9,380,563.

(56) References Cited

U.S. PATENT DOCUMENTS

| | | | |
|---|---|---|---|
| 9,209,933 | B2 | 12/2015 | Damnjanovic et al. |
| 9,380,563 | B2* | 6/2016 | Mochizuki ............ H04W 72/04 |
| 9,980,251 | B2* | 5/2018 | Mochizuki ............ H04W 72/04 |
| 2002/0196841 | A1 | 12/2002 | Karna |
| 2007/0265016 | A1 | 11/2007 | Kahtava et al. |
| 2009/0253422 | A1 | 10/2009 | Fischer |
| 2010/0216454 | A1 | 8/2010 | Ishida |
| 2010/0248767 | A1 | 9/2010 | Kim et al. |
| 2010/0303045 | A1 | 12/2010 | Venkob et al. |
| 2010/0322173 | A1 | 12/2010 | Marinier et al. |
| 2011/0098074 | A1 | 4/2011 | Seo et al. |
| 2011/0103221 | A1 | 5/2011 | Lee et al. |
| 2011/0103321 | A1 | 5/2011 | Nishio et al. |
| 2011/0141926 | A1 | 6/2011 | Damnjanovic et al. |
| 2011/0164549 | A1 | 7/2011 | Huang et al. |
| 2011/0255469 | A1 | 10/2011 | Kishiyama et al. |
| 2011/0275379 | A1 | 11/2011 | Hakola et al. |
| 2012/0014369 | A1 | 1/2012 | Venkob et al. |
| 2012/0176927 | A1 | 7/2012 | Takano |
| 2013/0265963 | A1 | 10/2013 | Suzuki et al. |
| 2016/0087778 | A1 | 3/2016 | Damnjanovic et al. |

FOREIGN PATENT DOCUMENTS

| | | |
|---|---|---|
| WO | WO 2007/132329 A2 | 11/2007 |
| WO | WO 2009/100533 A1 | 8/2009 |
| WO | WO 2010/032811 A1 | 3/2010 |
| WO | WO 2010/032850 A1 | 3/2010 |
| WO | WO 2010/050770 A2 | 5/2010 |
| WO | WO 2010/144875 A2 | 12/2010 |
| WO | WO 2011/024400 A1 | 3/2011 |
| WO | WO 2012/063754 A1 | 5/2012 |

OTHER PUBLICATIONS

International Preliminary Report on Patentability and Written Opinion of the International Searching Authority with English translation dated Jul. 18, 2013 in PCT/JP2011/079484.

3GPP TS 36.300 V10.1.0, 3rd Generations Partnership Project; Technical Specification Group Radio Access Network; Evolved Universal Terrestrial Radio Access (E-UTRA) and Evolved Universal Terrestrial Radio Access Network (E-UTRA); Overall description Stage 2 (Release 10), LTE, pp. 1-192. (Aug. 2010).

3GPP TS 36.331 V9.4.0, $3^{rd}$ Generation Partnership Project; Technical Specification Group Radio Access, Network; Evolved Universal Terrestrial Radio Access (E-UTRA); Radio Resource Control (RRC); Protocol specification (Release 9), LTE, pp. 1-252, (Sep. 2010).

3GPP TS 36.304 V9.4.0, $3^{rd}$ Generation Partnership Project; Technical Specification Group Radio Access Network; Evolved Universal Terrestrial Radio Access (E-UTRA); User Equipment (UE) procedures in idle mode (Release 9), LTE, pp. 1-32, (Sep. 2010).

3GPP TSG-SA1 #42 S1-083461, LS on HBN/HeNB Open Access Mode, 3GPP SA WG1, Total 2 Pages, (Oct. 13-17, 2008).

3GPP TSG-RAN WG 2 meeting #62 R2-082899, "LS on CSG cell identification," RAN2, pp. 1-2, (May 5-9, 2008).

3GPP TR 36.814 V9.0.0, $3^{rd}$ Generation Partnership Project; Technical Specification Group Radio Access Network; Evolved Universal Terrestrial Radio Access (E-UTRA); Further advancements fo E-UTRA physical layer aspects (Release 9), LTE Advanced, pp. 1-107, (Mar. 2010).

3GPP TR 36.912 V9.3.0, $3^{rd}$ Generation Partnership Project; Technical Specification Group Radio Access Network; Feasibility study for Further Advancements for E-UTRA (LTE-Advanced) (Release 9), Total 262 Pages, (Jun. 2010).

3GPP TS 36.101 V10.0.0. $3^{rd}$ Generation Partnership Project; Technical Specification Group Radio Access Network; Evolved Universal Terrestrial Radio Access (E-UTRA); User Equipment (UE) radio transmission and reception (Release 10), pp. 1-188, (Oct. 2010).

3GPP TSG RAN WG2 #71 R2-104480, "Confirmation of Cell configuration set based on SIB2 linking in CA", Panasonic, Total 6 Pages, (Aug. 23-27, 2010).

3GPP TR 36.815 V9.1.0, "$3^{rd}$ Generation Partnership Project; Technical Specification Group Radio Access Network; Further advancements for E-UTRA; LTE-Advanced feasibility studies in RAN WG4 (Release 9)", LTE Advanced, pp. 1-29, (Jun. 2010).

3GPP TSG-RAN WG2 #69bis R2-102260, "Undirectional PCC & SCC change.", Samsung Electronics, Apr. 12-16, 2010, Total 2 Pages.

Radio Policy Division, Ministry of Internal Affairs and Communications, "Efforts to realize the use of white space", 21 Meeting papers of broadcast system Committee, URL:http://www.soumu.go.jp/main)content/000087579.pdf, Total 23 Pages, (Oct. 29, 2010).

Japanese Office Action dated Dec. 1, 2015 in Patent Application No. 2012-551814 (with English Translation).

Qualcomm Incorporated, "UE Specific linking of UL and DL PCC" [online], 3GPP TSG-RAN WG2#70 R2-103074, URL: http://www.3gpp.org/ftp/tsg_ran/WG2_RL2/TSGR2_70/Docs/R2-103074.zip, May 14, 2010, 7 pages.

Japanese Office Action dated Jun. 6, 2017 in Patent Application No. 2016-145988 (with partial English translation).

"DL-UL CC linking in CA" Huawei, 3GPP TSG-RAN WG2 #69 Tdoc R2-101019, Internet URL:http://www.3gpp.org/ftp/tsg_ran/WG2_RL2/TSGR2_69/Docs/R2-101019.zip, Feb. 26, 2010, pp. 1-5.

Extended European Search Report dated Jul. 19, 2017 in Patent Application No. 11854929.4.

"DL/UL Asymmetric Carrier Aggregation" 3GPP TSG-RAN-WG1 Meeting #54bis, Huawei, R1-083706, XP050317048, Oct. 2008, 4 pages.

Japanese Office Action dated Dec. 19, 2017 in Japanese Patent Application No. 2016-145988 (with unedited computer generated English translation).

Office Action dated Jun. 28, 2018 in corresponding European Patent Application No. 11 854 929.4, 6 pages.

Office Action dated Feb. 27, 2019 in European Patent Application No. 11 854 929.4, 9 pages. (The reference(s) cited therein were previously filed.).

* cited by examiner

F I G. 1
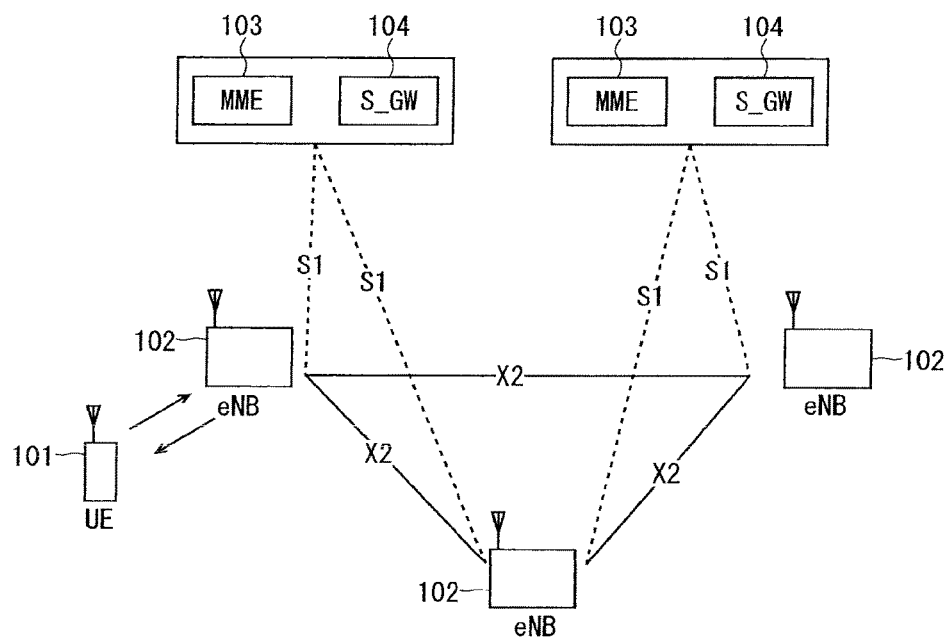
F I G. 2
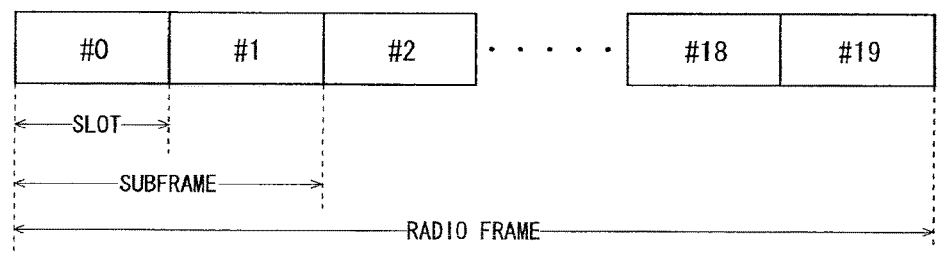

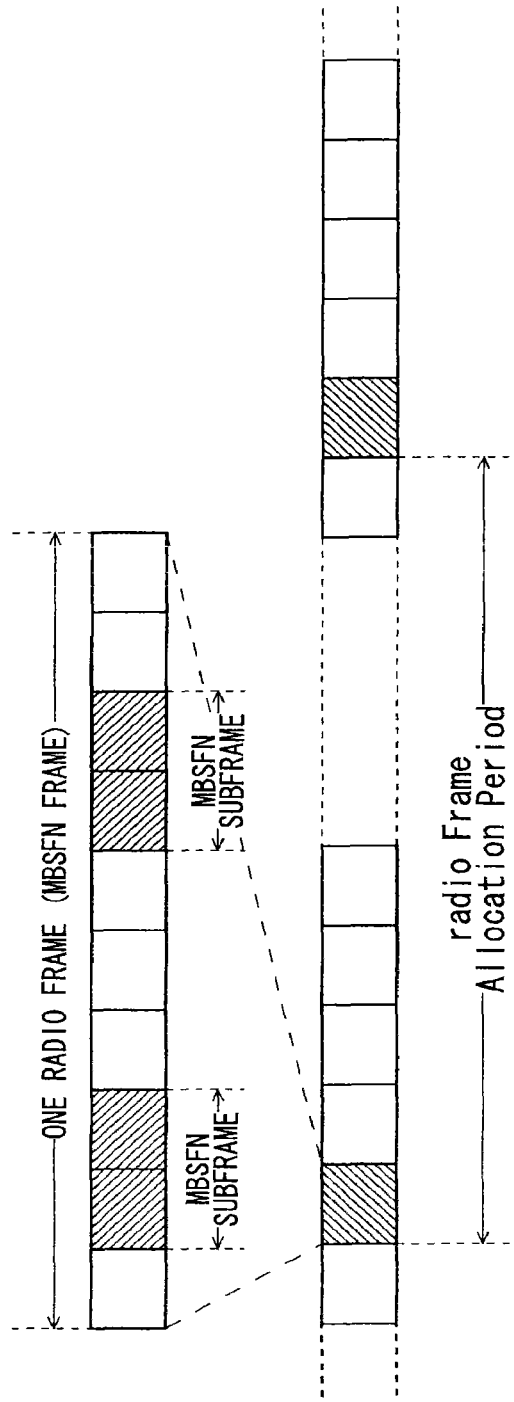

F I G. 4
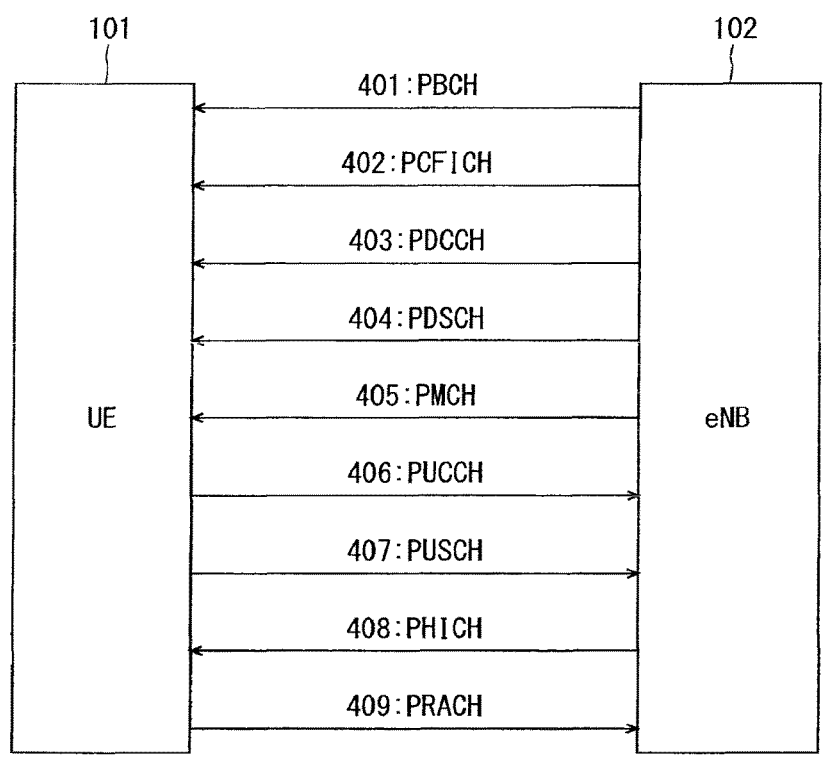

F I G. 5
(A)
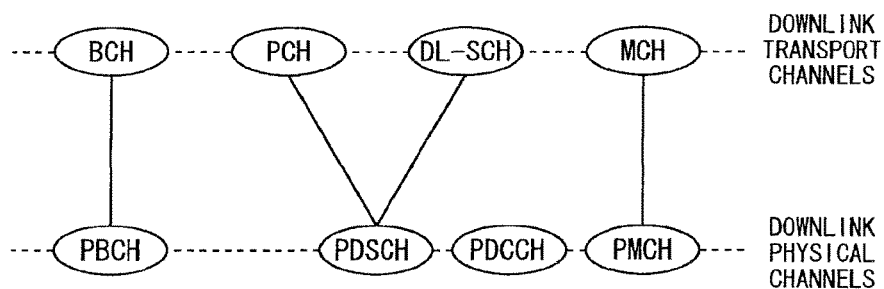
(B)
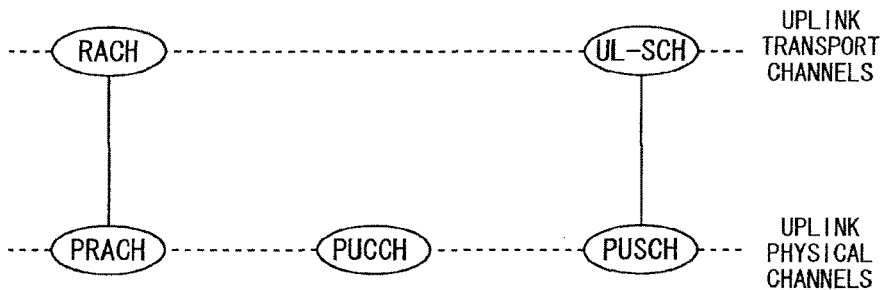

F I G. 6
(A)
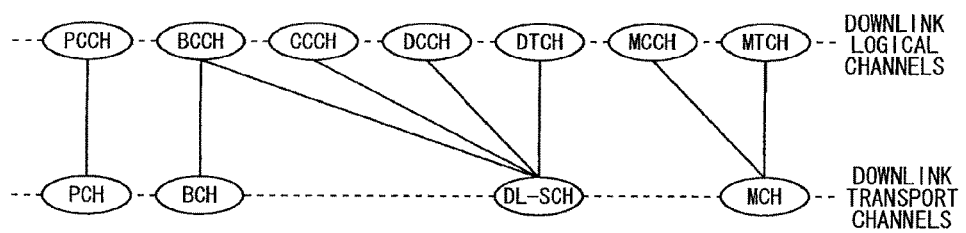
(B)
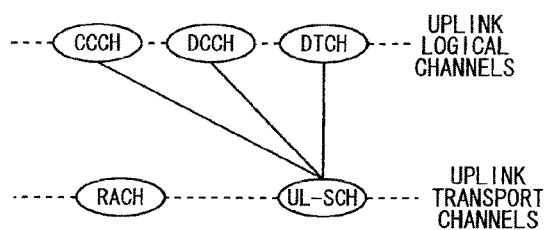

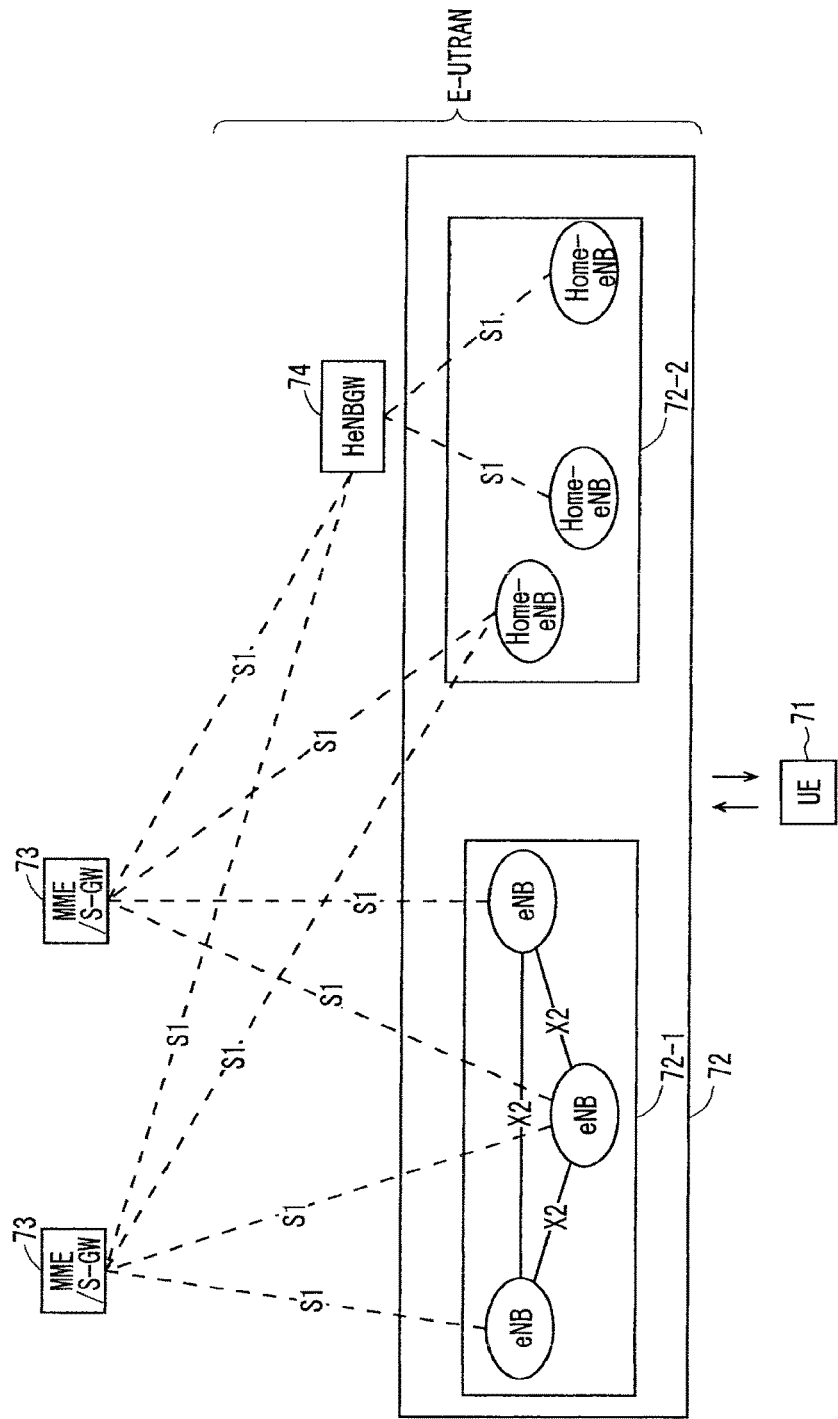
F I G. 7

F I G . 1 2
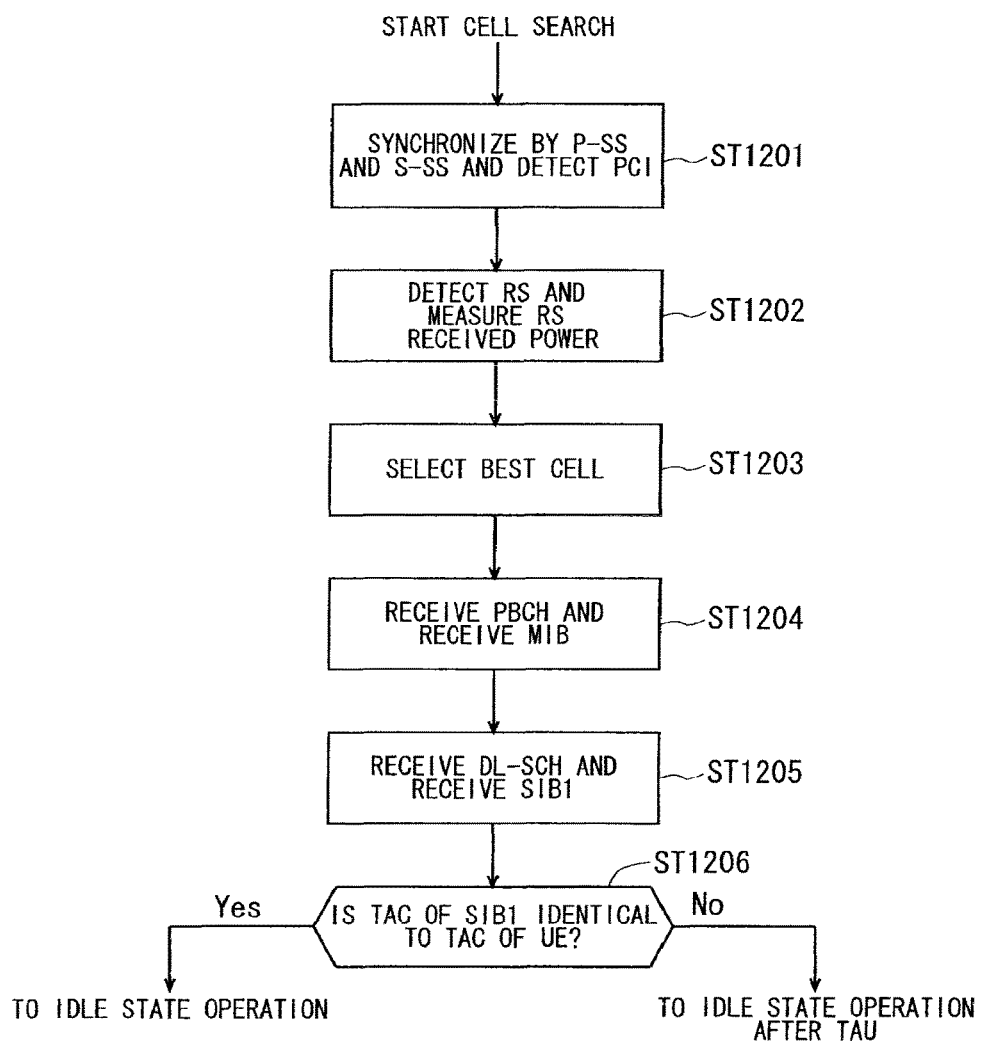

F I G. 1 3
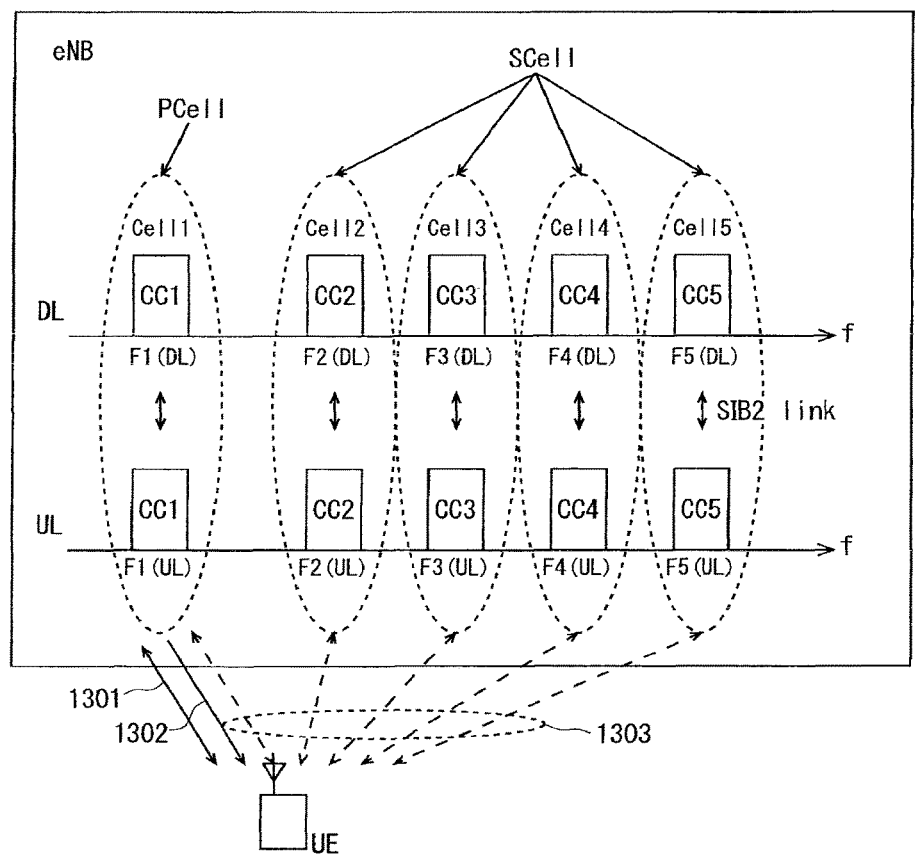

F I G . 1 4
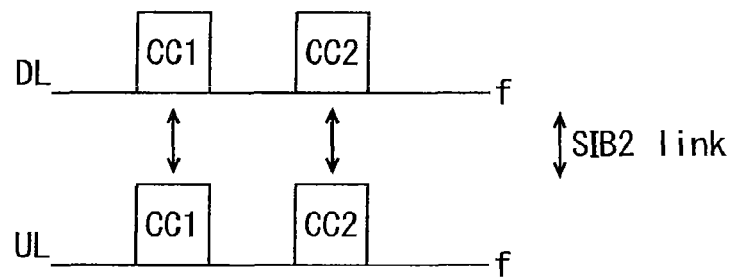
F I G . 1 5
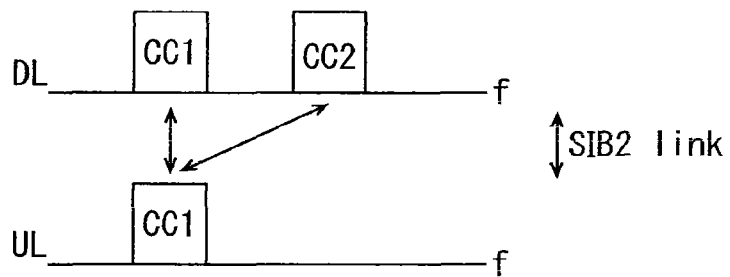
F I G . 1 6
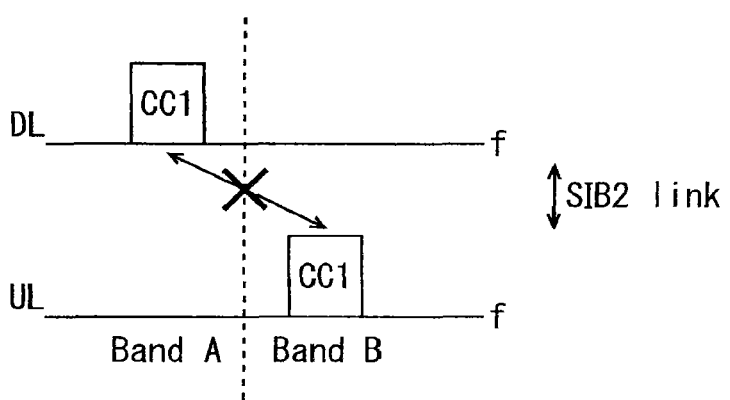

F I G. 1 7
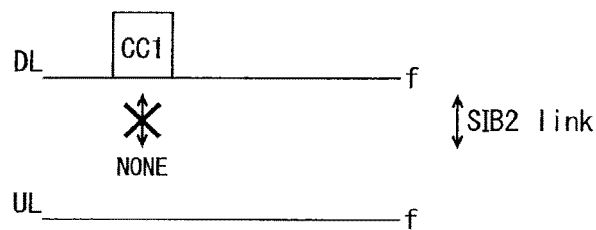
F I G. 1 8
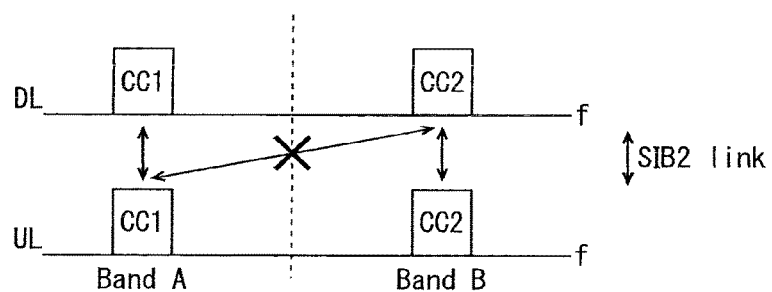
F I G. 1 9
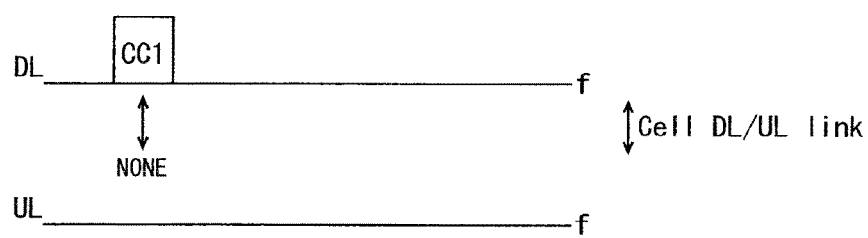

F I G . 2 1
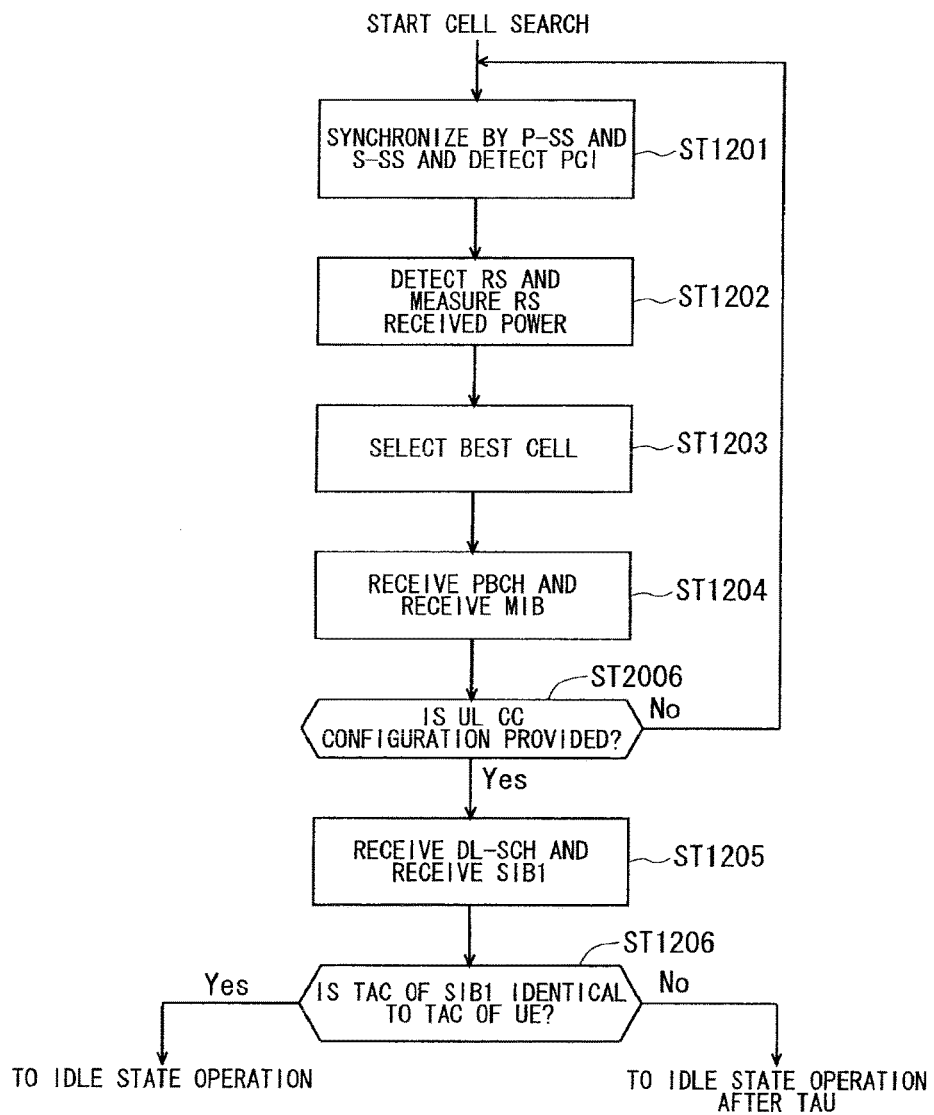

F I G . 2 2
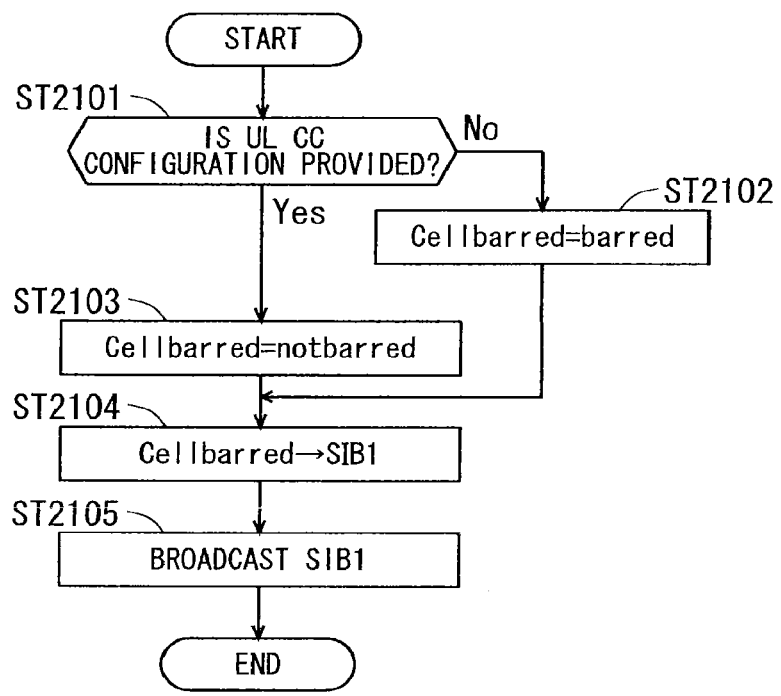

F I G . 2 3
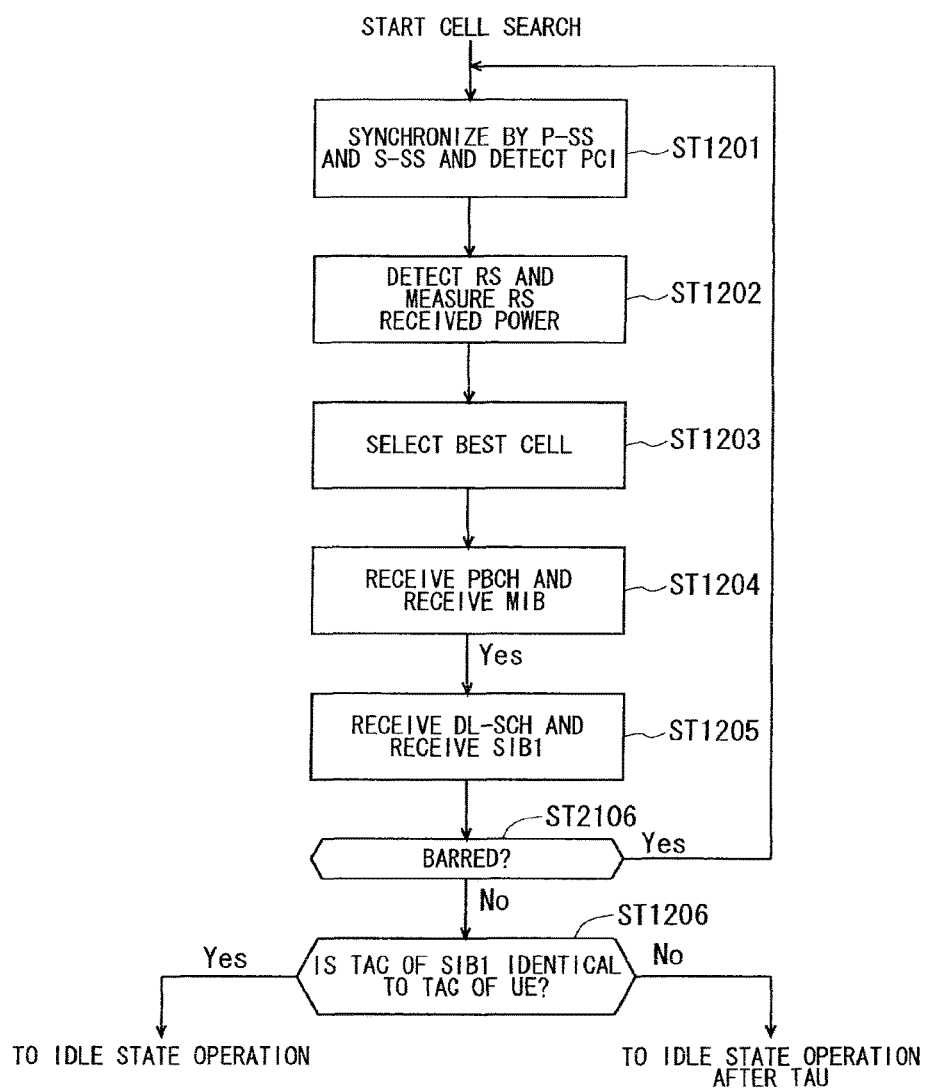

F I G . 2 6
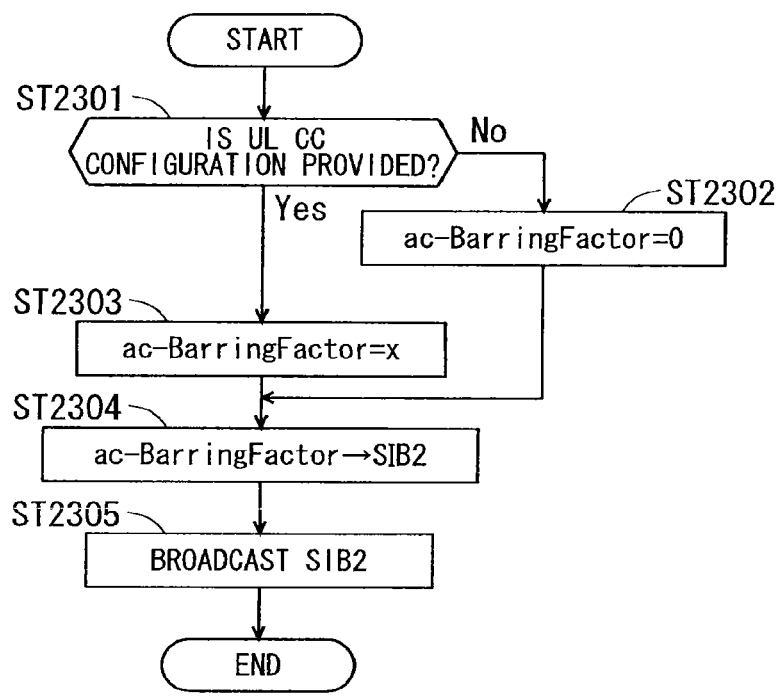

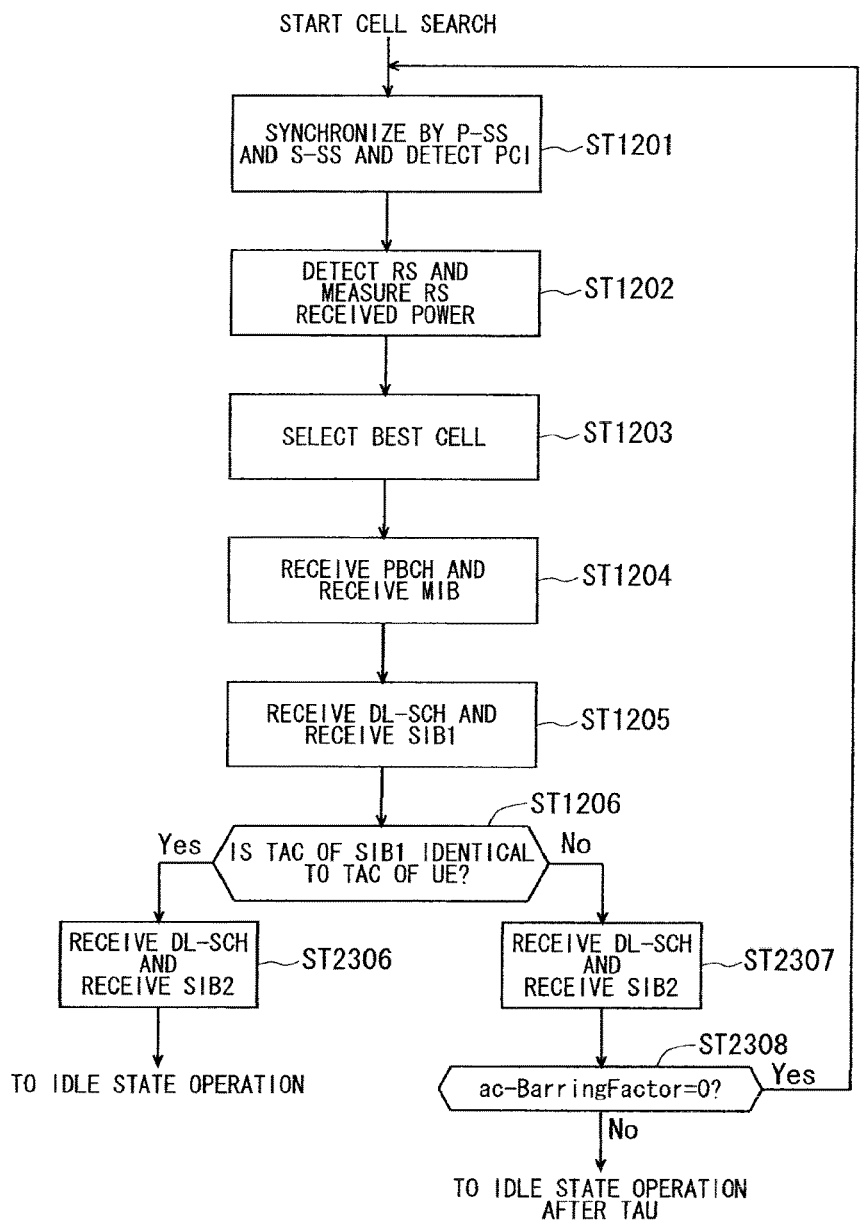

F I G . 2 8
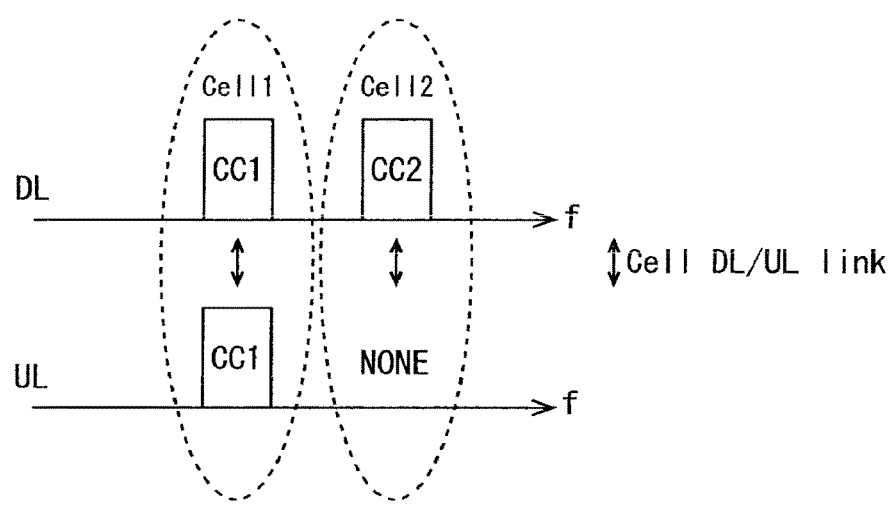

F I G. 3 1
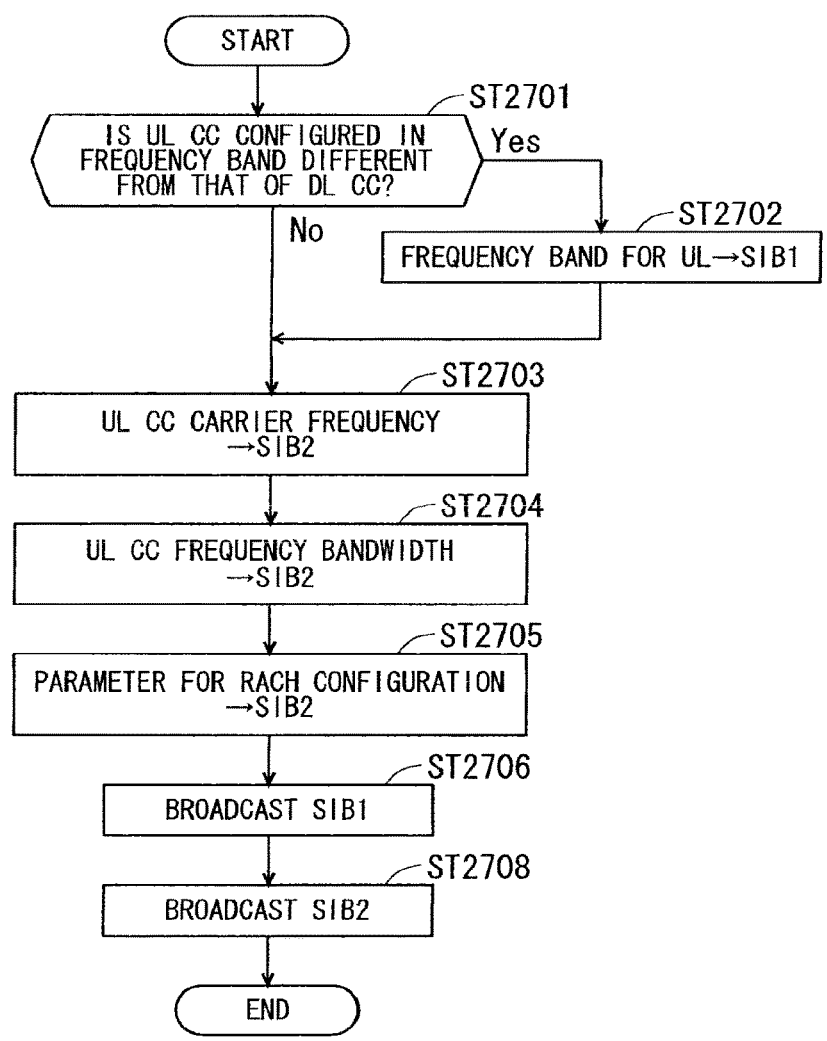

F I G. 3 5
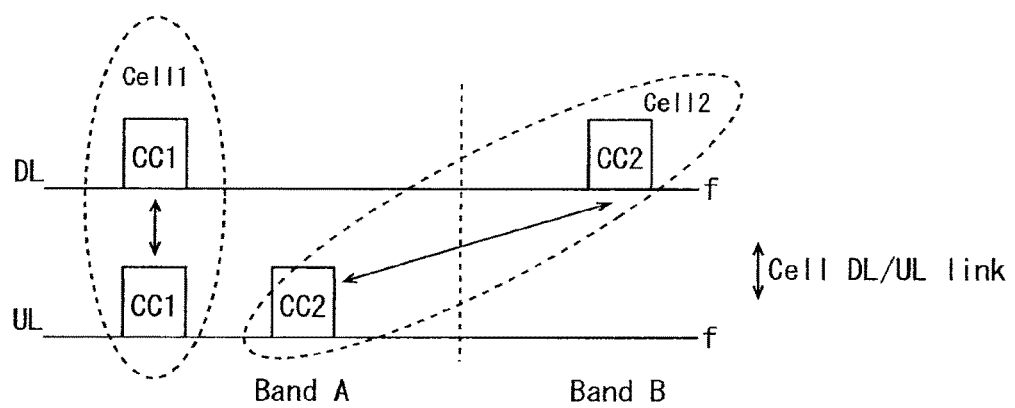

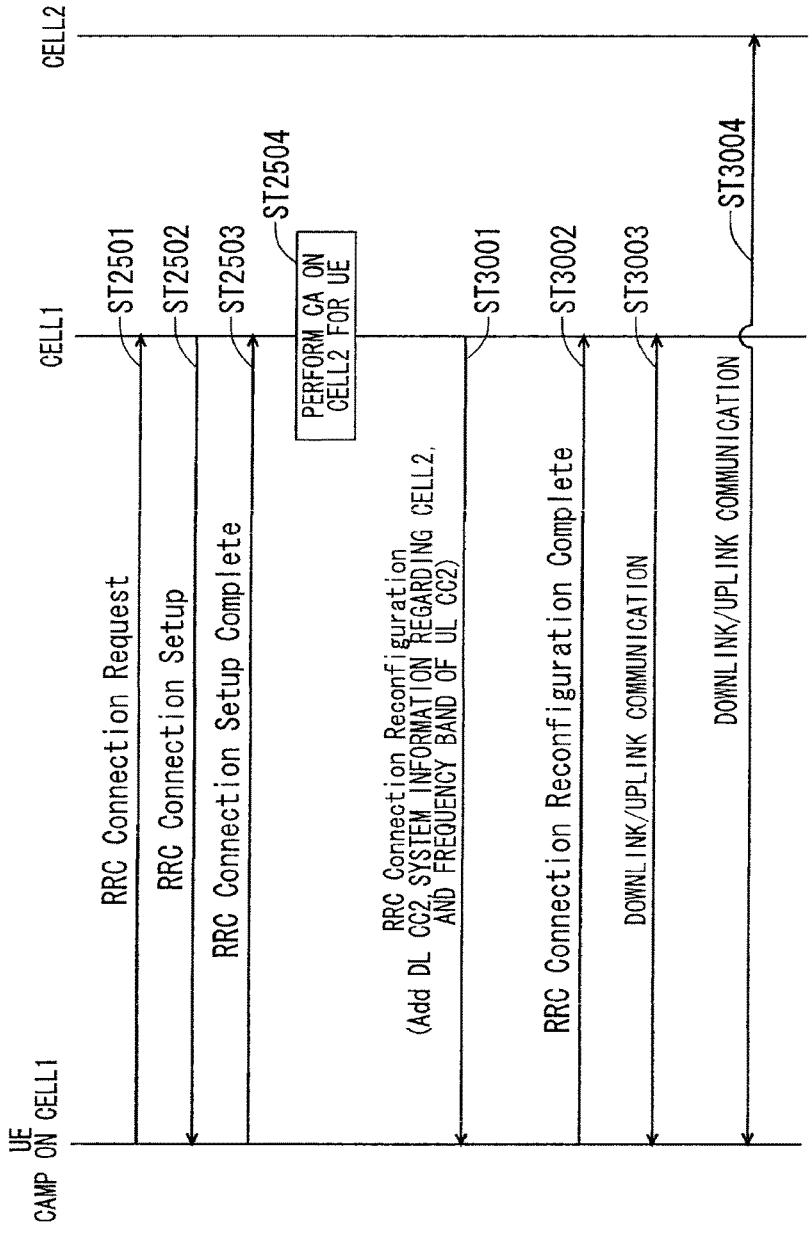

F I G . 3 7
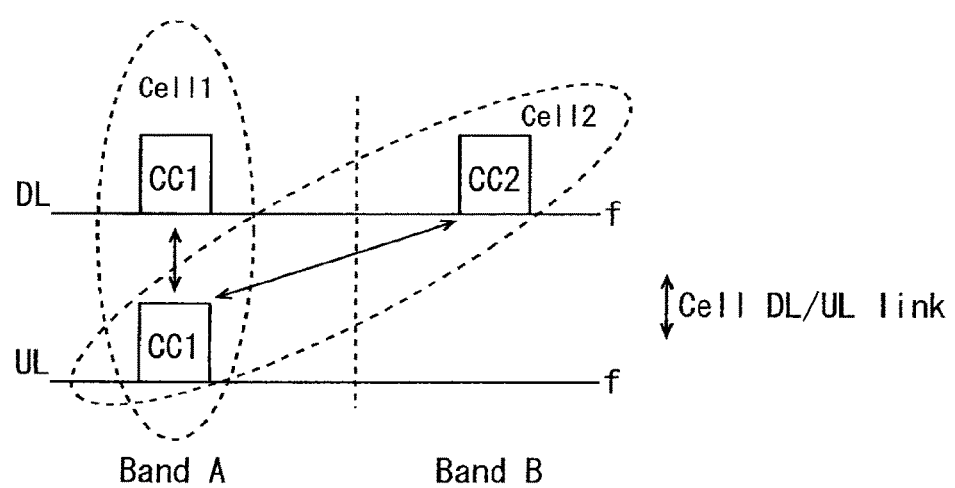

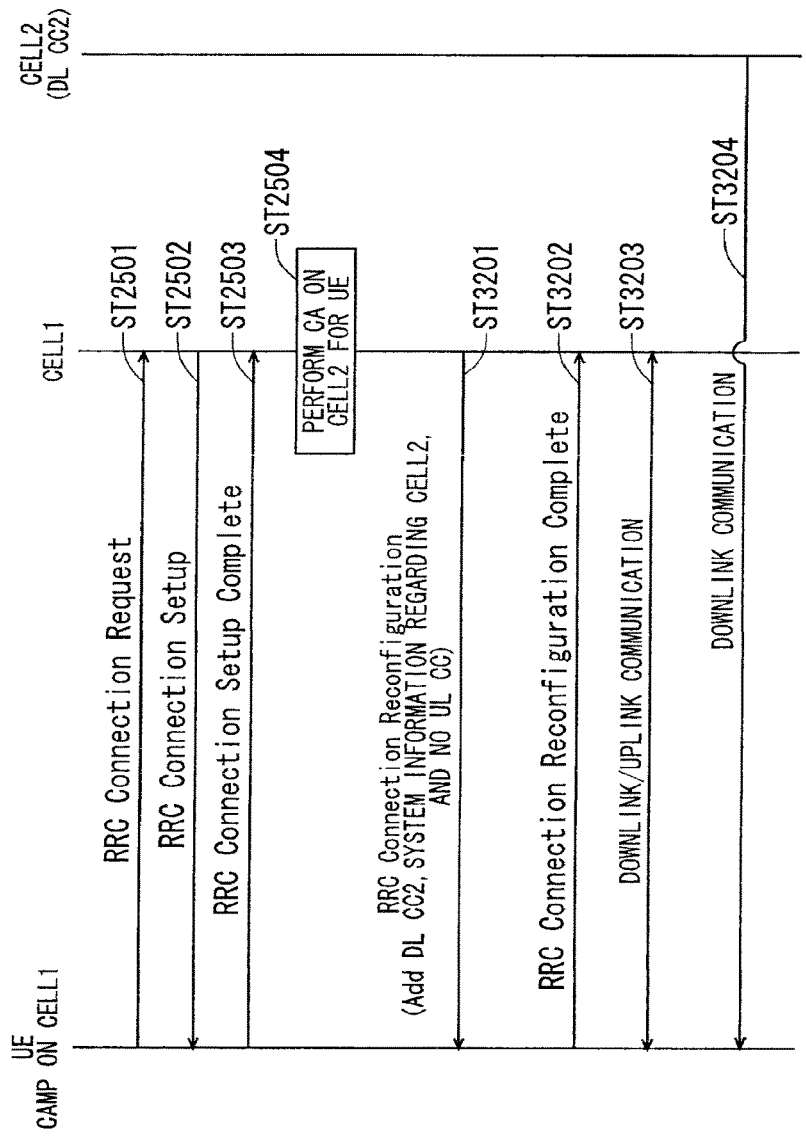

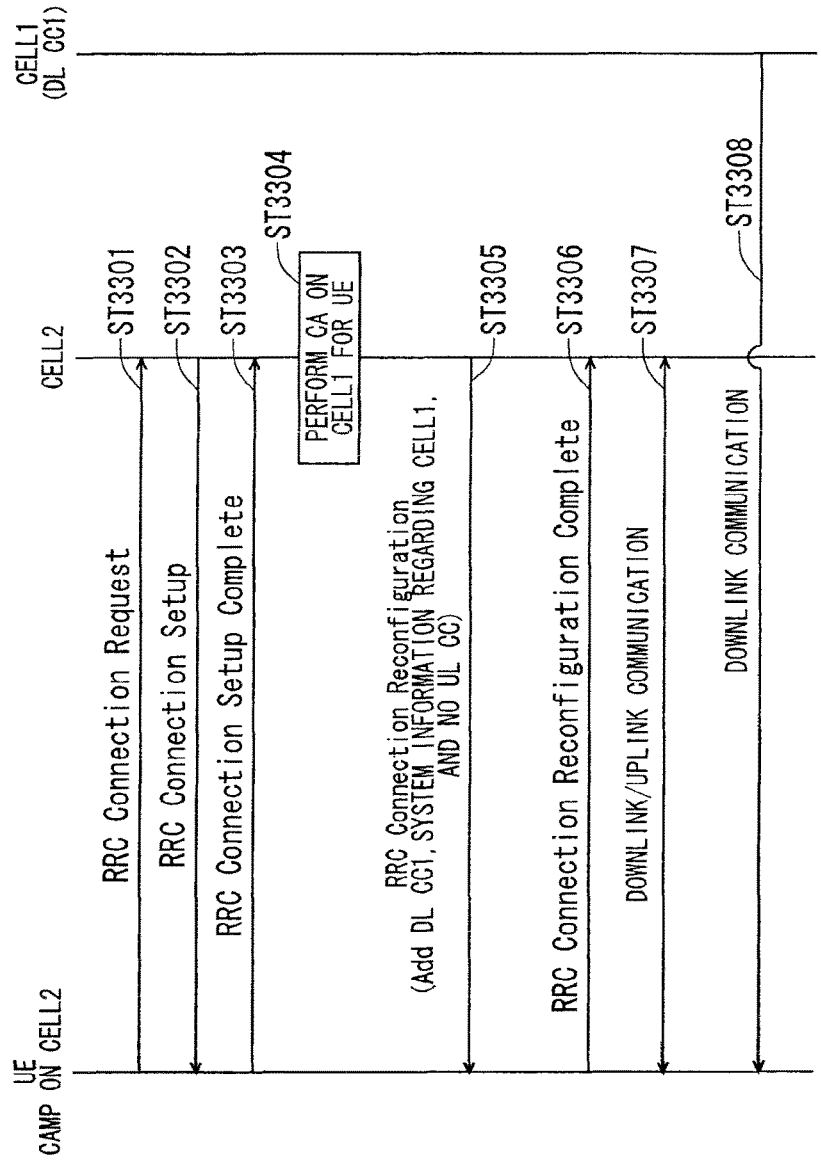

F I G . 4 0
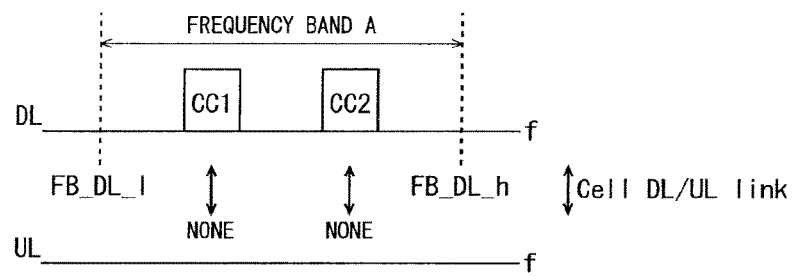
F I G . 4 1
| Band | Uplink (UL) operating Band | | Downlink (DL) operating Band | | Duplex Mode |
|---|---|---|---|---|---|
| | $F_{UL\_low}$ | $F_{UL\_high}$ | $F_{DL\_low}$ | $F_{DL\_high}$ | |
| A | — | | FB_DL_l | FB_DL_h | FDD |
F I G . 4 2
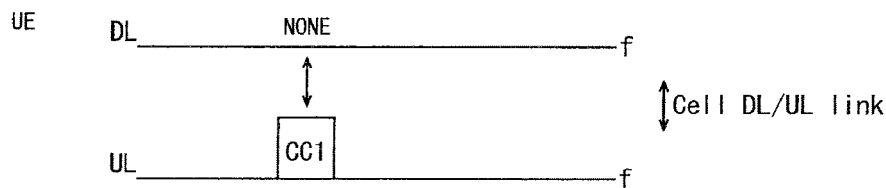

F I G . 4 3
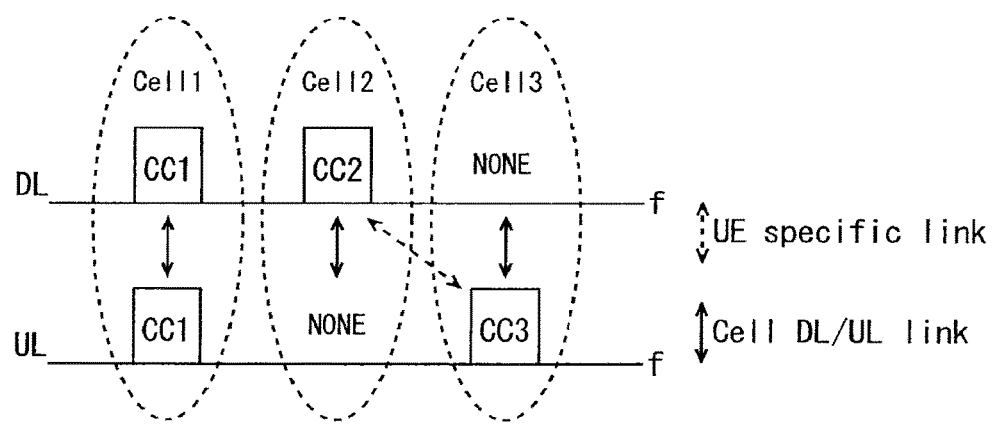

| Band | Uplink (UL) operating Band | | Downlink (DL) operating Band | | Duplex Mode |
|---|---|---|---|---|---|
| | $F_{UL\_low}$ | — $F_{UL\_high}$ | $F_{DL\_low}$ | — $F_{DL\_high}$ | |
| B | FB_UL_l | — FB_UL_h | — | | FDD |

COMMUNICATION SYSTEM, BASE STATION, AND COMMUNICATION TERMINAL

CROSS REFERENCE TO RELATED APPLICATIONS

This application is a continuation of U.S. application Ser. No. 15/956,384 filed Apr. 18, 2018, which is a divisional of U.S. application Ser. No. 15/163,216 filed May 24, 2016, which is a divisional of U.S. application Ser. No. 13/978,622 filed Jul. 8, 2013, which is a National Phase of PCT/JP2011/079484 filed Dec. 20, 2011, and claims priority to Japanese Patent Application No. 2011-001684 filed Jan. 7, 2011. The entire contents of each of which are incorporated herein by reference.

TECHNICAL FIELD

The present invention relates to a base station device that performs radio communication with a plurality of communication terminal devices and a communication system including the same.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 8 version are produced.

Further, new communication systems referred to as long term evolution (LTE) regarding radio areas and system architecture evolution (SAE) regarding the overall system configuration including a core network (merely referred to as network as well) as communication systems independent of W-CDMA is studied in 3GPP. This communication system is also referred to as 3.9 generation (3.9 G).

In the LTE, an access scheme, a radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz per base station. Further, differently from the W-CDMA, circuit switching is not provided but a packet communication system is only provided in the LTE.

The LTE is defined as a radio access network independent of the W-CDMA network because its communication system is configured by a new core network different from a core network (general packet radio service: GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC) or access gateway (aGW), respectively, in the LTE communication system.

Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of user equipments. This is also referred to as point to multipoint service.

Non-Patent Document 1 (Chapter 4) describes the current decisions by 3GPP regarding an overall architecture in the LTE system. The overall architecture is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol for a user equipment 101 such as a radio resource control (RRC) and user planes such as a packet data convergence protocol (PDCP), radio link control (RLC), medium access control (MAC) and physical layer (PHY) are terminated in the base station 102.

The base stations 102 perform scheduling and transmission of paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC, which performs per-user packet filtering and UE-ID address allocation.

The control protocol RRC between the user equipment 101 and the base station 102 performs broadcast, paging, RRC connection management and the like. The states of the base station and the user equipment in RRC are classified into RRC_IDLE and RRC_CONNECTED. In RRC_IDLE, public land mobile network (PLMN) selection, system information (SI) broadcast, paging, cell reselection, mobility and the like are performed. In RRC_CONNECTED, the user equipment has RRC connection, is capable of transmitting/receiving data to/from a network, and performs, for example, handover (HO) and measurement of a neighbor cell.

The current decisions by 3GPP regarding the frame configuration in the LTE system described in Non-Patent Document 1 (Chapter 5) are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is a simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. With reference to FIG. 3, a radio frame including the MBSFN subframes is allocated per radio frame allocation period. The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$\text{SFN mod radioFrameAllocationPeriod} = \text{radioFrameAllocationOffset} \quad (1)$$

The MBSFN subframe is allocated with six bits. The leftmost bit defines the MBSFN allocation for the second subframe (#1). The second bit, third bit, fourth bit, fifth bit, and sixth-bit define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the current decisions by 3GPP regarding the channel configuration in the LTE system. It is assumed that the same channel configuration is used in a closed subscriber group cell (CSG cell) as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a downlink channel transmitted from the base station 102 to the user equipment 101. A BCH transport block is mapped to four subframes within a 40 ms interval. There is no explicit signaling indicating 40 ms timing. A physical control format indicator channel (PCFICH) 402 is transmitted from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a downlink channel transmitted from the base station 102 to the user equipment 101. The PDCCH notifies the resource allocation of DL-SCH ((downlink shared channel that is one of the transport channels shown in FIG. 5 described below) and PCH (paging channel that is one of the transport channels shown in FIG. 5), and HARQ information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a downlink channel transmitted from the base station 102 to the user equipment 101. A DL-SCH (downlink shared channel) that is a transport channel and a PCH that is a transport channel are mapped to the PDSCH. A physical multicast channel (PMCH) 405 is a downlink channel transmitted from the base station 102 to the user equipment 101. A multicast channel (MCH) that is a transport channel is mapped to the PMCH.

A physical uplink control channel (PUCCH) 406 is an uplink channel transmitted from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the user equipment 101 to the base station 102. A UL-SCH (uplink shared channel that is one of the transport channels shown in FIG. 5) is mapped to the PUSCH.

A physical hybrid ARQ indicator channel (PHICH) 408 is a downlink channel transmitted from the base station 102 to the user equipment 101. The PHICH carries Ack/Nack that is a response to uplink transmission. A physical random access channel (PRACH) 409 is an uplink channel transmitted from the user equipment 101 to the base station 102. The PRACH carries a random access preamble.

A downlink reference signal is a known symbol in a mobile communication system. The physical layer measurement objects of a user equipment include reference symbol received power (RSRP).

The transport channels described in Non-Patent Document 1 (Chapter 5) are described with reference to FIG. 5. FIG. 5 is a diagram illustrating transport channels used in the LTE communication system. Part (A) of FIG. 5 shows mapping between a downlink transport channel and a downlink physical channel. Part (B) of FIG. 5 shows mapping between an uplink transport channel and an uplink physical channel.

A broadcast channel (BCH) is broadcast to the entire coverage of a base station (cell) regarding the downlink transport channel. The BCH is mapped to the physical broadcast channel (PBCH).

Retransmission control according to a hybrid ARQ (HARQ) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH).

A random access channel (RACH) shown in part (B) of FIG. 5 is limited to control information. The RACH involves a collision risk. The RACH is mapped to the physical random access channel (PRACH).

The HARQ is described. The HARQ is the technique for improving the communication quality of a channel by combination of automatic repeat request and error correction (forward error correction). The HARQ has an advantage that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data is transmitted in the first transmission and retransmission, which is the system for improving gains by combining the data of the first transmission and the data of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel described in Non-Patent Document 1 (Chapter 6) is described with reference to FIG. 6. FIG. 6 is a diagram illustrating logical channels used in an LTE communication system. Part (A) of FIG. 6 shows mapping between a downlink logical channel and a downlink transport channel. Part (B) of FIG. 6 shows mapping between an uplink logical channel and an uplink transport channel.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting changes of the paging information and system information. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel for point-to-point transmission of the dedicated control information between a user equipment and a network. The DCCH is used when a user equipment is in RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of the user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

GCI represents a global cell identity. A closed subscriber group cell (CSG cell) is introduced in the LTE, long term evolution advanced (LTE-A) described below, and universal mobile telecommunication system (UMTS). The CSG is described below (see Chapter 3.1 of Non-Patent Document 3). The closed subscriber group (CSG) cell is a cell in which subscribers who are allowed to use are specified by an operator (hereinafter, referred to as "cell for specific subscribers" in some cases).

The specified subscribers are allowed to access one or more cells of a public land mobile network (PLMN). One or more cells in which the specified subscribers are allowed access are referred to as "CSG cell(s)". Note that access is limited in the PLMN. The CSG cell is part of the PLMN that broadcasts a specific CSG identity (CSG ID; CSG-ID) and broadcasts "TRUE" by CSG indication. The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier.

The locations of user equipments are tracked based on an area composed of one or more cells. The locations are tracked for enabling tracking of the locations of user equipments and calling (calling of user equipments) even in an idle state. An area for tracing locations of user equipments is referred to as a tracking area.

A CSG whitelist is a list that may be stored in a universal subscriber identity module (USIM) in which all CSG IDs of the CSG cells to which the subscribers belong are recorded. The CSG whitelist is also referred to as an allowed CSG list in some cases.

Service types of a user equipment in an idle state are described below (see Chapter 4.3 of Non-Patent Document 3). The service types of a user equipment in an idle state are classified into limited service (also referred to as closed service), a normal service, and an operator service. The limited service includes emergency calls, an earthquake and tsunami warning system (ETWS), and a commercial mobile alert system (CMAS) on an acceptable cell described below. The normal service (also referred to as standard service) is the service for public use on a suitable cell described below. The operator service is the service for operators only on a reserved cell described below.

A "suitable cell" is described below. The "suitable cell" is a cell on which a UE may camp to obtain normal service. Such a cell shall fulfill the following conditions (1) and (2).

(1) The cell is part of the selected PLMN or the registered PLMN, or part of the PLMN of an "equivalent PLMN list".

(2) According to the latest information provided by a non-access stratum (NAS), the cell shall further fulfill the following conditions (a) to (d):

(a) the cell is not a barred cell;

(b) the cell is part of a tracking area (TA), not part of the list of "forbidden LAs for roaming", where the cell needs to fulfill (1) above;

(c) the cell shall fulfill the cell selection criteria; and (d) for a cell specified as CSG cell by system information (SI), the CSG-ID is part of a "CSG whitelist" of the UE (contained in the CSG whitelist of the UE).

An "acceptable cell" is described below. This is the cell on which a UE may camp to obtain limited service. Such a cell shall fulfill the all following requirements.

(1) The cell is not a barred cell. (2) The cell fulfills the cell selection criteria.

"Barred cell" is shown in the system information. "Reserved cell" is shown in the system information.

"Camping on a cell" represents the state where a UE has completed the cell selection/reselection process and the UE has selected a cell for monitoring the system information and paging information.

Base stations referred to as Home-NodeB (Home-NB; HNB) and Home-eNodeB (Home-eNB; HeNB) are studied in 3GPP. HNB/HeNB is a base station for, for example, household, corporation or commercial access service in UTRAN/E-UTRAN. Non-Patent Document 4 discloses three different modes of the access to the HeNB and HNB. Specifically, those are an open access mode, a closed access mode and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, non-CSG members are allowed access at the same time. In other words, a cell in the hybrid access mode (also referred to as hybrid cell) is the cell that supports both the open access mode and the closed access mode.

In 3GPP, there is a range of PCIs in all physical cell identities (PCIs), which is reserved by the network for use by CSG cells (see Chapter 10.5.1.1 of Non-Patent Document 1). Splitting the range of PCIs is referred to PCI-split as times. The PCI split information is broadcast in the system information from the base station to the user equipments being served thereby. Non-Patent Document 5 discloses the basic operation of a user equipment using PCI split. The user equipment that does not have the PCI split information needs to perform cell search using all PCIs (for example, using all 504 codes). On the other hand, the user equipment that has the PCI split information is capable of performing cell search using the PCI split information.

Further, specifications standard of long term evolution advanced (LTE-A) as Release 10 are pursued in 3GPP (see Non-Patent Document 6 and Non-Patent Document 7).

As to the LTE-A system, it is studied that a relay (relay node (RN)) is supported for achieving a high data rate, high cell-edge throughput, new coverage area, and the like. The relay node is wirelessly connected to the radio-access network via a donor cell (Donor eNB; DeNB). The network (NW)-to-relay node link shares the same frequency band with the network-to-UE link within the range of the donor cell. In this case, the UE in Release 8 can also be connected to the donor cell. The link between a donor cell and a relay node is referred to as a backhaul link, and the link between the relay node and the UE is referred to as an access link.

As multiplexing of a backhaul link in frequency division duplex (FDD), the transmission from DeNB to RN is carried out in a downlink (DL) frequency band, and the transmission from RN to DeNB is carried out in an uplink (UL) frequency band. As multiplexing of resources in relays, a link from DeNB to RN and a link from RN to UE are time-division multiplexed in one frequency band, and a link from RN to DeNB and a link from UE to RN are also time-division multiplexed in one frequency band. This enables to prevent, in a relay, the transmission of the relay from interfering with the reception of the own relay.

Not only a normal eNB (macro cell) but also so-called local nodes such as pico eNB (pico cell), HeNB/HNB/CSG cell, node for hotzone cells, relay node, and remote radio head (RRH) are studied in 3GPP.

The frequency bands (hereinafter, referred to as "operating bands" in some cases) usable for communication have been predetermined in the LTE. Non-Patent Document 8 describes the frequency bands. In the frequency division duplex (FDD) communication, a frequency band for downlink (hereinafter, referred to as "downlink frequency band" in some cases) and a frequency band for uplink (hereinafter, referred to as "uplink frequency band" in some cases) that is paired with the downlink frequency band have been predetermined, where the uplink frequency band differs from the downlink frequency band. This is because the downlink and uplink are necessarily required for conventional communication such as voice communication so that transmission and reception are enabled at the same time by splitting the frequencies between downlink and uplink in the FDD.

In the FDD, a default value of an interval (TX-RX frequency separation) between a carrier frequency of resources for use in downlink (hereinafter, referred to as "downlink carrier frequency" in some cases) and a carrier frequency of resources for use in uplink (hereinafter, referred to as "uplink carrier frequency" in some cases) is determined per frequency band. Non-Patent Document 8 describes a default value at the TX-RX frequency separation.

In the LTE, a cell broadcasts, to UEs being served thereby, the frequency band information and uplink carrier frequency deployed by the own cell as broadcast information. Specifically, the frequency band information is included in the SIB1. The uplink carrier frequency is included in the SIB2. In a case where the uplink carrier frequency is not included in the SIB2, the uplink carrier frequency is derived from the downlink carrier frequency using the default value at the TX-RX frequency separation. The UE is capable of recognizing the downlink carrier frequency through cell selection or reselection and is capable of obtaining the frequency band and uplink carrier frequency deployed by the cell the through reception of the broadcast information from the cell.

As disclosed in Non-Patent Document 1, the development of "long term evolution advanced (LTE-A)" specifications as Release 10 is pursued in 3GPP.

Carrier aggregation (CA) is studied in the LTE-A system, in which two or more component carriers (CCs) are aggregated to support wider transmission bandwidths up to 100 MHz.

A Release 8 or 9-compliant UE, which supports LTE, is capable of transmission and reception on only the CC corresponding to one serving cell. On the other hand, it is conceivable that a Release 10-compliant UE may have the capability of transmission and reception, only reception, or only transmission on the CCs corresponding to a plurality of serving cells at the same time.

Each CC employs the configuration of Release 8 or 9, and the CA supports contiguous CCs, non-contiguous CCs, and CCs in different frequency bandwidths. The UE cannot configure the number of uplink CCs (UL CCs) equal to or more than the number of downlink CCs (DL CCs). The CCs configured by the same eNBs do not need to provide the same coverage. The CC is compatible with Release 8 or 9.

In CA, an independent HARQ entity is provided per serving cell in uplink as well as downlink. A transport block is generated per TTI for each serving cell. Each transport block and HARQ retransmission are mapped to a single serving cell.

In a case where CA is configured, a UE has single RRC connection with a NW. In RRC connection, one serving cell provides NAS mobility information and security input. This cell is referred to as primary cell (PCell). In downlink, a carrier corresponding to Pcell is a downlink primary component carrier (DL PCC). In uplink, a carrier corresponding to Pcell is an uplink primary component carrier (UL PCC). A secondary cell (SCell) is configured to form a pair of a PCell and a serving cell, in accordance with the UE capability. In downlink, a carrier corresponding to SCell is a downlink secondary component carrier (DL SCC). In uplink, a carrier corresponding to SCell is an uplink secondary component carrier (UL SCC).

A pair of one PCell and a serving cell configured by one or more SCells is configured for one UE.

In each SCell, a UE is capable of using resources for uplink (UL) in addition to resources for downlink (DL). The number of DL SCCs is equal to or more than the number of UL SCCs. No SCell is used for only resources for UL. Each resource for UL belongs to only one serving cell for one UE. The number of serving cells depends on the UE capability.

The PCell is changed through only a HO procedure. The PCell is used for transmission of PUCCH. The PUCCH for HARQ of the DL-SCH without UL-SCH is transmitted through only UL PCC. Differently from Scells, the PCell is not de-activated.

Re-establishment is triggered when the PCell results in a radio link failure (RLF). Re-establishment is not triggered in a case of SCells. The NAS information is obtained from the PCell.

The SCells are reconfigured, added, or removed through RRC. Also in handover within the LTE, the SCells used together with a target PCell are added, removed, or reconfigured through RRC.

In a case of adding a SCell, dedicated RRC signaling is used to transmit the all system information (SI) required for the SCell. That is, addition is performed in a connected mode, and the UE does not have to receive the SI broadcast from the SCell.

In each cell, SIB2 represents a carrier frequency of a resource for uplink.

PRIOR ART DOCUMENTS

Non-Patent Documents

Non-Patent Document 1: 3GPP TS 36.300 V10.1.0
Non-Patent Document 2: 3GPP TS 36.331 V9.4.0
Non-Patent Document 3: 3GPP TS 36.304 V9.4.0 Chapter 3.1, Chapter 4.3, Chapter 5.2.4
Non-Patent Document 4: 3GPP S1-083461
Non-Patent Document 5: 3GPP R2-082899
Non-Patent Document 6: 3GPP TR 36.814 V9.0.0
Non-Patent Document 7: 3GPP TR 36.912 V9.3.0
Non-Patent Document 8: 3GPP TS 36.101 V10.0.0

SUMMARY OF INVENTION

Problem to be Solved by the Invention

It is considered that the LTE-A system supports frequency bandwidths larger than frequency bandwidths of the LTE system, specifically, frequency bandwidths up to 100 MHz for improving a data rate. Frequency resources are used in various situations in areas. Therefore, it is conceivable that the 100 MHz of frequency bandwidth cannot be secured continuously in some areas. In other words, only discrete and narrow-band frequency resources can be secured at times. Also in such a case, flexible frequency band allocation is highly demanded for effectively using frequency resources. Meanwhile, differently from the conventional voice communication service, the service that requires different frequency bandwidths between DL and UL is highly demanded.

However, in a conventional communication system, resources for UL are required to be necessarily reserved in the same frequency band as that of the resources for DL in a conventional communication system, which interferes with efficient use of frequency resources. In addition, it is necessarily required to reserve, in the frequency band for downlink, the frequency band for uplink which is paired therewith. Therefore, in a case where, for example, a large number of free discrete and narrow frequency bands exist, it is difficult to use those. This leads to a problem of decreased use efficiency of frequency resources.

An object of the present invention is to provide a base station device and a communication system allowing flexible use of frequency resources and capable of improving use efficiency of frequency resources while increasing a data rate.

Means to Solve the Problem

A base station device of the present invention performs radio communication with a communication terminal device, wherein: the base station device configures a non-associated cell that includes a resource for downlink and does not include a resource for uplink, the resource for downlink being allocated to downlink communication to the communication terminal device, the resource for uplink being allocated to uplink communication from the communication terminal device; the base station device notifies the communication terminal device of link information indicating that the non-associated cell does not include the resource for uplink, using the resource for downlink; and the base station device communicates with the communication terminal device using the non-associated cell.

Further, a base station device of the present invention performs radio communication with a communication terminal device, wherein: the base station device configures an asymmetrical cell including a resource for downlink and a resource for uplink, the resource for downlink being allocated to downlink communication to the communication terminal device, the resource for uplink being included in a frequency band different from that of the resource for downlink and being allocated to uplink communication from the communication terminal device; the base station device notifies the communication terminal device of resource information for uplink regarding the resource for uplink using the resource for downlink; and the base station device communicates with the communication terminal device using the asymmetrical cell.

Further, a base station device of the present invention performs radio communication with a communication terminal device, wherein: the base station device configures a non-associated cell that includes a resource for uplink and does not include a resource for downlink, the resource for uplink being allocated to uplink communication from the communication terminal device, the resource for downlink being allocated to downlink communication to the communication terminal device; and the base station device communicates with the communication terminal device using the non-associated cell.

Further, a base station device of the present invention performs radio communication with a communication terminal device, wherein: the base station device configures a frequency band for downlink that includes a resource for downlink and does not include a resource for uplink, the resource for downlink being allocated to downlink communication to the communication terminal device, the resource for uplink being allocated to uplink communication from the communication terminal device; and the base station device communicates with the communication terminal device using the frequency band for downlink.

Further, a base station device of the present invention performs radio communication with a communication terminal device, wherein: the base station device configures a frequency band for uplink that includes a resource for uplink and does not include a resource for downlink, the resource for uplink being allocated to uplink communication from the communication terminal device, the resource for downlink being allocated to downlink communication to the communication terminal device; and the base station device communicates with the communication terminal device using the frequency band for uplink.

Further, a communication system of the present invention includes the base station device and a communication terminal device being able to perform radio communication with the base station device.

Effects of the Invention

According to the base station device of the present invention, it is possible to flexibly use frequency resources and improve the use efficiency of frequency resources while increasing a data rate.

According to the communication system of the present invention, it is possible to flexibly use frequency resources and improve the use efficiency of frequency resources while increasing a data rate.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of an LTE communication system.

FIG. 2 is a diagram illustrating the configuration of a radio frame used in the LTE communication system.

FIG. 3 is a diagram illustrating the configuration of an MBSFN frame.

FIG. 4 is a diagram illustrating physical channels used in the LTE communication system.

FIG. 5 is a diagram illustrating transport channels used in the LTE communication system.

FIG. 6 is a diagram illustrating logical channels used in the LTE communication system.

FIG. 7 is a block diagram showing the overall configuration of an LTE mobile communication system currently under discussion of 3GPP.

FIG. 12 is a flowchart showing an outline from a cell search to an idle state operation performed by a user equipment (UE) in the LTE communication system.

FIG. 13 is a diagram showing the concept of CA.

FIG. 14 is a diagram showing the configuration in which one UL CC is associated with one DL CC.

FIG. 15 is a diagram showing the configuration in which the same UL CC is associated with two different DL CCs.

FIG. 16 is a diagram showing the configuration in which a UL CC in a frequency band different from a corresponding predetermined frequency band of uplink is associated with a DL CC in a frequency band of some downlink.

FIG. 17 is a diagram showing the configuration in which a UL CC is not associated with a DL CC.

FIG. 18 is a diagram showing the concept of a cell configured by a DL/UL link via SIB2.

FIG. 19 is a diagram showing a cell configured by only a DL CC without a UL CC to be associated with the DL CC.

FIG. 21 is a flowchart showing a procedure by a UE regarding the process of prohibiting a UE from selecting, reselecting, or camping on a cell in which a UL CC is not configured in a case where the DL/UL link information of the cell is used.

FIG. 22 is a flowchart showing a procedure by an eNB regarding the process of setting the system information (SI) of the cell in a case where the cell barred information is used.

FIG. 23 is a flowchart showing a procedure by a UE regarding the process of prohibiting a UE from selecting, reselecting, or camping on a cell in which a UL CC is not configured in a case where the cell barred information is used.

FIG. 26 is a flowchart showing a procedure by an eNB regarding the process of setting the system information (SI) of a cell in a case where the information for stochastically prohibiting access is used.

FIG. 27 is a flowchart showing a procedure by a UE regarding the process of prohibiting a UE from performing uplink access in a cell in which a UL CC is not configured in a case where the information for stochastically prohibiting access is used.

FIG. 28 is a diagram for describing cells for use in CA in a first embodiment of the present invention.

FIG. 31 is a flowchart showing a procedure by an eNB regarding the process of setting the system information (SI) of a cell.

FIG. 35 is a diagram for describing cells for use in CA in a second embodiment of the present invention.

FIG. 36 is a diagram showing an example of a sequence of CA in a case where a cell in which a DL CC and a UL CC are configured in different frequency bands is used.

FIG. 37 is a diagram showing the concept of two cells which are configured by associating the same UL CC with two DL CCs in different frequency bands.

FIG. 38 is a diagram showing an example of a sequence of CA in a case where two cells are configured by associating the same UL CC with two DL CCs in different frequency bands.

FIG. 39 is a diagram showing another example of the sequence of CA in the case where two cells are configured by associating the same UL CC with two DL CCs in different frequency bands.

FIG. 40 is a diagram showing the concept of a frequency band configured by one or more resources for DL without a resource for UL to be associated therewith.

FIG. 41 is a diagram showing a setting example of a frequency band configured by one or more resources for DL without a resource for UL to be associated therewith.

FIG. 42 is a diagram showing the concept of a cell configured by only a UL CC without a DL CC to be associated with the UL CC.

FIG. 43 is a diagram for describing cells for use in CA in a fourth embodiment of the present invention.

EMBODIMENTS FOR CARRYING OUT THE INVENTION

First Embodiment

Figure 8:
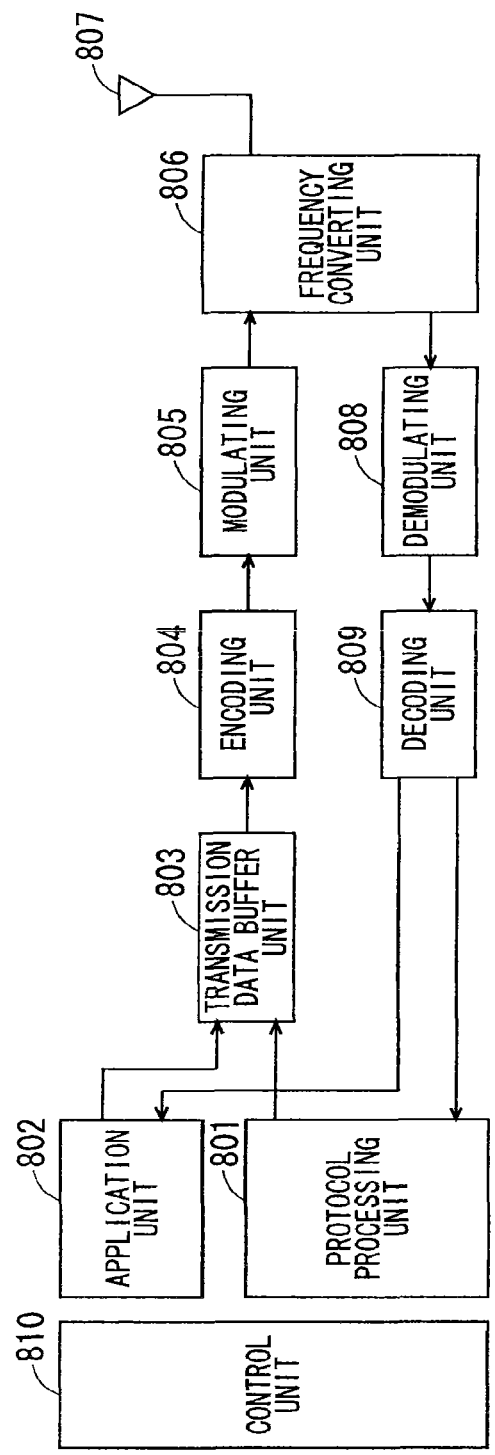
FIG. 8 is a block diagram showing the configuration of a user equipment (user equipment 71 of FIG. 7) according to the present invention.

FIG. 7 is a block diagram showing an overall configuration of an LTE mobile communication system, which is currently under discussion of 3GPP. Currently, an overall system configuration including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) is studied in 3GPP and, as to E-UTRAN, the configuration as shown in FIG. 7 is proposed (see Chapter 4.6.1 of Non-Patent Document 1).

FIG. 7 is described. A user terminal device (hereinafter, referred to as "user equipment" or "UE") 71 is capable of performing radio communication with a base station device (hereinafter, referred to as "base station") 72 and transmits/receives signals through radio communication. The user terminal device is equivalent to a communication terminal device. The base stations 72 are classified into an eNB 72-1 that is a macro cell and a Home-eNB 72-2 that is a local node. The eNB 72-1 is equivalent to a large-scale base station device and has a relatively large-scale coverage as the coverage in a range in which communication is allowed with the user equipment UE 71. The Home-eNB 72-2 is equivalent to a small-scale base station device and has a relatively small-scale coverage as the coverage.

The eNB 72-1 is connected to an MME/S-GW unit (hereinafter, referred to as an "MME unit" in some cases) 73 including an MME, S-GW or MME and S-GW through an S1 interface, and control information is communicated between the eNB 72-1 and the MME unit 73. A plurality of MME units 73 may be connected to one eNB 72-1. The eNBs 72-1 are connected to each other by means of an X2 interface, and control information is communicated between the eNBs 72-1.

The Home-eNB 72-2 is connected to the MME unit 73 by means of an S1 interface, and control information is communicated between the Home-eNB 72-2 and the MME unit 73. A plurality of Home-eNBs 72-2 are connected to one MME unit 73. Also, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface. One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

Further, the configuration below is currently studied in 3GPP. The X2 interface between the Home-eNBs 72-2 is not supported. The HeNBGW 74 appears to the MME unit 73 as the eNB 72-1. The HeNBGW 74 appears to the Home-eNB 72-2 as the MME unit 73. The interfaces between the Home-eNBs 72-2 and the MME units 73 are the same, which are the S1 interfaces, irrespective of whether or not the Home-eNB 72-2 is connected to the MME unit 73 through the HeNBGW 74. The mobility to the Home-eNB 72-2 or the mobility from the Home-eNB 72-2 that spans the plurality of MME units 73 is not supported. The Home-eNB 72-2 supports a single cell.

FIG. 8 is a block diagram showing the configuration of the user equipment (user equipment 71 of FIG. 7) according to the present invention. The transmission process of the user equipment 71 shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency to a baseband signal by the frequency converting unit 806 and is then demodulated by a demodulating unit 808. The demodulated data is transmitted to a decoding unit 809 and is subjected to a decoding process such as error correction. Among the pieces of decoded data, the control data is transmitted to the protocol processing unit 801, while the user data is transmitted to the application unit 802. A series of processes of the user equipment 71 is controlled by a control unit 810. This means that, though not shown in FIG. 8, the control unit 810 is connected to the respective units 801 to 809.

Figure 9:
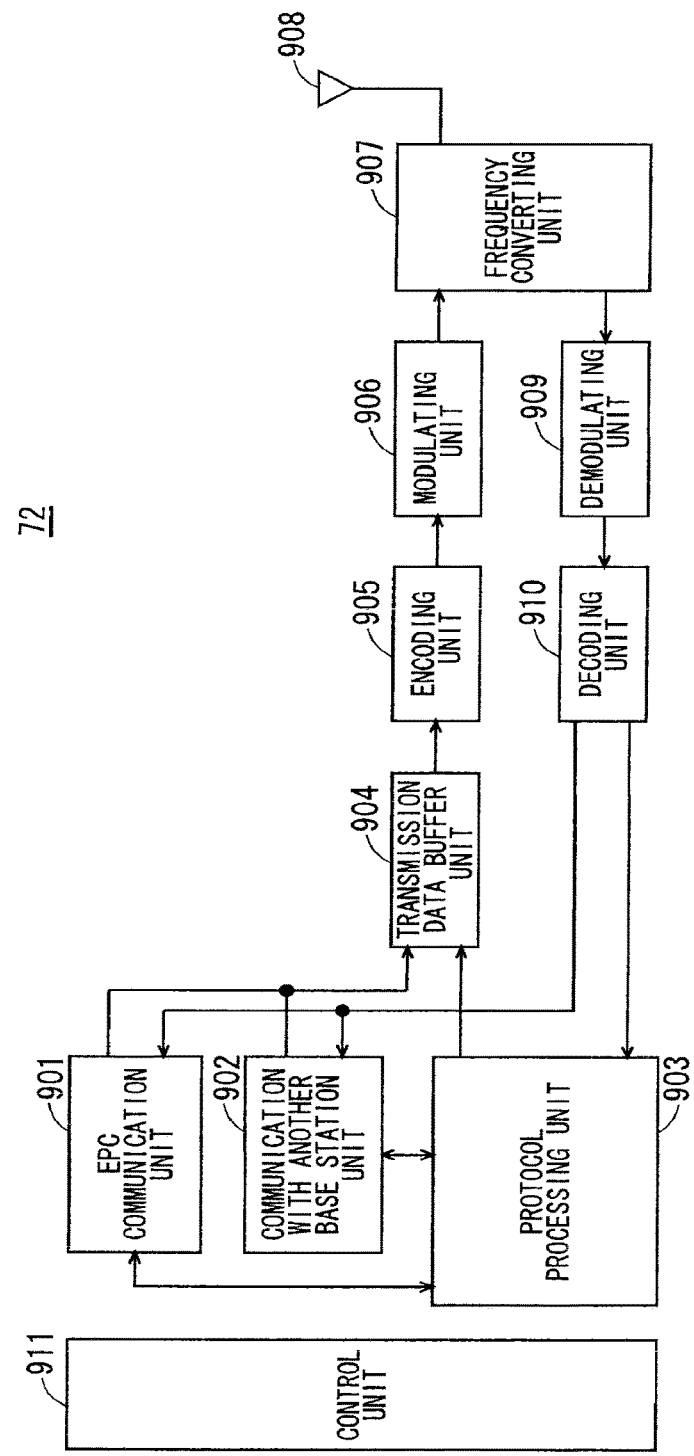
FIG. 9 is a block diagram showing the configuration of a base station (base station 72 of FIG. 7) according to the present invention.

FIG. 9 is a block diagram showing the configuration of the base station (base station 72 of FIG. 7) according to the present invention. The transmission process of the base station 72 shown in FIG. 9 is described. An EPC communication unit 901 performs data transmission/reception between the base station 72 and the EPCs (such as MME unit 73 and HeNBGW 74). A communication with another base station unit 902 performs data transmission/reception to/from another base station. The X2 interface between the Home-eNBs 72-2 is not intended to be supported, and accordingly, it is conceivable that the communication with another base station unit 902 may not exist in the Home-eNB 72-2. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of user equipments 71.

While, the reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is transmitted to a decoding unit 910 and is then subjected to a decoding process such as error correction. Among the pieces of decoded data, the control data is transmitted to the protocol processing unit 903, EPC communication unit 901, or communication with another base station unit 902, while the user data is transmitted to the EPC communication unit 901 and the communication with another base station unit 902. A series of processes by the base station 72 is controlled by a control unit 911. This means that, though not shown in FIG. 9, the control unit 911 is connected to the respective units 901 to 910.

The functions of the Home-eNB 72-2 currently under discussion of 3GPP are described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. Accordingly, the Home-eNB 72-2 in this case is required to be connected to a different HeNBGW 74 depending on its location.

Figure 10:
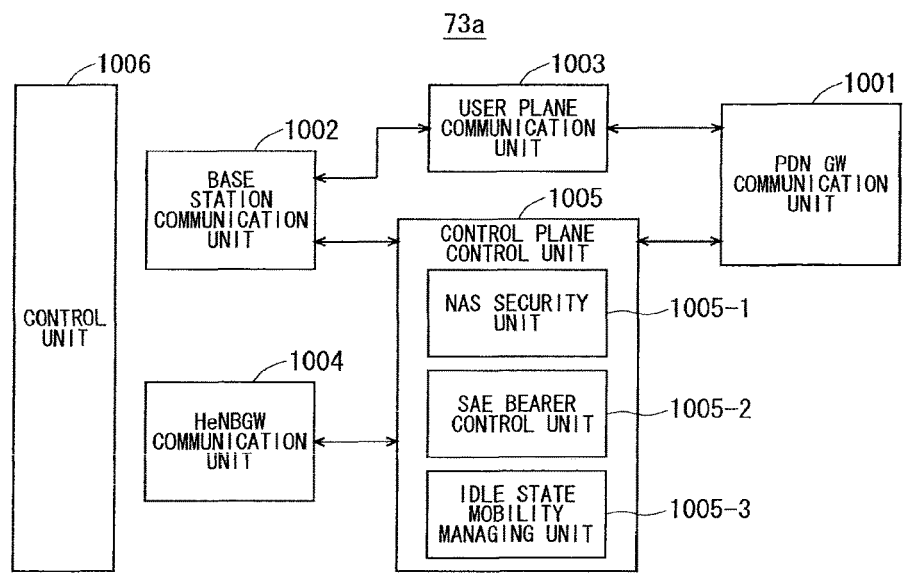
FIG. 10 is a block diagram showing the configuration of an MME (MME unit 73 of FIG. 7) according to the present invention.

FIG. 10 is a block diagram showing the configuration of the MME according to the present invention. FIG. 10 shows the configuration of an MME 73a included in the MME unit 73 shown in FIG. 7 described above. A PDN GW communication unit 1001 performs data transmission/reception between the MME 73a and a PDN GW. A base station communication unit 1002 performs data transmission/reception between the MME 73a and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit

1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception by means of the interface (IF) between the MME 73a and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes an NAS security unit 1005-1, an SAE bearer control unit 1005-2, and an idle state mobility managing unit 1005-3, and performs overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of paging signal in an idle state, addition, deletion, update, and search of a tracking area (TA) of one or a plurality of user equipments 71 being served thereby, and tracking area list (TA list) management.

The MME 73a begins a paging protocol by transmitting a paging message to the cell belonging to a tracking area (TA) in which the UE is registered. The idle state mobility managing unit 1005-3 may manage the CSG of the Home-eNBs 72-2 to be connected to the MME 73a, CSG-IDs, and a whitelist.

In the CSG-ID management, the relationship between a user equipment corresponding to the CSG-ID and the CSG cell is managed (added, deleted, updated or searched). For example, it may be the relationship between one or a plurality of user equipments whose user access registration has been performed with a CSG-ID and the CSG cells belonging to this CSG-ID. In the whitelist management, the relationship between the user equipment and the CSG-ID is managed (added, deleted, updated, or searched). For example, one or a plurality of CSG-IDs with which user registration has been performed by a user equipment may be stored in the whitelist. The above-mentioned management related to the CSG may be performed by another part of the MME 73a. A series of processes by the MME 73a is controlled by a control unit 1006. This means that, though not shown in FIG. 10, the control unit 1006 is connected to the respective units 1001 to 1005.

The function of the MME 73a currently under discussion of 3GPP is described below (see Chapter 4.6.2 of Non-Patent Document 1). The MME 73a performs access control for one or a plurality of user equipments being members of closed subscriber groups (CSGs). The MME 73a recognizes the execution of paging optimization as an option.

Figure 11:
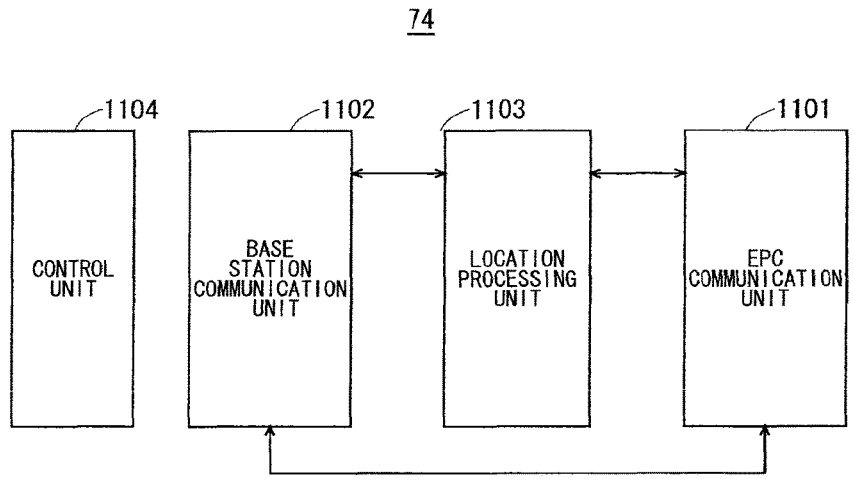
FIG. 11 is a block diagram showing the configuration of a HeNBGW 74 shown in FIG. 7 that is a HeNBGW according to the present invention.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME 73a by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME 73a through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP is described below (see Chapter 4.6.2 of Non-Patent Document 1). The HeNBGW 74 relays an S1 application. The HeNBGW 74 terminates the S1 application that is not linked to the user equipment 71 though it is a part of the procedures toward the Home-eNB 72-2 and towards the MME 73a. When the HeNBGW 74 is deployed, the procedure that is not linked to the user equipment 71 is communicated between the Home-eNB 72-2 and the HeNBGW 74 and between the HeNBGW 74 and the MME 73a. The X2 interface is not set between the HeNBGW 74 and another node. The HeNBGW 74 recognizes the execution of paging optimization as an option.

Next, an example of a typical cell search method in a mobile communication system is described. FIG. 12 is a flowchart showing an outline from cell search to idle state operation performed by a user equipment (UE) in the LTE communication system. When starting cell search, in Step ST1201, the user equipment synchronizes the slot timing and frame timing by a primary synchronization signal (P-SS) and a secondary synchronization signal (S-SS) transmitted from a neighbour base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (specified).

Next, in Step ST1202, the user equipment detects a reference signal RS (cell-specific reference signal (CRS)) transmitted from the base station per cell and measures the received power (also referred to as RSRP). The code corresponding to the PCI one by one is used for the reference signal RS, and separation from another cell is enabled by correlation using the code. The code for RS of the cell is derived from the PCI specified in Step ST1201, which makes it possible to detect the RS and measure the RS received power.

Next, in Step ST1203, the user equipment selects the cell having the best RS reception quality (for example, cell having the highest RS received power, that is, best cell) from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information related to the access to the cell, information related to cell selection, and scheduling information of other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC in the tracking area (TA) list that has been already possessed by the user equipment. In a case where the TAC received in Step ST1205 is identical to the TAC included in the TA list as a result of the comparison, the user equipment enters an idle state operation in the cell. In a case where the TAC received in Step ST1205 is not included in the TA list as a result of the comparison, the user equipment requires a core network (EPC) (including MME and the like) to change a TA through the cell for performing tracking area update (TAU). The core network updates the TA list based on an identification number (such as a UE-ID) of the user equipment transmitted from the user equipment together with a TAU request signal. The core network transmits the updated TA list to the user equipment. The user equipment rewrites (updates) the TAC list of the user equipment with the received TA list. After that, the user equipment enters the idle state operation in the cell.

In the LTE, LTE-A and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. Note that one CSG may contain a plurality of CSG cells. After being registered with any one of the CSG cells, the user equipment can access another CSG cell of the CSG to which the registered CSG cell belongs.

Alternatively, the Home-eNB in the LTE or the Home-NB in the UMTS is used as the CSG cell in some cases. The user equipment registered with the CSG cell has a whitelist. Specifically, the whitelist is stored in the subscriber identity module (SIM)/USIM. The CSG information of the CSG cell with which the user equipment has been registered is stored in the whitelist. Specific examples of the CSG information include CSG-ID, tracking area identity (TAI) and TAC. Any one of the CSG-ID and TAC is adequate as long as they are associated with each other. Alternatively, GCI is adequate as long as the CSG-ID and TAC are associated with global cell identity (GCI).

As can be seen from the above, the user equipment that does not have a whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

All physical cell identities (PCIs) are split into ones reserved for CSG cells and the others reserved for non-CSG cells is discussed in 3GPP (see Non-Patent Document 1). There is a range of PCIs in all physical cell identities (PCIs), which is reserved by the network for use by CSG cells (see Chapter 10.5.1.1 of Non-Patent Document 1). Splitting the range of PCIs is referred to PCI-split as times. The PCI split information is broadcast in the system information from the base station to the user equipments being served thereby. Non-Patent Document 5 discloses the basic operation of a user equipment by PCI split. The user equipment that does not have the PCI split information needs to perform cell search using all PCIs (for example, using all 504 codes). On the other hand, the user equipment that has the PCI split information is capable of performing cell search using the PCI split information.

Further, it has been determined that the PCIs for hybrid cells are not contained in the PCI range for CSG cells in 3GPP (see Chapter 10.7 of Non-Patent Document 1).

In 3GPP, there are two modes in the method of selecting or reselecting a CSG cell by a user equipment. One is an automatic mode. The feature of the automatic mode is described below. The user equipment performs selection or reselection with the use of an allowed CSG list (allowed CSG ID list) in the user equipment. After the completion of PLMN selection, the user equipment camps on one cell in the selected PLMN only in a case of a non-CSG cell or a CSG cell with a CSG ID present in the allowed CSG list. The user equipment disables an autonomous search function of the CSG cell if the allowed CSG list of the user equipment is empty (see Chapter 5.2.4.8.1 of Non-Patent Document 3).

The second is a manual mode. The feature of the manual mode is described below. The user equipment shows a list of available CSGs in the currently selected PLMN to a user. The list of CSGs provided to the user by the user equipment is not limited to the CSGs included in the allowed CSG list stored in the user equipment. The user selects the CSG based on the list of CSGs, and then the user equipment camps on the cell with the selected CSG ID, to thereby attempt registration (see Non-Patent Document 3).

The HeNB and HNB are required to support various services. For example, an operator causes the predetermined HeNB and HNB to register user equipments therein and permits only the registered user equipments to access the cells of the HeNB and HNB, which increases radio resources available for the user equipments and enables high-speed communication. In such a service, the operator correspondingly sets a higher accounting fee compared with a normal service.

In order to achieve the above-mentioned service, the closed subscriber group cell (CSG cell) accessible only to the registered (subscribed or member) user equipments is introduced. It is required to install a large number of closed subscriber group cells (CSG cells) in shopping malls, apartment buildings, schools, companies and the like. For example, the following manner of use is required; the CSG cells are installed for each store in shopping malls, for each room in apartment buildings, for each classroom in schools, and for each section in companies such that only the users who have registered with the respective CSG cells are permitted to use those CSG cells. The HeNB/HNB is required not only to complement the communication outside the coverage of the macro cell but also to support various services as described above. This also leads to a case where the HeNB/HNB is installed within the coverage of the macro cell.

As described above, as to the LTE-A system, CA for aggregating two or more CCs is studied to support the frequency bandwidths up to 100 MHz wider than the frequency bandwidth of the LTE system.

FIG. 13 is a diagram showing the concept of CA. An eNB shown in FIG. 13 configures a cell n configured by a DL CCn and a UL CCn which is associated with the DL CCn by a DL/UL link via SIB2. The carrier frequency of the DL CCn is denoted by Fn (DL), and the carrier frequency of the UL CCn is denoted by Fn (UL). Here, n is an integer of one to five.

A UE camps on the cell1 and performs RRC connection indicated by an arrow 1301. As a result, the cell1 becomes a PCell.

After that, the eNB notifies the UE of the information regarding the CCs to be aggregated through dedicated RRC signaling indicated by an arrow 1302. The information regarding a cell m configured by a DL CCm and a UL CCm, for example, system information is notified as the information regarding the CCs. Here, m is an integer of two to five. The eNB notifies the UE of the information regarding the CCs in this manner, whereby the cell2 to the cell5 become SCells.

As described above, the eNB performs CA for the UE with the cell1 to the cell5. Then, the UE performs communication with the cell1 to the cell5 based on CA, as indicated by an arrow 1303.

A configuration example of a UE that supports CA is described. It suffices that in the configuration shown in FIG. 8 described above, a part or the whole of the modulating unit 805, frequency converting unit 806, antenna 807, and demodulating unit 808 is caused to support a wider bandwidth. In the transmitter, a part or the whole of the modulating unit 805, frequency converting unit 806, and antenna 807 may be caused to operate in a band including a predetermined number of contiguous UL CCs. In the receiver, a part or the whole of the antenna 807, frequency converting unit 806, and demodulating unit 808 may be caused to operate in a band including a predetermined number of contiguous DL CCs. This enables to support CA by a predetermined number of contiguous UL CCs or DL CCs.

As another method, it suffices that a plurality of a part or the whole of the modulating unit 805, frequency converting unit 806, antenna 807, and demodulating unit 808 are provided in parallel to operate in a band including a predetermined number of non-contiguous UL CCs or DL CCs. In the transmitter, a plurality of a part or the whole of the modulating unit 805, frequency converting unit 806, and antenna 807 may be provided in parallel so as to operate in a band including a predetermined number of non-contiguous UL CCs. In the receiver, a plurality of a part or the whole of the antenna 807, frequency converting unit 806, and demodulating unit 808 may be provided in parallel so as to operate in a band including a predetermined number of non-contiguous DL CCs. This enables to support CA with a predetermined number of non-contiguous UL CCs or DL CCs. Alternatively, the two configurations described above may be appropriately combined.

A configuration example of an eNB that supports CA is described. It suffices that in the configuration shown in FIG. 9 described above, the protocol processing unit 903 performs the process for a UE for which CA is performed per cell configured by an eNB, and the transmission data buffer unit 904, encoding unit 905, modulating unit 906, frequency converting unit 907, antenna 908, demodulating unit 909, and decoding unit 910 are configured per cell. This enables to perform CA for a UE by cells configured by an eNB.

Examples of the method of associating each DL CC to be aggregated in CA and a UL CC that is paired with each DL CC with each other (hereinafter, referred to as "DL/UL link" at times) include the following two methods; one is DL/UL link via SIB2, and the other is DL/UL link performed when the SCell is configured through dedicated RRC signaling.

The DL/UL link through dedicated RRC signaling may differ from the DL/UL link via SIB2 is discussed in 3GPP. For example, R2-104480 (hereinafter, referred to as "Non-Patent Document 9") by 3GPP describes the discussion on DL/UL of a cell by 3GPP.

The DL/UL link via SIB2 is the same as the DL/UL link via SIB2 in the conventional LTE, and the carrier frequency of the UL CC is broadcast to UEs being served by each cell over the SIB2 of the DL CC of each cell. This is provided for configuring a resource for DL of a cell and a resource for UL that is paired therewith, and is thus referred to as DL/UL link specific to a cell (cell specific link) or DL/UL link of a cell (cell DL/UL link).

The frequency band for downlink and the frequency band for uplink that is paired therewith are predetermined, and thus, the DL/UL link via SIB2 is performed in a frequency band for the pair.

Note that description below is not limited to the case of CA, where a resource for DL and a resource for UL are referred to as "DL CC" and "UL CC", respectively.

Next, FIG. 14 and FIG. 15 show configuration examples of the DL/UL link via SIB2.

FIG. 14 is a diagram showing the configuration in which one UL CC is associated with one DL CC. The carrier frequency of the UL CC1 is shown by the SIB2 of the DL CC1, and the carrier frequency of the UL CC2 is shown by the SIB2 of the DL CC2.

FIG. 15 is a diagram showing the configuration in which the same UL CC is associated with two different DL CCs. The carrier frequency of the UL CC1 is shown by the SIB2 of the DL CC1, and the carrier frequency of the UL CC1 is also shown by the SIB2 of the DL CC2.

Next, FIG. 16 and FIG. 17 show examples that cannot be configured by the DL/UL link via SIB2.

FIG. 16 is a diagram showing the configuration in which a UL CC in a frequency band different from a corresponding predetermined frequency band of uplink is associated with a DL CC in a frequency band of some downlink. In the conventional communication such as voice communication, the UL CC to be associated with the DL CC is necessarily required. Therefore, the frequency band of uplink, which is paired with the frequency band of downlink, is predetermined in FDD for securing the configurations of the DL CC and UL CC. The conventional DL/UL link via SIB2 is premised on that communication is performed in the predetermined frequency band for a pair, and thus, the configuration as shown in FIG. 16, that is, associating to a frequency band different from a predetermined frequency band for a pair cannot be allowed. In FIG. 16, "x" represents that the configuration is not allowed by a DL/UL link via SIB2.

FIG. 17 is a diagram showing the configuration in which the UL CC is not associated with the DL CC. The UL CC to be associated with the DL CC is necessarily required in the conventional communication such as voice communication. Therefore, it is impossible to eliminate the configuration as shown in FIG. 17, that is, the UL CC to be associated with the DL CC by the conventional DL/UL link via SIB2. In FIG. 17, "x" represents that the configuration is not allowed by a DL/UL link via SIB2.

Meanwhile, the DL/UL link performed when the SCell is configured through dedicated RRC signaling is introduced for carrier aggregation (CA). The SCell is notified through dedicated RRC signaling per UE for which CA is performed.

It is premised that there is the DL/UL link via SIB2 determined per cell as a system, and a link specific to a UE (UE specific link) is configured thereon. The configuration may differ between the DL/UL link via SIB2 and the DL/UL link through dedicated RRC signaling is discussed in 3GPP.

Examples of the DL/UL link configured through dedicated RRC signaling include the same DL/UL link configuration as that of the DL/UL link via SIB2, the configuration in which a UL CC to be associated with a DL CC is not configured, and the configuration in which a UL CC to be associated with a DL CC differs from a UL CC of the DL/UL link via SIB2.

There is no SCell configuration that includes only a UL CC but does not include a DL CC to be associated with the UL CC. In addition, there is no SCell configuration in which a plurality of DL CCs are associated with one UL CC. Further, there is no configuration in which a frequency band of downlink in which a DL CC is located and a UL CC in a frequency band different from the corresponding predetermined frequency band of uplink are associated with each other.

Allocation of flexible frequency bands is highly demanded for effectively using frequency resources in a communication system. In addition, there are growing demands for the service that requires different frequency bandwidths between DL and UL, differently from the conventional voice communication service. In order to satisfy those demands, CA in which the number of DL CCs differs from the number of UL CCs (hereinafter, referred to as "asymmetric CA" in some cases) is discussed in 3GPP.

The examples of the method of enabling asymmetrical CA include a link specific to UE (UE specific link). This is the method of configuring a SCell different from the SIB2 link per UE and notifying the UE through dedicated RRC signaling. This method enables, for example, the configuration in which a UL CC to be associated with a DL CC is not configured as the SCell for configuring CA. In other words, the SCell including only a DL CC can be configured. Accordingly, asymmetrical CA is allowed.

However, even if asymmetrical CA is allowed with the use of the DL/UL link through dedicated RRC signaling, the DL/UL link through dedicated RRC signaling is premised on the presence of the DL/UL link via SIB2, which results in a configuration in which a resource for UL to be associated with a resource for DL inevitably exists per cell. Accordingly, a frequency band of downlink without a frequency band of uplink to be paired therewith cannot be configured as a system.

Meanwhile, in the same frequency band, the same link of the resource for UL is allowed for a plurality of resources for DL by the DL/UL link via SIB2, but the DL/UL link via SIB2 between different frequency bands is not allowed.

FIG. 18 is a diagram showing the concept of a cell configured by the DL/UL link via SIB2. The DL CC1 and UL CC1 are configured in the frequency band A (band A). The DL CC2 is configured in the frequency band B (band B). In this case, the cell configured by the DL CC1 and UL CC1 located in the same frequency band, specifically, the frequency band A, can be configured. However, the cell configured by the DL CC2 and UL CC1 located in different frequency bands, specifically, by the UL CC1 located in the frequency band A and the DL CC2 located in the frequency band B, cannot be configured. In FIG. 18, "x" represents that the configuration is not allowed by a DL/UL link via SIB2. Therefore, the UL CC (UL CC2) to be associated with the DL CC2 needs to be configured in the frequency band B. That is, a UL CC needs to be necessarily provided in the same frequency band as that of the DL CC.

Therefore, even if asymmetrical CA is performed by the DL/UL link through dedicated RRC signaling, the resource for UL needs to be necessarily reserved in the same frequency band as that of the resource for DL in a communication system, which interferes with the efficient use of frequency resources. In addition, a frequency band for uplink, which is paired with a frequency band for downlink, needs to be necessarily reserved in the frequency band for downlink. For this reason, in a case where, for example, there are a large number of free discrete and narrow frequency bands, the use thereof is difficult, leading to a problem of decreased use efficiency of frequency resources.

The embodiment below discloses the method of solving the above-mentioned problem. In the present embodiment, a cell configured by only a resource for DL, which does not include a resource for UL to be associated with the resource for DL, is provided, and the information indicating that the resource for UL is not configured, that is, the information indicating that the cell does not include the resource for UL is provided as the DL/UL link information of the cell. The DL/UL link information of the cell is equivalent to link information.

FIG. 19 is a diagram showing a cell configured by only a DL CC without a UL CC to be associated with the DL CC. The cell shown in FIG. 19 is a cell that does not include a UL CC to be associated with the DL CC1 but includes only a DL CC. That is, the cell shown in FIG. 19 is a cell in which only a resource for DL is reserved, which is equivalent to a non-associated cell.

Disclosed below is the method of associating a resource for DL and a resource for UL with each other in the present embodiment. The information indicating that a UL CC is not configured is included in the system information as the DL/UL link information of a cell. The system information may be the information of the MIB, SIB, or the like. The cell broadcasts this information to UEs being served thereby.

In a case where the DL/UL link information of a cell is included in the MIB, the UE is capable of recognizing that a UL CC to be associated with a DL CC has not been configured by receiving the information, which indicates that a UL CC is not configured, in the MIB to be mapped to the PBCH configured in the resource for DL of the cell. This enables the UE to recognize at an early stage that a UL CC to be associated with a DL CC has not been configured in cell selection or cell reselection.

In a case where the DL/UL link information of a cell is included in the SIB, the UE is capable of recognizing that a UL CC to be associated with a DL CC has not been configured by receiving the information, which indicates that a UL CC is not configured, in the SIB to be mapped to the PDSCH configured in the DL CC of a cell. Accordingly, the UE can receive the information indicating that a UL CC is not configured, together with other system information included in the SIB.

In a case where the information indicating that a UL CC is not configured is included in the SIB, the information may be included in the SIB1 or SIB2.

The SIB1 includes the frequency band information of a cell. The information indicating that a UL CC is not configured is included in the SIB1 together with the frequency band information, whereby the UE is capable of recognizing the frequency band information and the information indicating that a UL CC is not configured. This allows the UE to judge at an early stage whether or not camping on the cell is allowed in accordance with the capability of the own device.

The SIB2 includes the conventional DL/UL link information of a cell. Therefore, in a case where the information indicating that a UL CC is not configured is included in the SIB2, the UE can receive the information indicating that a UL CC is not configured without changing the operation of the UE to receive the SIB2 for obtaining this information.

"ul-CarrierFreq" that is a parameter indicating the carrier frequency of a UL CC to be associated with a DL CC in the SIB2 may be used. In a case where "ul-CarrierFreq" is used as a parameter, the following methods are used; the method in which no value is entered into the parameter, or the parameter itself is not entered into the SIB2, and the method in which a specific value indicating that a UL CC is not configured is provided and that value is entered.

In a case of the method in which no value is entered into a parameter, or the parameter itself is not entered into the SIB2, it is required to change the above-mentioned limit that a default value at TX-RX frequency separation is used in a case where an uplink carrier frequency is not included in the SIB2. This is because if the above-mentioned change is not made, it is indicated that an uplink carrier frequency is, present in the frequency away from a downlink carrier frequency by the default value. In a case where the uplink carrier frequency is not included in the SIB2, it suffices that there is no UL CC to be associated with, or no UL CC is not configured.

In a case of the method in which a specific value indicating that no UL CC is configured is provided and that value is entered, it suffices that the specific value is predetermined in a static manner. For example, in a case where a value of the parameter "ul-CarrierFreq" is numbered, the specific value is 99999. If the value of the parameter "ul-CarrierFreq" is 99999, it suffices that the configuration is made such that there is no UL CC to be associated with or no UL CC is configured. In this case, it is not required to change the above-mentioned limit that a default value at TX-RX frequency space is used in the case where the uplink carrier center frequency is not included in the SIB2.

The information indicating that no UL CC is configured may be the information indicating the presence or absence of the UL CC configuration. For example, the parameter indicating the presence or absence of the UL CC configuration is "ULCCconfig", and binary information of "1" and "0" is provided. There is the UL CC configuration in the case where the value of the parameter "ULCCconfig" is "1", while there is no UL CC configuration in the case where the value of the parameter "ULCCconfig" is "0". This enables to explicitly provide the presence or absence of the UL CC configuration to the UE.

As the information indicating that no UL CC is configured, a new parameter may be provided without using the conventional parameter indicating the carrier frequency of the UL CC to be associated with the DL CC. Alternatively, it may be predetermined that which parameters the priority should be placed on. This enables to reduce malfunctions of a UE.

Uplink access is not allowed in a cell in which a UL CC is not configured. Nevertheless, in a case where a UE selects or reselects a cell in which a UL CC is not configured, uplink access may be made in this cell. In order to suppress an increase of power consumption of a UE and an increase of interference with, for example, another system due to unnecessary uplink access, it may be prohibited to select, reselect, or camp on a cell in which a UL CC is not configured.

The following three are disclosed as the method of prohibiting selecting, reselecting, or camping on a cell; (1) using DL/UL link-information of a cell, (2) using cell barred information, and (3) using a parameter for RACH configuration.

A specific example of the method using the DL/UL link information of a cell is disclosed. In a case where the DL/UL link information of a cell indicates that there is no UL CC configuration, the selecting, reselecting, or camping on this cell by the UE is prohibited. This may be pre-determined in, for example, specifications in a static manner. The UE is capable of judging whether or not selecting, reselecting, or camping on the cell is prohibited from the DL/UL link information of a cell.

A specific example of the method using the cell barred information is disclosed. A parameter indicating the cell barred information may be provided. CellBarred may be used as the parameter indicating the cell barred information. As to a cell in which a UL CC is not configured, the information indicating being barred, that is, prohibition is set in CellBarred. CellBarred is broadcast to UEs being served by a cell as system information. CellBarred may be included in the SIB1 to be broadcast. In a case where the received CellBarred is the information indicating being barred, selecting, reselecting, or camping on this cell by the UE is prohibited. This allows the UE to judge whether or not selecting, reselecting, or camping on this cell is prohibited from the parameter indicating the cell barred information.

This method is in accordance with the conventional method regarding CellBarred, and thus, it is not required to separately predetermine the above in specifications or the like in a static manner. Further, this method is in accordance with the conventional method regarding CellBarred, which is applicable also to a case in which a Release 8 or 9-compliant UE cannot obtain the information newly provided in the present embodiment, such as the DL/UL link information of a cell.

A specific example of the method using the parameter for RACH configuration is disclosed. As to a cell in which a UL CC is not configured, a value of the parameter for RACH configuration in the system information of the DL CC is not set, or the parameter is not mapped on the system information. The cell broadcasts the system information to UEs being served thereby. In a case where the received system information includes no value of the parameter for RACH configuration, or the received system information includes no parameter for RACH configuration, selecting, reselecting, or camping on that cell by the UE is prohibited. This may be predetermined in, for example, specifications in a static manner. Accordingly, the UE is capable of judging whether or not selecting, reselecting, or camping on the cell is prohibited from the parameter for RACH configuration of the cell.

The parameter for RACH configuration may be, for example, "PRACH-Config" indicating the preamble sequence information of the RACH or "RACH-ConfigCommon" being the information required for random access.

Figure 20:
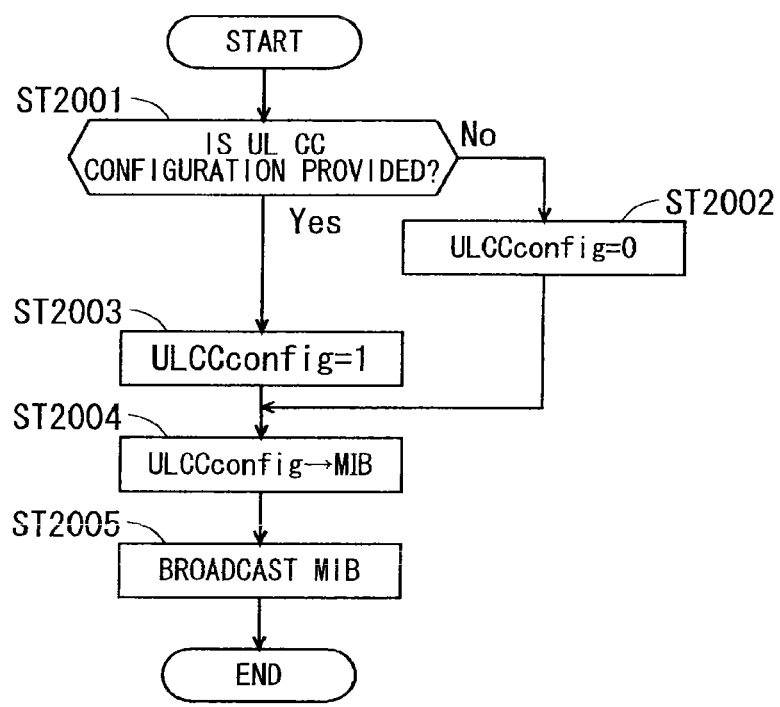
FIG. 20 is a flowchart showing a procedure by an eNB regarding the process of setting the system information (SI) of a cell in a case where the DL/UL link information of the cell is used.

FIG. 20 is a flowchart showing a procedure by an eNB regarding the process of setting the system information (SI) of a cell in a case where the DL/UL link information of the cell is used. FIG. 21 is a flowchart showing a procedure by a UE regarding the process of prohibiting a UE from selecting, reselecting, or camping on a cell in which a UL CC is not configured in a case where the DL/UL link information of the cell is used. In the present embodiment, the parameter "ULCCconfig" indicating the presence or absence of the UL CC configuration is used as the DL/UL link information of a cell. The flowchart shown in FIG. 21 is similar to the flowchart of FIG. 12 described above, and the same steps are denoted by the same reference symbols and the common description is not given here.

An eNB sets the system information (SI) based on the UL CC configuration of a cell. Specifically, first, in Step ST2001 of FIG. 20, the eNB judges whether or not a UL CC is configured in a cell, that is, whether or not a UL CC configuration is provided in the cell. The eNB moves to Step ST2003 in a case of judging that the UL CC configuration is provided, or moves to Step ST2002 in a case of judging that the UL CC configuration is not provided.

In Step ST2002, the eNB sets "0" indicating that the UL CC configuration is not provided in the parameter "ULCCconfig" and moves to Step ST2004.

In Step ST2003, the eNB sets "1" indicating that the UL CC configuration is provided in the parameter "ULCCconfig" and moves to Step ST2004.

In Step ST2004, the eNB causes the MIB of the cell to include "ULCCconfig" being the DL/UL link information of the cell and moves to Step ST2005.

In Step ST2005, the eNB maps the MIB to the PBCH of the DL CC and broadcasts the MIB to UEs being served thereby. The MIB includes "ULCCconfig" being the DL/UL link information of the cell. The eNB ends the entire procedure after ending the process of Step ST2005.

In Step ST1204 of FIG. 21, the UE that has selected the cell receives the PBCH of the cell and receives the MIB. After that, the UE moves to Step ST2006.

In Step ST2006, the UE judges whether or not a UL CC is configured in the cell, that is, whether or not a UL CC configuration is provided in the cell from "ULCCconfig" included in the MIB received in Step ST1204. In a case where "ULCCconfig" is "1", the UE judges that the UL CC configuration is provided and moves to Step ST1205. In a case where "ULCCconfig" is "0", the UE judges that the UL CC configuration is not provided. In a case of judging that the UL CC configuration is not provided, the UE cannot select this cell because it is prohibited from selecting, reselecting, or camping on a cell in which a UL CC is not configured. Accordingly, the UE removes this cell from candidate cells, and returns to Step ST1201 again to perform cell search.

This enables to prohibit, in a case where a cell that is configured by only a resource for DL without a resource for UL to be associated with the resource for DL is provided, the UE from selecting, reselecting, or camping on the cell. Accordingly, an increase of power consumption of a UE and an increase of interference with, for example, another system due to unnecessary uplink access can be suppressed.

The DL/UL link information of a cell is included in the MIB to be broadcast, whereby the UE is capable of judging the presence or absence of the UL CC configuration at an early stage in cell selection or reselection. This enables to reduce a delay time in the process until the cell selection or reselection.

FIG. 22 is a flowchart showing a procedure by an eNB regarding the process of setting the system information (SI) of the cell in a case where cell barred information is used. FIG. 23 is a flowchart showing a procedure by a UE regarding the process of prohibiting a UE from selecting, reselecting, or camping on a cell in which a UL CC is not configured in a case where the cell barred information is used. The flowchart shown in FIG. 23 is similar to the flowchart of FIG. 12 described above described above, and the same steps are denoted by the same reference symbols and the common description is not given here.

The eNB sets the system information (SI) based on the UL CC configuration of a cell. Specifically, first, in Step ST2101 of FIG. 22, the eNB judges whether or not a UL CC is configured in a cell, that is, whether or not a UL CC configuration is provided in the cell. The eNB moves to Step ST2103 in a case of judging that the UL CC configuration is provided, or moves to Step ST2102 in a case of judging that the UL CC configuration is not provided.

In Step ST2102, the eNB sets "barred" indicating being barred, that is, prohibition in Cellbarred and moves to Step ST2104.

In Step ST2103, the eNB sets "notbarred" indicating not being barred, that is, no prohibition in Cellbarred and moves to Step ST2104.

In Step ST2104, the eNB causes the SIB1 of the cell to include Cellbarred and moves to Step ST2105.

In Step ST2105, the eNB maps the SIB1 to the PDSCH of the DL CC and broadcasts the SIB1 to UEs being served by the cell. The SIB1 includes Cellbarred. The eNB ends the entire procedure after ending the process of Step ST2105.

In Step ST1205 of FIG. 23, the UE that has selected the cell receives the DL-SCH to be mapped to the PDSCH of this cell and receives the SIB1. After that, the UE moves to Step ST2106.

In Step ST2106, the UE judges whether or not the cell is barred from Cellbarred included in the SIB1 received in Step ST1205. In a case where Cellbarred is "notbarred", the UE judges that the cell is not barred and moves to Step ST1206. In a case where Cellbarred is "barred", the UE judges that the cell is barred. In this case, the UE is prohibited from selecting, reselecting, or camping on the barred cell. Accordingly, the UE cannot select this cell, and thus removes this cell from candidate cells and returns to Step ST1201 again to perform cell search.

As described above, a value indicating barring is set in CellBarred of a cell in which a UL CC is not configured, and is broadcast to UEs being served by a cell. This enables the UE that has received the broadcast information to select, reselect, or camp on this cell, and an increase of power consumption of a UE and an increase of interference with, for example, another system due to unnecessary uplink access can be suppressed.

This method is in accordance with the conventional CellBarred method, and thus, there is no need to separately predetermine specifications or the like in a static manner. This method is applicable also to a case in which a Release 8 or 9-compliant UE cannot obtain the information newly provided in the present embodiment, such as the DL/UL link information of a cell.

As described above, in a case where the UE is prohibited from selecting, reselecting, or camping on a cell in which a UL CC is not configured, such a problem arises that the UE that needs only downlink communication cannot select, reselect, or camp on this cell though it can perform communication using this cell.

In order to solve this problem, uplink access is prohibited in a cell in which a UL CC is not configured and selecting, reselecting, or camping on this cell is not prohibited.

The following four are disclosed as the method of prohibiting uplink access to the cell; (1) using the DL/UL link information of a cell, (2) using the information for stochastically prohibiting access, (3) using the information indicating whether or not to prohibit access, and (4) using a parameter for RACH configuration.

A specific example of the method of (1) using the DL/UL link information of a cell is disclosed. In a case where it is indicated that the UL CC configuration is not provided by the DL/UL link information of a cell, the UE is prohibited from accessing this cell or does not access this cell. This may be predetermined in, for example, specifications in a static manner. The UE is capable of judging whether or not it is prohibited from accessing this cell or does not access this cell from the DL/UL link information of a cell.

A specific example of the method of (2) using the information for stochastically prohibiting access is disclosed. A parameter indicating the information for stochastically prohibiting access may be provided. Access class barring (ACB) may be used as the parameter indicating the information for stochastically prohibiting access. The access class including all UEs that have performed camping on may be provided, and an ACB factor (ac-BarringFactor) for determining the barring probability of the access class, that is, the prohibition probability thereof may be set to "0" such that access is disabled. In a case where the ACB factor is "0", access is always barred, that is, prohibited. The cell notifies UEs being served thereby of the ACB factor. In a case where the ACB factor of the access class is "0", the UE is prohibited from accessing this cell or does not access this cell. The UE is capable of judging whether or not the UE is prohibited from accessing this cell or does not access this cell from the ACB factor of the access class.

This method is in accordance with the conventional ACB method, and thus, there is no need to separately predetermine specifications or the like in a static manner. In addition, this method is in accordance with the conventional ACB method, and thus is applicable also to a case in which a Release 8 or 9-compliant UE cannot obtain the information newly provided in the present embodiment, such as the DL/UL link information.

A specific example of the method of (3) using the information indicating whether or not to prohibit access is disclosed. A parameter indicating the information indicating whether or not to prohibit access may be provided. The parameter indicating the information indicating whether or not to prohibit access is, for example, "Ac-barringForNoUL". Values of the parameter indicating the information indicating whether or not to prohibit access are two values "1" and "0". It is indicated that access is prohibited in the case where the parameter "Ac-barringForNoUL" is "1", and that access is not prohibited in the case where the parameter "Ac-barringForNoUL" is "0". As a result, a cell can explicitly notify UEs being served thereby of whether or not access is prohibited. The UE is capable of judging whether or not the UE is prohibited from accessing the cell or does not access the cell from the information indicating whether or not to prohibit access.

A specific example of the method of (4) using a parameter for RACH configuration is disclosed. As to the cell in which a UL CC is not configured, a value of the parameter for RACH configuration in the system information of the DL CC is not set, or the parameter is not mapped on the system information. The cell broadcasts the system information to UEs being served thereby. In a case where the received system information does not include the value of the parameter for RACH configuration or does not include the parameter for RACH configuration, the UE is prohibited from accessing the cell or does not access the cell. This may be predetermined in, for example, specifications in a static manner. The UE is capable of judging whether or not it is prohibited from accessing this cell or does not access this cell from the DL/UL link information of a cell. The parameter for RACH configuration may be, for example, "PRACH-Config" indicating the preamble sequence information of the RACH, or "RACH-ConfigCommon" being the information required for random access.

Figure 24:
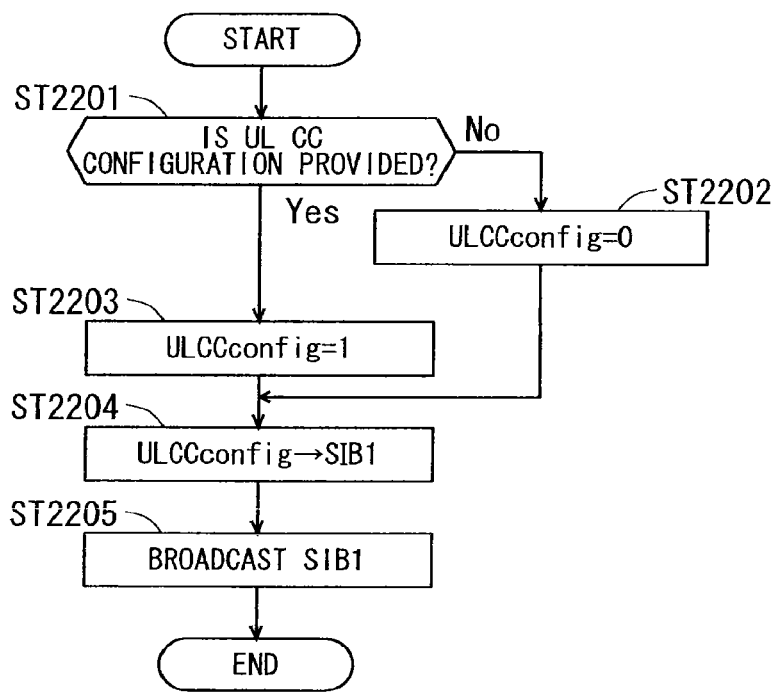
FIG. 24 is a flowchart showing a procedure by an eNB regarding the process of setting the system information (SI) of a cell in a case where uplink access is prohibited using the DL/UL link information.
Figure 25:
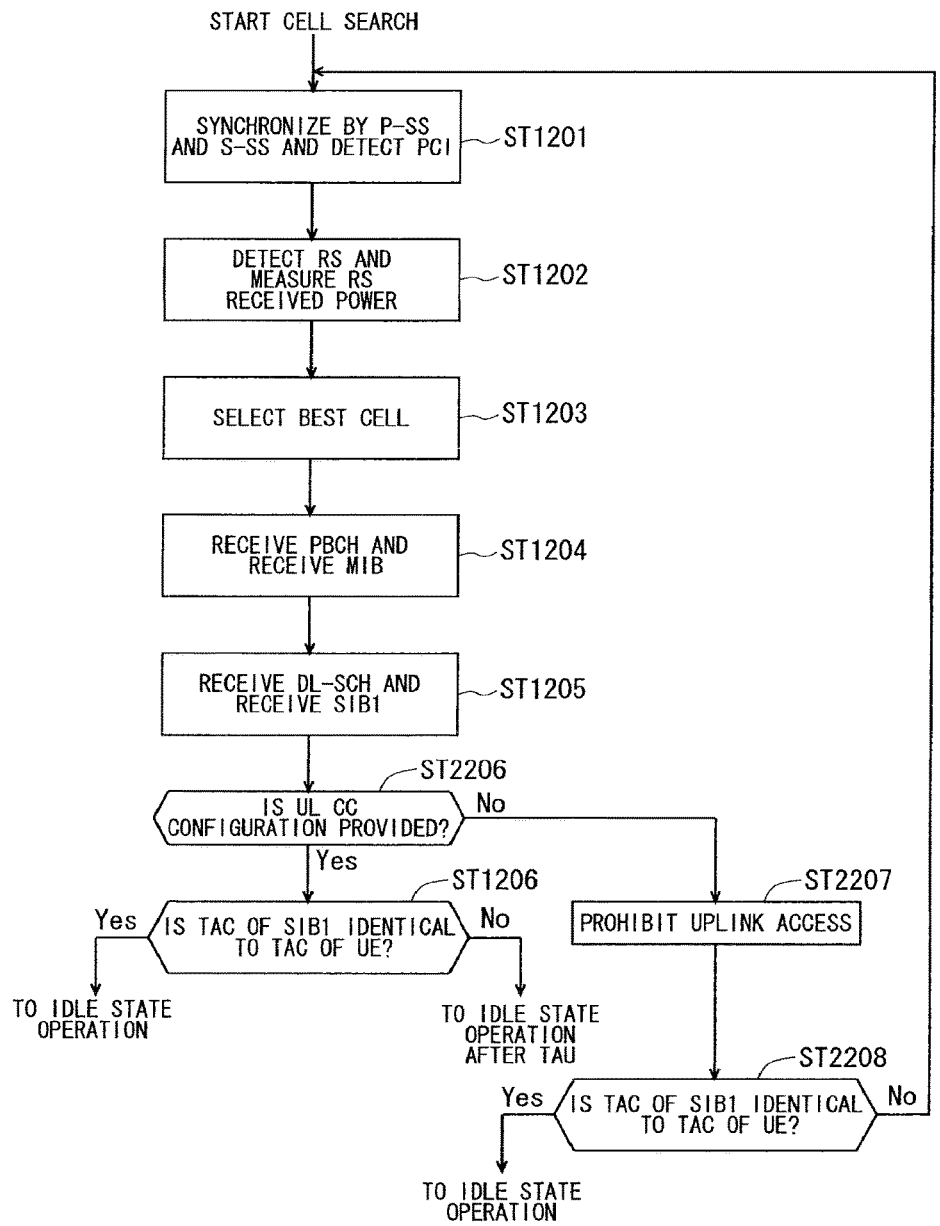
FIG. 25 is a flowchart showing a procedure by a UE regarding the process of prohibiting a UE from performing uplink access in a cell, in which a UL CC is not configured, using DL/UL link information of the cell.

FIG. 24 is a flowchart showing a procedure by an eNB regarding the process of setting the system information (SI) of a cell in a case where uplink access is prohibited using the DL/UL link information. FIG. 25 is a flowchart showing a procedure by a UE regarding the process of prohibiting a UE from performing uplink access in a cell, in which a UL CC is not configured, using DL/UL link information of the cell. In the present embodiment, the parameter "ULCCconfig" indicating the presence or absence of the UL CC configuration is used as the DL/UL link information of a cell. The flowchart shown in FIG. 25 is similar to the flowchart of FIG. 12 described above, and the same steps are denoted by the same reference symbols and the common description is not given here.

The eNB sets the system information (SI) based on the UL CC configuration of a cell. Specifically, first, in Step ST2201 of FIG. 24, the eNB judges whether or not a UL CC is configured in a cell, that is, whether or not the UL CC configuration is provided in the cell. The eNB moves to Step ST2203 in a case of judging that the UL CC configuration is provided, or moves to Step ST2202 in a case of judging that the UL CC configuration is not provided.

In Step ST2202, the eNB sets "0" indicating that the UL CC configuration is not provided in the parameter "ULCCconfig", and moves to Step ST2204.

In Step ST2203, the eNB sets "1" indicating that the UL CC configuration is provided in the parameter "ULCCconfig", and moves to Step ST2204.

In Step ST2204, the eNB causes the SIB1 of the cell to include "ULCCconfig" being the DL/UL link information of a cell and moves to Step ST2205.

In Step ST2205, the eNB maps the SIB1 to the PDSCH of the DL CC and broadcasts the SIB1 to UEs being served by the cell. The SIB1 includes "ULCCconfig". The eNB ends the entire procedure after ending the process of Step ST2205.

In Step ST1205 of FIG. 25, the UE that has selected the cell receives the SIB1 of the cell. After that, the UE moves to Step ST2206.

In Step ST2206, the UE judges whether or not a UL CC is configured in the cell, that is, whether or not the UL CC configuration is provided in the cell from "ULCCconfig" included in the SIB1 received in Step ST1205. In a case where "ULCCconfig" is "1", the UE judges that the UL CC configuration is provided and moves to Step ST1206. In a case where "ULCCconfig" is "0", the UE judges that the UL CC configuration is not provided and moves to Step ST2207.

In Step ST2207, the UE performs setting to prohibit uplink access and moves to Step ST2208.

In Step ST2208, the UE judges whether or not the TAC of the SIB1 is identical to the TAC of the UE. In a case of judging that the TAC of the SIB1 is identical to the TAC of the UE in Step ST2208, the UE does not need uplink access and thus enters an idle state operation. In a case where the UE judges that the TAC of the SIB1 is not identical to the TAC of the UE, that is, judges that the TAC of the SIB1 is different from the TAC of the UE in Step ST2208, the TAU is required. However, uplink access is prohibited in Step ST2207, and thus, the UE is not allowed to initiate the TAU process. Accordingly, the UE cannot select, reselect, or camp on the cell and removes the cell from candidate cells, and returns to Step ST1201 again to perform the cell search process.

The UE that has moved to the idle state operation in Step ST2208 is prohibited from uplink access in Step ST2207, and thus is capable of only downlink communication. The UE that needs uplink communication may return to Step ST1201 again to perform the cell search process at a point in time when uplink access is required. Alternatively, the UE may judge whether or not the own UE needs uplink access in the judgment process of Step ST2208 and may return to Step ST1201 again to perform the cell search process if uplink access is required. In a case where uplink access is not required, the UE may enter the idle state operation.

This enables to prohibit uplink access of a UE in a case where a cell, which is configured by only a resource for DL without a resource for UL to be associated with the resource for DL, is configured. Accordingly, an increase of power consumption of a UE and an increase of interference with, for example, another system due to unnecessary uplink access can be suppressed. In addition, the UE is not prohibited from selecting, reselecting, or camping on a cell in which a UL CC is not configured, whereby the UE that needs only downlink communication is capable of selecting, reselecting, or camping on this cell. Therefore, the UE can perform downlink communication.

FIG. 26 is a flowchart showing a procedure by an eNB regarding the process of setting the system information (SI) of a cell in a case where the information for stochastically prohibiting access is used. FIG. 27 is a flowchart showing a procedure by a UE regarding the process of prohibiting a UE from performing uplink access in a cell in which a UL CC is not configured in a case where the information for stochastically prohibiting access is used. The flowchart shown in FIG. 27 is similar to the flowchart of FIG. 12 described above, and the same steps are denoted by the same reference symbols and the common description is not given here.

The eNB sets the system information (SI) based on the UL CC configuration of a cell. Specifically, in Step ST2301 of FIG. 26, the eNB judges whether or not a UL CC is configured in the cell, that is, whether or not the UL CC configuration is provided in the cell. The eNB moves to Step ST2303 in a case of judging that the UL CC configuration is provided or moves to Step ST2302 in a case of judging that the UL CC configuration is not provided.

In Step ST2302, the eNB sets "0" in an ACB factor (ac-BarringFactor) and moves to Step ST2304.

In Step ST2303, the eNB sets a value (in this case, "x") derived based on the congested situation of a cell in the ACB factor (ac-BarringFactor) and moves to Step ST2304.

In Step ST2304, the eNB causes the SIB2 of the cell to include the ACB factor (ac-BarringFactor) and moves to Step ST2305.

In Step ST2305, the eNB maps the SIB2 to the PDSCH of the DL CC and broadcasts the SIB2 to UEs being served by the cell. The SIB2 includes the ACB factor (ac-BarringFactor). The eNB ends the entire procedure after ending the process of Step ST2305.

In Step ST2306 or Step ST2307 of FIG. 27, the UE that has selected the cell receives the SIB2 of the cell. The UE that has received the SIB2 in Step ST2306 does not need uplink access, and then performs an idle state operation. The UE that has received the SIB2 of the cell in Step ST2307 moves to Step ST2308.

The UE that has received the SIB2 in Step ST2307 requires uplink access for initiating the TAU process and, in Step ST2308, judges whether or not "0" is set in the ACB factor (ac-BarringFactor) included in the SIB2. In a case of judging that "0" is not set in the ACB factor (ac-BarringFactor), the UE performs uplink access through the ACB process in the conventional LTE.

Specifically, the UE judges whether or not it is allowed to stochastically perform uplink access in accordance with the value of the ACB factor (ac-BarringFactor), and performs uplink access for the TAU process if it is allowed, or stands by for a predetermined period and performs the ACB process again if it is not allowed. In a case of judging that "0" is set in the ACB factor (ac-BarringFactor) in Step ST2308, the UE judges that uplink access is prohibited and removes this cell from candidate cells. Then, the UE returns to Step ST1201 again to perform the cell search process.

Through the above, similar effects to those of the case described in the example shown in FIG. 24 and FIG. 25 can be achieved. In addition, the example disclosed in FIG. 27 is in accordance with the conventional ACB method, and thus does not need to be separately predetermined in, for example, specifications in a static manner. Further, this example is in accordance with the conventional ACB method, and thus is applicable also to a case where a Release 8 or 9-compliant UE cannot obtain the information newly provided in the present embodiment, such as the DL/UL link information of a cell.

In this case, if a UE that needs two-way communication service selects or reselects a cell in which a UL CC is not configured, the UE camps on this cell though it is not allowed uplink access. This causes a problem that demands for two-way communication service cannot be satisfied.

In order to solve this problem, therefore, in a case where the above-mentioned DL/UL link information of a cell, the information for stochastically prohibiting access, the information indicating whether or not to prohibit access, or the parameter for RACH configuration indicates that uplink access to the cell is prohibited, a UE that needs two-way communication service may avoid selecting, reselecting, or camping on this cell. Particularly in a case where the DL/UL link information of a cell or the parameter for RACH configuration is used, it is clear that a UL CC is not configured in that cell, which is suitable for solving the above-mentioned problem.

According to the method disclosed in the present embodiment as described above, an eNB and a UE communicate with each other using the non-associated cell being the cell that includes a resource for DL but does not include a resource for UL. This eliminates the need to always reserve a resource for UL in the same frequency band as that of a resource for DL in a communication system. This enables to allocate a resource for UL that becomes unnecessary to another cell, another operator, another system, or the like. Therefore, it is possible to improve the use efficiency of frequency resources.

The present embodiment discloses a method of allowing a CA-compliant UE that needs uplink access to perform two-way communication using a cell in which a UL CC is not configured. As this method, it suffices that this cell is used as a cell for CA (serving cell) in the present embodiment. On that occasion, CA may be performed to include at least one serving cell in which a UL CC is configured. Uplink access is made using the serving cell in which a UL CC is configured. The serving cell in which a UL CC is configured may serve as PCell. The UE may transmit the uplink control information regarding a serving cell in which a UL CC is not configured, for example, the CQI for downlink data and the Ack/Nack for downlink data, with the use of the serving cell in which a UL CC is configured.

This allows a UE having the capability of supporting CA to perform two-way communication with the use of a cell in which a UL CC is not configured.

It suffices that in this case, a cell in which a UL CC is not configured is prohibited from serving as PCell and that the use thereof is limited to SCell. Although the cell for which the UE performs RRC connection serves as PCell, in a cell in which a UL CC is not configured, the UE cannot perform uplink access for RRC connection. Therefore, if the cell in which a UL CC is not configured is prohibited from serving as PCell, the UE allows a cell in which a UL CC is configured to serve as PCell and is allowed CA. In addition, it is possible to prevent a UE from unnecessarily performing the RRC connection process in a cell in which a UL CC is not configured.

FIG. 28 is a diagram for describing cells for use in CA in the first embodiment of the present invention. A cell1 is configured by a DL CC1 and a UL CC1. The carrier frequency of the UL CC1 to be associated with the DL CC1 is shown in the DL/UL link (link) information of the cell. A cell2 is configured by only a DL CC2, where a UL CC is not configured. Therefore, it is indicated that a UL CC is not configured as the DL/UL link information of a cell. The cell1 corresponds to an associated cell, the DL CC1 corresponds to another resource for downlink, and the UL CC1 corresponds to a resource for uplink. The cell2 corresponds to a non-associated cell, and the DL CC2 corresponds to a resource for downlink.

Figure 29:
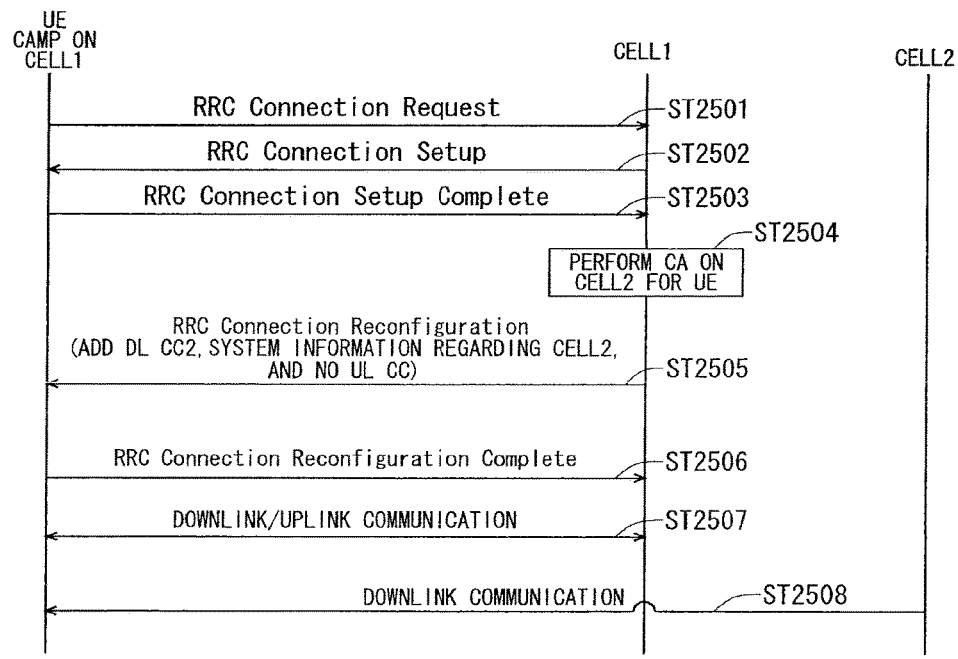
FIG. 29 is a diagram showing an example of a sequence of CA in a case where a cell in which a UL CC is not configured is used.

FIG. 29 is a diagram showing an example of a sequence of CA in a case where a cell in which a UL CC is not configured is used. In Step ST2501, the UE that has camped on the cell1 notifies the cell1 of an RRC connection request. The UL CC1 is configured in the cell1, where uplink access is allowed. Accordingly, in Step ST2502, the cell1 notifies the UE of an RRC connection setup message.

In Step ST2503, the UE that has received the RRC connection setup message and performed the setup process for RRC connection notifies the cell1 of an RRC connection setup complete message.

In Step ST2504, the eNB or cell1 determines to perform CA on the cell2 for the UE. For example, this is a case where communication service in which an amount of downlink data to a UE is larger than an amount of uplink data occurs, such as download of high capacity data, for example, images.

In Step ST2505, the cell1 notifies the UE of an RRC connection reconfiguration message for CA. The RRC connection reconfiguration message contains the information of the cell2 as a serving cell on which CA is performed, specifically, the information indicating the addition (Add) of the DL CC2, the system information regarding the cell2, the information indicating that a UL CC is not configured, and the like. Through reception of the above-mentioned information, the UE is capable of recognizing that CA is performed on the DL CC2 of the cell2 in addition to the cell1.

The UE that has received the RRC connection reconfiguration message prepares for the CA process on the cell1 and cell2 and, in Step ST2506, notifies the cell1 of an RRC connection reconfiguration complete message.

The cell1 or eNB that has received the RRC connection reconfiguration complete message performs CA on the cell2 in addition to the cell1. The cell1 serves as PCell.

In Step ST2507, downlink communication and uplink communication are performed between the UE and cell1. In Step ST2508, downlink communication is performed between the UE and cell2.

The downlink communication and uplink communication of Step ST2507 are performed using the DL CC1 and the UL CC1. The downlink communication of Step ST2508 is performed using the DL CC2. In other words, downlink communication is performed using the cell1 and the cell2, and uplink communication is performed using the cell1. The UE transmits the uplink control information for downlink data of the cell2, for example, the CQI for downlink data, Ack/Nack for downlink data, and the like, with the use of the cell1 in which a UL CC is configured.

According to the CA method disclosed in the present embodiment as described above, asymmetrical CA is allowed without reserving a resource for UL in the same frequency band as that of a resource for DL in a communication system.

Therefore, a resource for UL that becomes unnecessary can be allocated to another cell, another operator, another system, or the like, which enables to improve the use efficiency of frequency resources.

As described above, the UE synchronizes the cells by the PCIs in cell search, and detects (specifies) the PCIs of the synchronized cells. The PCI allocated per cell is used when deriving a code for RS of the cell. The code for RS of the cell is derived from the specified PCIs of the synchronized cells, to thereby detect RS and measure RS received power. The RS is used as a reference signal for received data demodulation by a UE. That is, the RS is used as a phase synchronization signal for phase adjustment. In this manner, the PCI allocated per cell is required for communication with the cell.

The UE does not search and detect a cell serving as SCell in a case of performing CA. Therefore, the UE cannot detect (specify) the PCI from the synchronization signal (SS) of a cell in cell search, as in the conventional method. For this reason, the UE cannot recognize the PCI of SCell and detect RS or the like, which disables the measurement of the RS received power and communication with SCell.

The method for solving this problem is disclosed. The eNB or cell notifies the UE for which CA is performed of the PCI of SCell on which CA is performed, through dedicated RRC signaling. The RRC connection reconfiguration message may be used or may be notified together with the information of the serving cell on which CA is performed. For example, in Step ST2505 of FIG. 29 described above, the cell1 causes the RRC connection reconfiguration message notified the UE for CA to contain the PCI of the cell2 as the information of the cell2 being a serving cell on which CA is performed. The UE is capable not only of measuring the RS received power of the cell2 but also of communicating with the cell2 through the reception of the PCI.

This example has described the case in which the PCI is included in the RRC connection reconfiguration message and notified the UE, as the information of the serving cell on which CA is performed. Alternatively, the information of the serving cell on which CA is performed may be the information regarding the PCI. The information regarding the PCI does not need to be the PCI value per se, but may be, for example, the numbers in a case where the PCI values are numbered. In a case where there are, for example, 504 PCIs as described above, PCI values may be numbered 0 to 503 in specifications and those numbers may be notified. This enables to reduce an amount of information required for notifying a UE. A new parameter indicating the information regarding the PCI may be provided. For example, the parameter is Cellpci. A value of PCI or the number indicating the PCI value is set in Cellpci and is notified the UE.

In the case where the PCI of SCell is identical to the PCI of PCell, it may be omitted to notify the UE of those. For example, in the case where the PCI of a predetermined SCell is the same as the PCI of PCell, Cellpci is not contained in the RRC connection reconfiguration message as the information of the predetermined SCell. It suffices that in a case where the RRC connection reconfiguration message does not contain the parameter, the UE judges that the PCI of SCell in which the parameter is not contained is identical to the PCI of PCell to derive the RS or the like using the PCI. According to the method disclosed above, the UE is capable of communicating with the SCell on which CA is performed.

The operator or eNB may set the PCI of each cell in the same eNB, or the cell may set the PCI of the own cell. This enables to flexibly set the PCI of the cell configured by the same eNB, as a system. For example, different PCIs may be set in the all cells, or different PCIs may be set in only cells in the same carrier frequency. In a case where different PCIs are set in cells in the same carrier frequency, it is not required to limit the setting of the PCI between different carrier frequencies. The cell configured by the same eNB may be divided into predetermined groups and different PCIs may be set in the all cells of the group. Conversely, the same PCI may be set in the all cells of the group. The above-mentioned PCI setting methods may be appropriately combined.

The PCIs of the cells configured by the same eNB can be flexibly set in this manner, and thus, a large number of eNBs that constitute a large number of cells can be arranged flexibly in an area that needs extremely high-speed and high-capacity communication, such as the city center. This enables to construct a high-speed and high-capacity communication system.

Another method for solving the above-mentioned problem is disclosed. The same PCI is set in cells on which CA can be performed in the cells configured by the same eNB. The same PCI is set for the PCIs of the cells in which a part or the whole of the coverages overlap each other at different carrier frequencies. As a result, the PCI of SCell on which CA is performed becomes identical to the PCI of PCell. Therefore, it is not required to notify the UE of the PCI of SCell, and it is not required to notify the UE of the PCI of SCell on which CA is performed through RRC signaling. This enables to reduce a signaling amount.

The methods described above are not limited to the first embodiment but are applicable also to a second embodiment to a fifth embodiment described below, which may be appropriately used in combination. Besides, the methods described above are applicable to CA with the use of a conventional cell configuration.

Second Embodiment

The present embodiment discloses the method of associating the DL CC and UL CC in different frequency bands with each other for solving the problem described in the first embodiment.

TR 36.815 V9.1.0 (hereinafter, referred to as "Non-Patent Document 10" (Chapter 5.1.3)) by 3GPP describes that the DL CC and UL CC in different frequency bands are associated with each other but does not disclose a detailed method how to associate those with each other.

Further, R2-102260 (hereinafter, referred to as "Non-Patent Document 11") by 3GPP describes that a parameter "ul-CarrierFreq" of the SIB2 is used in a case where the UL CC is located in a frequency band different from that of the DL CC.

However, according to Non-Patent Document 8, the frequency band of uplink that is paired with the frequency band of downlink is predetermined in FDD, as described above. Therefore, association is performed in the predetermined frequency bands to be paired with each other in the conventional DL/UL link using the parameter "ul-CarrierFreq" of the SIB2. Specifically, the cell causes the SIB1 to include the frequency band information (freqncyBandIndicator) indicating the number of a pair of frequency band of downlink and the frequency band of uplink to be paired therewith and broadcasts the SIB1 to UEs being served thereby. Due to this frequency band information, the DL CC and UL CC configured in a cell are located in the predetermined frequency bands to be paired with each other.

Therefore, the DL CC and UL CC in different frequency bands cannot be associated with each other in the above-mentioned methods.

Therefore, in the present embodiment, in order to associate the DL CC and UL CC in different frequency bands with each other, a cell in which a resource for UL to be associated with a resource for DL is configured in a frequency band different from that of the resource for DL, and the cell is configured to broadcast the resource information for UL (uplink) to UEs being served thereby.

Figure 30:
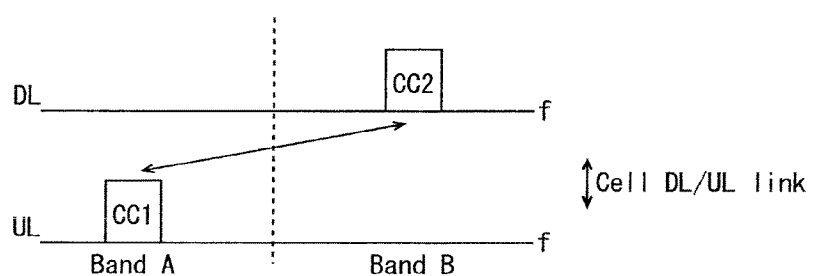
FIG. 30 is a diagram showing a cell in which a UL CC to be associated with a DL CC is configured in a different frequency band.

FIG. 30 is a diagram showing a cell in which a UL CC to be associated with a DL CC is configured in a different frequency band. In the cell shown in FIG. 30, a UL CC1 in a frequency band (band A) different from a corresponding predetermined frequency band (denoted by band B as in downlink) of uplink is associated with a DL CC2 in a frequency band (band B) of downlink. The resource information for UL to be associated with a resource for DL is shown in the DL/UL link information of a cell. The cell shown in FIG. 30 is equivalent to an asymmetrical cell.

The following five are disclosed as specific examples of the resource information for UL to be broadcast by a cell to UEs being served thereby; (1) frequency band in which a UL CC is located, (2) carrier frequency of a UL CC, (3) bandwidth of a UL CC, (4) raster frequency in a frequency band in which a UL CC is located, and (5) lower cut-off frequency of a frequency band in which a UL CC is located. Possible values thereof are determined in specifications and numbered in advance, which may be used as the numbers thereof.

In order to configure a UL CC to be associated with a DL CC in a different frequency band, the cell broadcasts, to UEs being served thereby, not only the frequency band information in which a DL CC is located but also the frequency band information in which a UL CC is located. This allows the UE to specify the carrier frequency of the UL CC. In addition, the cell may broadcast the frequency band information in which a UL CC is located to UEs being served thereby such that the UE judges whether or not to select, reselect, or camp on the cell in accordance with the capability thereof.

The frequency band information in which a DL CC is located may be included in the conventional frequency band information (freqncyBandIndicator), and a new parameter indicating the frequency band information in which a UL CC is located may be provided. This enables to reduce the number of parameters. The frequency band information in which a UL CC is located may be included in the SIB1 to be broadcast. As a result, the UE can obtain the frequency band information in which a DL CC is located and the frequency band information in which a UL CC is located from the same SIB, so that the process can be simplified and power consumption can be reduced.

The cell broadcasts the carrier frequency of a UL CC to be paired with a DL CC to UEs being served thereby, whereby the UE can specify the carrier frequency of the UL CC.

The cell broadcasts the bandwidth of the UL CC to be paired with the DL CC to UEs being served thereby, which allows the UE to specify the bandwidth of the UL CC.

The raster frequency being a possible value of a carrier frequency is determined per system. For example, in a case where a frequency band allocated to another system is used, the raster frequency of the frequency band may differ from the raster frequency in the LTE-A. Therefore, it suffices that a cell broadcasts a raster frequency in a frequency band in which a UL CC is located to UEs being served thereby.

The cell may broadcast the lower cut-off frequency of the frequency band in which a UL CC is located to UEs being served thereby. With the use of the above-mentioned information, the UE is capable of specifying the carrier frequency of the UL CC.

In the LTE, the UE derives the carrier frequency of a DL CC and the carrier frequency of a UL CC using a predetermined calculation equation (see Non-Patent Document 8). This method may be applied. The cell notifies the UE of the resource information for DL and the resource information for UL. The notification method may be broadcasting or dedicated RRC signaling, which is used depending on a situation. The UE receives the resource information for DL and the resource information for UL and derives the carrier frequency of the DL CC and the carrier frequency of the UL CC.

The resource information for DL includes the carrier frequency number (N_DL) of the DL CC, the lower cut-off frequency of the frequency band (FB_DL_1) in which a DL CC is located, the lower cut-off frequency number of the frequency band (N_DL_1) in which a DL CC is located, and the raster frequency (Fr_DL).

The resource information for UL includes the carrier frequency number (N_UL), of the above-mentioned UL CC, the lower cut-off frequency of the frequency band (FB_UL_) in which a UL CC is located, the lower cut-off frequency number of the frequency band (N_UL_1) in which a UL CC is located, and the raster frequency (Fr_UL).

The carrier frequency of the DL CC (F_DL) is derived using Equation (2) below.

$$F\_DL = FB\_DL\_1 + Fr\_DL \times (N\_DL - N\_DL\_1) \qquad (2)$$

The carrier frequency of the UL CC (F_UL) is derived using Equation (3) below.

$$F\_UL = FB\_UL\_1 + Fr\_UL \times (N\_UL - N\_UL\_1) \qquad (3)$$

This enables the UE to specify the carrier frequency of the DL CC and the carrier frequency of the UL CC.

The cell may notify all of the resource information for DL and the resource information for UL. Alternatively, the cell may notify a part of those values and the other part thereof may be predetermined in, for example, specifications.

The cell may cause the system information to include the resource information for UL. The system information may be the information of the MIB, SIB, or the like, and the cell may broadcast this information to UEs being served thereby. Accordingly, similar effects to those of the first embodiment in which the information indicating that a UL CC is not configured is broadcast over the MIB or SIB can be achieved. In a case in which the SIB contains the information indicating that a UL CC is not configured, this information may be included in the SIB1 or SIB2. This enables to achieve similar effects to those of the first embodiment described above.

Figure 32:
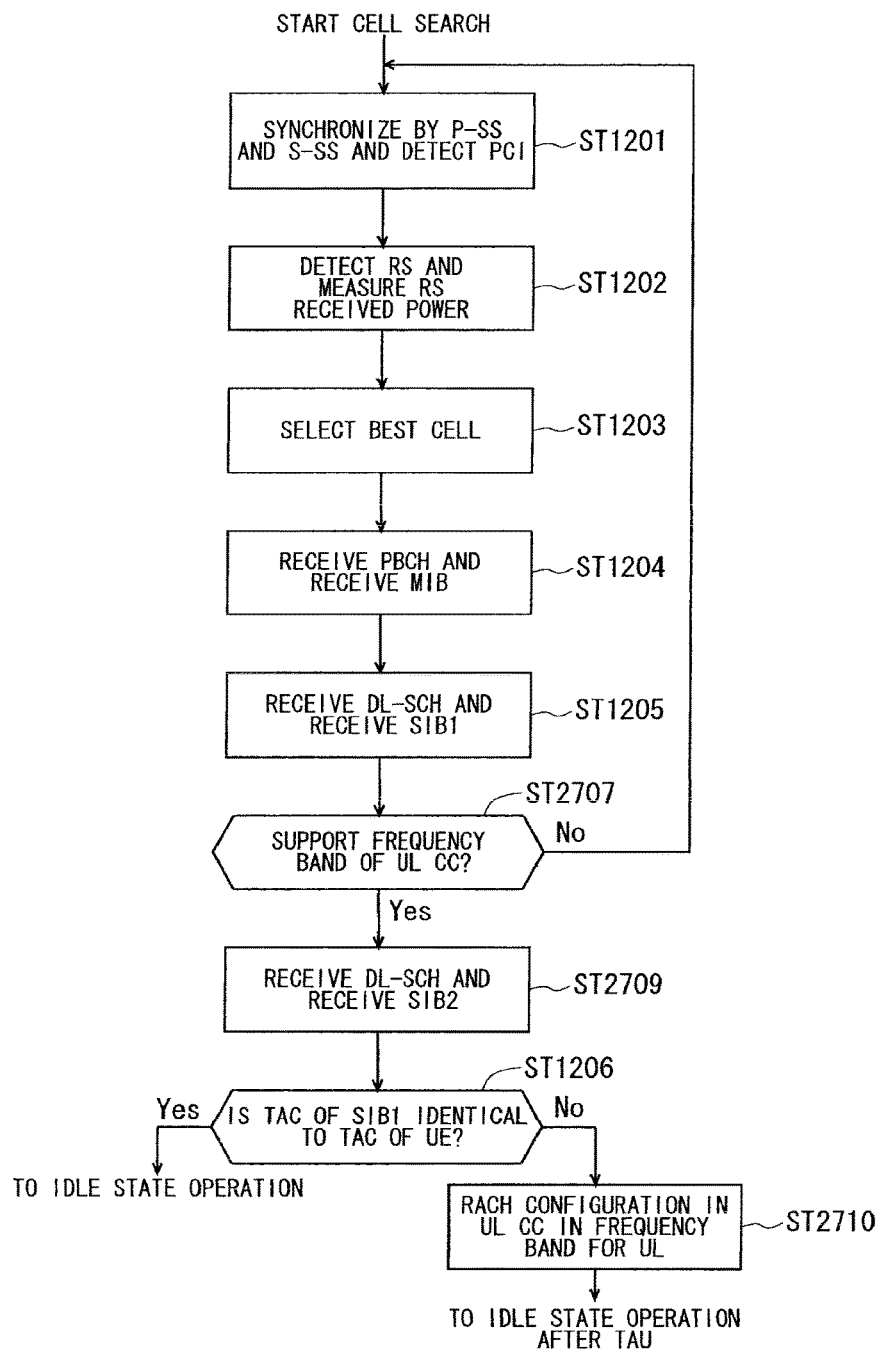
FIG. 32 is a flowchart showing a procedure by a UE in a case where a cell in which a DL CC and a UL CC are configured in different frequency bands is selected.

FIG. 31 is a flowchart showing a procedure by an eNB regarding the process of setting the system information (SI) of a cell. FIG. 32 is a flowchart showing a procedure by a UE in a case where a cell in which a DL CC and a UL CC are configured in different frequency bands is selected. The flowchart shown in FIG. 32 is similar to the flowchart of FIG. 12 described above, and the same steps are denoted by the same reference symbols and the common description is not given here.

An eNB sets the system information (SI) based on the UL CC configuration of the cell. In the flowcharts shown in FIG. 31 and FIG. 32, the resource information for UL to be set includes a frequency band in which a UL CC is located, a carrier frequency of the UL CC, and a bandwidth of the UL CC. The parameter for RACH configuration to be configured in the UL CC for uplink access is set in accordance with the above-mentioned information.

In Step ST2701 of FIG. 31, an eNB judges whether or not a UL CC is configured in a frequency band different from that of a DL CC in a cell. The eNB moves to Step ST2702 in a case of judging that a UL CC is configured in a different frequency band, or moves to Step ST2703 in a case of judging that a UL CC is not configured in a different frequency band.

In Step ST2702, the eNB sets a frequency band in which the UL CC is set as the frequency band information for UL, enters the frequency band into the SIB1, and moves to Step ST2703.

In Step ST2703, the eNB sets the UL CC carrier frequency information of the cell, enters the UL CC carrier frequency information into the SIB2, and moves to Step ST2704.

In Step ST2704, the eNB sets the UL CC frequency bandwidth information of the cell, enters the UL CC frequency bandwidth information into the SIB2, and moves to Step ST2705.

In Step ST2705, the eNB sets the parameter for RACH configuration of the cell, enters the parameter for RACH configuration into the SIB2, and moves to Step ST2706.

In Step ST2706, the eNB broadcasts the SIB1 to UEs being served by a cell. The SIB1 includes the frequency band information of a UL CC. The eNB moves to Step ST2708 after ending the process of Step ST2706.

In Step ST2708, the eNB broadcasts the SIB2 to UEs being served by the cell. The SIB2 includes the UL CC carrier frequency information, UL CC frequency bandwidth information, and parameter for RACH configuration. The eNB ends the entire procedure after ending the process of Step ST2708.

In Step ST1205 of FIG. 32, the UE that has selected the cell receives the SIB1 of the cell. In Step ST2707, the UE judges whether or not the UE supports the frequency band of a UL CC. Specifically, the UE first judges whether or not the SIB1 includes the frequency band information of a UL CC.

In a case of judging that the SIB1 does not include the frequency band information of a UL CC, the UE judges that the frequency band of a UL CC is the same frequency band as that of the DL CC, judges that the own UE is compatible with the frequency band of the UL CC, and moves to Step ST2709.

In a case of judging that the SIB1 includes the frequency band information of a UL CC, the UE recognizes the frequency band in which the UL CC of the cell is configured from the frequency band information of the UL CC, and judges whether or not the own UE supports this frequency band. In a case of judging that the own UE supports this frequency band, the UE moves to Step ST2709. In a case of judging that the own UE does not support this frequency band, the UE judges that uplink access cannot be made in this cell, and prohibits this cell from be selected, reselected, or camped on. Then, the UE removes this cell from candidate cells and returns to Step ST1201 again to perform cell search.

In Step ST2709, the UE receives the SIB2 of the cell and moves to Step ST1206. In Step ST1206, the UE judges whether or not the TAC of the SIB1 received in Step ST1205 is identical to the TAC of the own UE, to thereby judge whether or not the TAU is required. In a case of judging that the TAC of the SIB1 is identical to the TAC of the own UE, the UE judges that TAU is not required and enters the idle state operation. In a case of judging that the TAC of the SIB1 is not identical to the TAC of the own UE, the UE judges that TAU is required and moves to Step ST2710.

In Step ST2710, the UE derives the configuration of the UL CC of the frequency band for UL based on the frequency band for the UL CC, the UL CC carrier frequency, and the UL CC frequency bandwidth obtained through the reception of the SIB1 and SIB2 from the cell, and derives the RACH configuration in the UL CC based on the obtained parameter for RACH configuration. The UE performs uplink access based on this RACH configuration and initiates the TAU process. The UE enters the idle state operation after the TAU process.

Through the above, also in a case where a cell in which a DL CC and a UL CC are configured in different frequency bands and a UE having the capability of supporting the different frequency bands selects this cell, uplink access is allowed in the UL CC configured in a frequency band different from that of the DL CC. That is, the UE is allowed two-way communication in a cell in which a DL CC and a UL CC are configured in different frequency bands.

In a case where the carrier frequency (F_UL) of a UL CC is derived using Equation (3) above, it suffices that the eNB sets, in the system information, the carrier frequency number (N_UL) of a UL CC of the cell, the lower cut-off frequency (FB_UL_) of the frequency band in which a UL CC is located, the lower cut-off frequency number (N_UL_1) of the frequency band in which a UL CC is located, and that the raster frequency (Fr_UL), and the cell is configured to broadcast this system information to UEs being served thereby. The system information may be the MIB or SIB. For example, the eNB enters FB_UL_1 and Fr_UL into the SIB1, enters N_UL and N_UL_1 into the SIB2, and broadcasts those. This enables the UE that has received the system information from the cell to derive the carrier frequency (F_UL) of the UL CC.

For example, in a case of selecting or reselecting a cell in which a UL CC is configured in a frequency band different from that of a DL CC, a UE capable of transmission/reception in the same frequency band, such as a Release 8 or 9-compliant UE is not allowed uplink access. In a case where the UE selects or reselects a cell in which a UL CC is configured in a frequency band different from that of the DL CC in spite of the above, uplink access may be performed in this cell.

In order to suppress an increase of power consumption of a UE and an increase of interference with, for example, another system due to unnecessary uplink access, a UE capable of transmission/reception in only the same frequency band may be prohibited from selecting, reselecting, or camping on a cell in which a UL CC is configured in a frequency band different from that of a DL CC.

The following two are disclosed as the method of prohibiting a UE capable of transmission/reception in only the same frequency band from selecting, reselecting, or camping on the cell; (1) using frequency band information in which a UL CC of a cell is located, and (2) using cell barred information.

A specific example of the method of (1) using frequency band information in which a UL CC of a cell is located is disclosed. In a case where the frequency band information in which a UL CC of a cell is located shows that a UL CC is configured in a frequency band different from that of a DL CC, a UE capable of transmission/reception in only the same frequency band is prohibited from selecting, reselecting, or camping on that cell. This may be determined in, for example, specifications in a static manner. The UE is capable of judging whether or not the cell is prohibited from being selected, reselected, or camped on from the frequency band information in which a UL CC of a cell is located.

A specific example of the method of (2) using cell barred information is disclosed. A parameter indicating cell barred information may be provided. Cellbarred may be used as the parameter indicating cell barred information. A cell in which a UL CC is configured in a frequency band different from that of a DL CC sets the information indicating being barred in CellBarred. CellBarred is broadcast to UEs being served by the cell as system information. CellBarred may be included in the SIB1 to be broadcast.

In a case where the received CellBarred is the information indicating being barred, the UE is prohibited from selecting, reselecting, or camping on that cell. This enables the UE to judge, from a parameter indicating CellBarred of a cell, whether or not the UE is prohibited from selecting, reselecting, or camping on that cell.

The method using the cell barred information is in accordance with the conventional CellBarred method, where it is not required to separately predetermine the cell barred information in specifications or the like in a static manner. Further, this method is in accordance with the conventional CellBarred method, and accordingly, is also applicable to a case where a UE capable of transmission/reception in only the same frequency band, for example, a Release 8 or 9-compliant UE cannot obtain the information newly provided in the present embodiment, such as the frequency band information in which a UL CC of a cell is located.

In a case of the method using the above-mentioned cell barred information, however, if a UL CC is configured in a frequency band different from that of a DL CC in a cell, a UE capable of transmission/reception with the use of the DL CC and UL CC located in the different frequency bands is also barred.

In order to solve this problem, it suffices to set whether or not a cell is barred in accordance with the UE capability. For example, the class of the UE capability of transmission/reception in only the same frequency band and the class of the UE capability of transmission/reception in the different frequency bands are provided. Setting is made using a conventional Cellbarred parameter for the class of the UE capability of transmission/reception in only the same frequency band, whereas a new CellBarred parameter is provided for the class of the UE capability of transmission/reception in different frequency bands.

For example, the CellBarred parameter for the class of the UE capability of transmission/reception in different frequency bands is set to "CellBarred-inter". The cell in which a UL CC is configured in a frequency band different from that of a DL CC sets, to the parameter "CellBarred-inter", the information indicating whether or not a UE capable of transmission/reception in different frequency bands is barred. For example, "barred" is set in the parameter "CellBarred-inter" in a case where a UE capable of transmission/ reception in different frequency bands is barred, whereas "notbarred" is set in the parameter "CellBarred-inter" in a case where the UE is not barred.

The parameter "CellBarred-inter" is broadcast to UEs being served by a cell as the system information. Specifically, the parameter "CellBarred-inter" may be contained in the SIB1 to be broadcast. This enables a UE to receive the parameter "CellBarred-inter" in a similar procedure to that of the conventional CellBarred.

The cell in which a UL CC is configured in a frequency band different from that of a DL CC sets "barred" in the conventional Cellbarred parameter for the class of the UE capability of transmission/reception in only the same frequency band, and sets the information indicating that a UE capable of transmission/reception in different frequency band is not barred (notbarred) in parameter "CellBarred-inter". Through the above-mentioned setting, it is possible to prohibit a UE capable of transmission/reception in only the same frequency band from selecting, reselecting, or camping on that cell. Besides, a UE capable of transmission/reception in different frequency bands can select, reselect, or camp on that cell. In this manner, an appropriate process can be executed in accordance with the UE capability.

Figure 33:
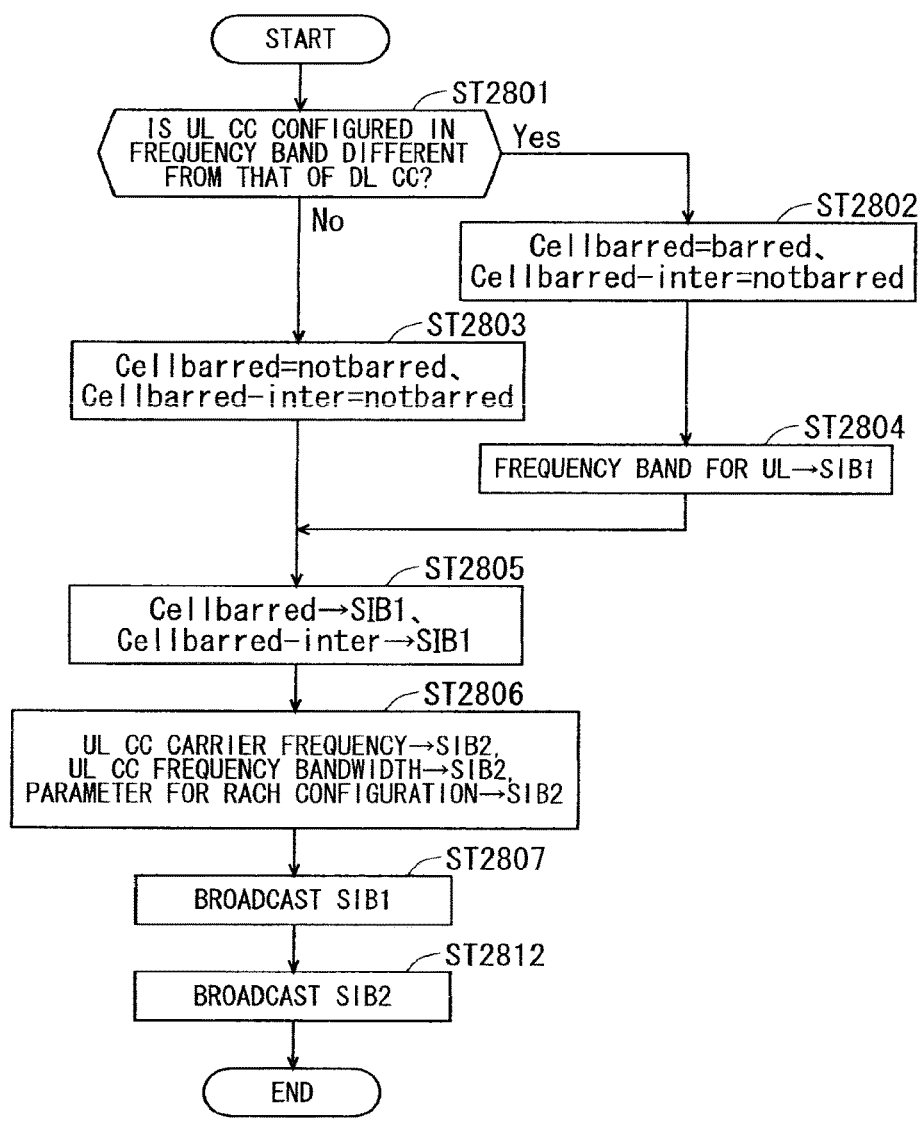
FIG. 33 is a flowchart showing a procedure by an eNB regarding the process of setting the system information (SI) of a cell in a case where the cell barred information is used.
Figure 34:
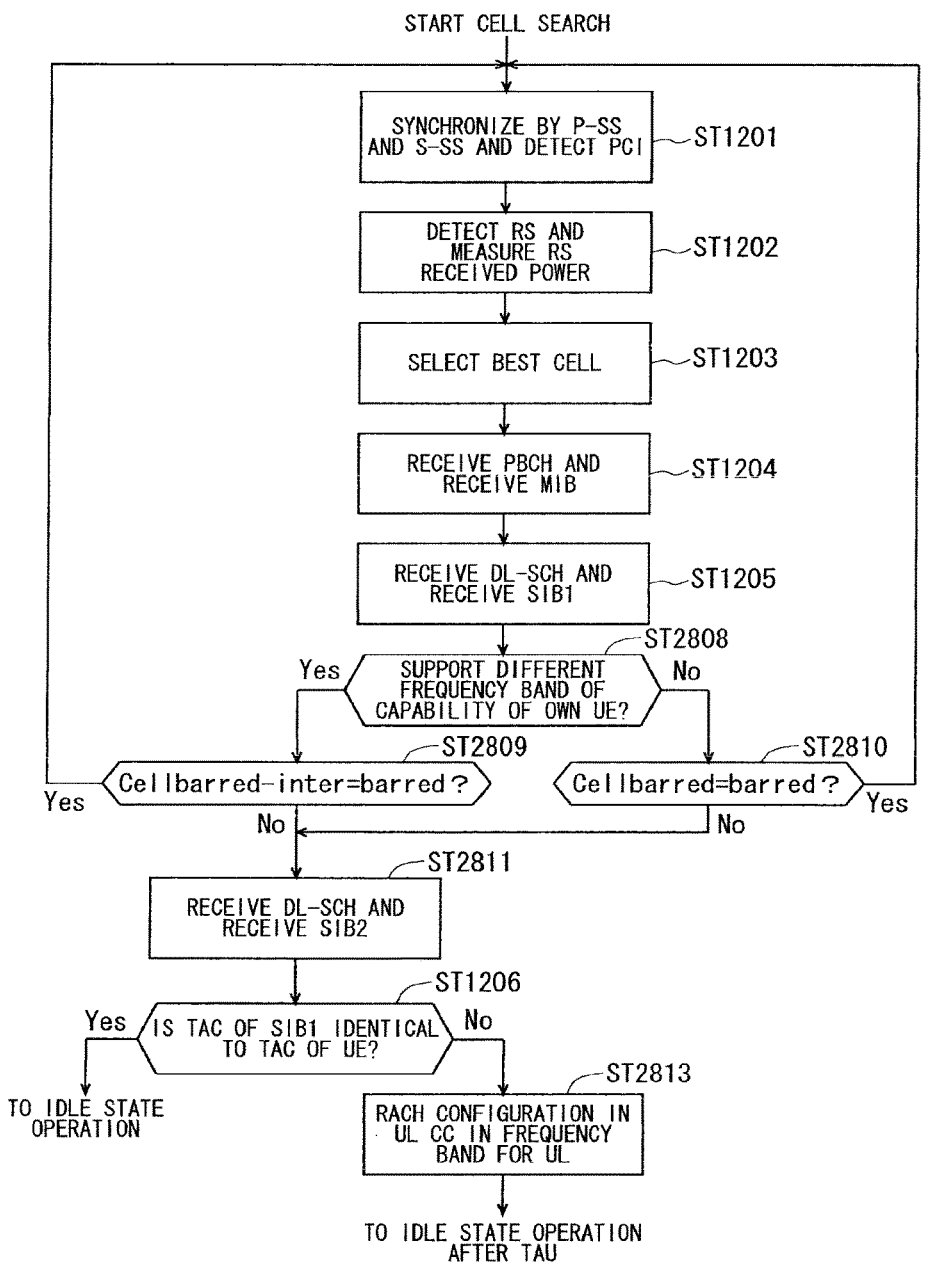
FIG. 34 is a flowchart showing a procedure by a UE regarding the process of prohibiting a UE from selecting, reselecting, or camping on a cell in which a UL CC is configured in a frequency band different from that of a DL CC in a case where the cell barred information is used.

FIG. 33 is a flowchart showing a procedure by an eNB regarding the process of setting the system information (SI) of a cell in a case where the cell barred information is used. FIG. 34 is a flowchart showing a procedure by a UE regarding the process of prohibiting a UE from selecting, reselecting, or camping on a cell in which a UL CC is configured in a frequency band different from that of a DL CC in a case where cell barred information is used. The flowchart shown in FIG. 34 is similar to the flowchart of FIG. 12 described above, and the same steps are denoted by the same reference symbols and the common description is not given here.

The eNB sets the system information (SI) based on the configuration of the UL CC of a cell. In the flowcharts shown in FIG. 33 and FIG. 34, as in the flowcharts shown in FIG. 31 and FIG. 32, the resource information for UL to be set includes a frequency band in which a UL CC is located, a carrier frequency of a UL CC, and a bandwidth of a UL CC. The eNB sets the parameter for RACH configuration to be configured in the UL CC for uplink access in accordance with the above-mentioned information.

In Step ST2801 of FIG. 33, the eNB judges whether or not a UL CC is configured in a frequency band different from that of a DL CC, that is, in a different frequency band in a cell. The eNB moves to Step ST2802 in a case of judging that a UL CC is configured in a different frequency band or moves to Step ST2803 in a case of judging that a UL CC is not configured in a different frequency band.

In Step ST2802, the eNB sets "barred" indicating being barred in "Cellbarred" and sets "notbarred" indicating not being barred in "Cellbarred-inter", to thereby move to Step ST2804.

In Step ST2803, the eNB sets "notbarred" indicating not being barred in "Cellbarred" and sets "notbarred" indicating not being barred in "Cellbarred-inter", to thereby move to Step ST2805.

In Step ST2804, the eNB sets a frequency band in which the UL CC is configured as the frequency band information for UL, and enters the frequency band into the SIB1, to thereby move to Step ST2805.

In Step ST2805, the eNB causes the SIB1 of the cell to include the Cellbarred information and Cellbarred-inter information, and moves to Step ST2806.

In Step ST2806, the eNB sets the UL CC carrier frequency information, UL CC frequency bandwidth information, and parameter for RACH configuration of the cell and enters those into the SIB2, to thereby move to Step ST2807.

In Step ST2807, the eNB maps the SIB1 to the PDSCH of the DL CC and broadcasts the SIB1 to UEs being served thereby. The SIB1 includes Cellbarred, Cellbarred-inter, and frequency band information for UL. The eNB moves to Step ST2812 after ending the process of Step ST2807.

In Step ST2812, the eNB broadcasts the SIB2 to UEs being served by a cell. The SIB2 includes the UL CC carrier frequency information, UL CC frequency bandwidth information, and parameter for RACH configuration. The eNB ends the entire procedure after ending the process of Step ST2812.

In Step ST1205 of FIG. 34, the UE that has selected a cell in which the system information is set as described above receives the DL-SCH to be mapped to the PDSCH of the cell and receives the SIB1.

Next, in Step ST2808, the UE judges whether or not the own UE supports a different frequency band, specifically, whether or not uplink access is allowed in a UL CC configured in a frequency band different from that of a DL CC from the capability of the own UE. The UE judges that it supports a different frequency band and moves to Step ST2809 in a case of judging that uplink access is allowed, or judges that the own UE does not support a different frequency band and moves to Step ST2810 in a case of judging that uplink access is not allowed.

In Step ST2809, the UE judges whether or not the cell is barred, that is, whether or not "Cellbarred-inter" is "barred" from Cellbarred-inter included in the SIB1. In a case of judging that "Cellbarred-inter" is "barred" in Step ST2809, the UE judges that it is prohibited from selecting, reselecting, or camping on the cell. Then, the UE removes this cell from candidate cells and returns to Step ST1201 again to perform cell search. In a case of judging that "Cellbarred-inter" is not "barred", that is, "notbarred" in Step ST2809, the UE judges that is can select, reselect, or camp on that cell and moves to Step ST2811.

In Step ST2810, the UE judges whether or not the cell is barred, that is, whether or not "Cellbarred" is "barred" from Cellbarred included in the SIB1. In a case of judging that "Cellbarred" is "barred" in Step ST2810, the UE judges that it is prohibited from selecting, reselecting, or camping on this cell, and removes this cell from candidate cells. Then, the UE returns to Step ST1201 again and performs cell search. In a case of judging that "Cellbarred" is not "barred", that is, is "notbarred" in Step ST2810, the UE judges that it can select, reselect, or camp on the cell and moves to Step ST2811.

In Step ST2811, the UE receives the SIB2 of the cell and moves to Step ST1206. In Step ST1206, the UE judges whether or not the TAC of the SIB1 received in Step ST1205 is identical to the TAC of the own UE, to thereby judge whether or not TAU is required. In a case of judging that the TAC of the SIB1 is identical to the TAC of the own UE, the UE judges that TAU is not required and enters the idle state operation. In a case of judging that the TAC of the SIB1 is not identical to the TAC of the own UE, the UE judges that TAU is required and moves to Step ST2813.

In Step ST2813, the UE derives the configuration of the UL CC of the frequency band for UL based on the frequency band for UL CC, UL CC carrier frequency, and UL CC frequency bandwidth obtained through the reception of the SIB1 and SIB2 from the cell, and derives the RACH configuration in the UL CC based on the obtained parameter for RACH configuration. Then, the UE performs uplink access based on this RACH configuration and initiates the TAU process. After the TAU process, the UE enters the idle state operation.

Through the above, it is possible to set the cell barred information in which a UL CC is configured in a frequency band different from that of a DL CC in accordance with the UE capability. With this method, a UE capable of transmission/reception in only the same frequency band is barred and a UE capable of transmission/reception in different frequency bands is not barred, which prevents the UE capable of transmission/reception in only the same frequency band from performing unnecessary uplink access in that cell. Therefore, it is possible to prevent an increase of power consumption of a UE and an increase of interference with, for example, another system.

As another example, the class of the UE capability may be provided depending on the release supported by a UE. The class of the UE capability compatible with the releases before Release 9 and the class of the UE capability compatible with the releases after Release 10 may be provided. Setting may be made using the conventional Cellbarred parameter for the class of the UE capability compatible with the releases before Release 9, and a new CellBarred parameter may be provided for the class of the UE capability compatible with the releases after Release 10. This also enables to achieve similar effects to those of the above-mentioned example.

In a case where a UE capable of transmission/reception in only the same frequency band is prohibited from selecting, reselecting, or camping on a cell in which a UL CC is configured in a frequency band different from that of a DL CC, as in the above-mentioned method, such a problem arises that the UE cannot select, reselect, or camp on that cell though communication is allowed with that cell in a case where the UE requires only downlink communication.

In order to solve this problem, in a cell in which a UL CC is configured in a frequency band different from that of a DL CC, a UE capable of transmission/reception in only the same frequency band is prohibited from uplink access and is prohibited from selecting, reselecting, or camping on that cell.

The following three are disclosed as the method of prohibiting uplink access to that cell; (1) using the frequency band information in which a UL CC of a cell is located, (2) using the information for stochastically prohibiting access, and (3) using the information indicating whether or not access is prohibited.

A specific example of the method of (1) using the frequency band information in which a UL CC of a cell is located is disclosed. In a case where the frequency band information in which a UL CC of a cell is located shows that a UL CC is configured in a frequency band different from that of a DL CC, a UE capable of transmission/reception in only the same frequency band is prohibited from accessing the cell or does not access the cell. This may be predetermined in, for example, specifications in a static manner. The UE is capable of judging, from the frequency band information in which a UL CC of a cell is located, whether or not the UE is prohibited from accessing that cell or does not access that cell.

A specific example of the method of (2) using the information for stochastically prohibiting access is disclosed. A parameter indicating the information for stochastically prohibiting access may be provided. Access class barring (ACB) may be used as the parameter indicating the information for stochastically barring access. It suffices that the access class of the UE capable of transmission/reception in only the same frequency band is provided and an ACB factor (ac-BarringFactor) for determining a barring probability of that access class is set to "0", to thereby disable access. In a case where the ACB factor is "0", access is always barred.

The cell broadcasts the ACB factor to UEs being served thereby. A UE capable of transmission/reception in only the same frequency band is prohibited from accessing the cell or does not access the cell in a case where the ACB factor of the access class of the own UE is "0". A UE capable of transmission/reception in only the same frequency band is capable of judging whether or not it is prohibited from accessing the cell or does not access the cell from the ACB factor of the access class.

This method is compatible with the conventional ACB method, which is not required to be separately predetermined in, for example, specifications. In addition, this method is compatible with the conventional ACB method, and thus is applicable also to a case in which, for example, a Release 8 or 9-compliant UE cannot obtain the information newly provided in the present embodiment, such as the DL/UL link information of a cell.

A specific example of the method of (3) using the information indicating whether or not access is prohibited is disclosed. A parameter indicating the information indicating whether or not access is prohibited may be provided. The parameter indicating the information indicating whether or not access is prohibited is, for example, "Ac-barringForIntrafbandUE". The information indicating whether or not access is prohibited is shown by two values "1" and "0", where access is prohibited in a case of "1" and access is not prohibited in a case of "0". Accordingly, a cell can explicitly notify a UE capable of transmission/reception in only the same frequency band of whether or not access is prohibited. A UE capable of transmission/reception in only the same frequency band can judge whether or not it is prohibited from accessing the cell or does not access the cell from the information indicating whether or not access is prohibited.

According to the method disclosed in the present embodiment as described above, an eNB and a UE communicate with each other using an asymmetrical cell being a cell including a resource for DL and a resource for UL included in a frequency band different from that of the resource for DL. This eliminates the need to always reserve a resource for UL in the same frequency band as that of the resource for DL in a communication system. This enables to allocate a resource for UL that becomes unnecessary to another cell, another operator, another system, or the like. Therefore, it is possible to improve the use efficiency of frequency resources.

The present embodiment discloses the method of enabling to perform CA on a CA-compliant UE using the cell in which a UL CC is configured in a frequency band different from that of a DL CC. As this method, in the present embodiment, it is allowed to configure a UL CC in a frequency band different from that of a DL CC also in a DL/UL link through dedicated RRC signaling. This enables DL/UL link via frequency bands for a UE and enables to perform CA on a cell configured in frequency bands different between the DL CC and UL CC.

As the method for DL/UL link through dedicated RRC signaling, a UE may be individually notified of the information regarding a UL CC to be linked. As a specific example of the information regarding a UL CC, the information described as a specific example of the resource information for UL is applicable.

FIG. 35 is a diagram for describing cells for use in CA in the second embodiment of the present invention. A cell1 is configured by a DL CC1 and a UL CC1 in the same frequency band, that is, in a band A. The carrier frequency of the UL CC1 to be associated with the DL CC1 is shown in the DL/UL link information of the cell1. A cell2 is configured by a DL CC2 and a UL CC2 in a frequency band different from that of the DL CC2. The DL CC2 is located in a frequency band B (band B) and the UL CC2 is located in the frequency band A (band A). The resource information for UL such as the frequency band and carrier frequency of the UL CC2 to be associated with the DL CC2 is shown in the DL/UL link information of the cell2. The cell2 is equivalent to an asymmetrical cell.

FIG. 36 is a diagram showing an example of a sequence of CA in a case where a cell in which a DL CC and a UL CC are configured in different frequency bands is used. The sequence shown in FIG. 36 is similar to the sequence of FIG. 29, and the same steps are denoted by the same reference symbols and the common description is not given here.

In the present embodiment, it is determined in Step ST2504 that CA is performed on the cell2 for a UE, and then, the process of Step ST3001 is performed. In Step ST3001, the cell1 notifies the UE of an RRC connection reconfiguration message for CA. The RRC connection reconfiguration message contains the information of the cell2 being a serving cell on which CA is performed, specifically, the information indicating the addition of the DL CC2, the system information regarding the cell2, the information regarding the UL CC (here, UL CC2) to be associated with the DL CC2, and the resource information of the UL CC2, for example, the frequency band information and the carrier frequency information of the UL CC2.

The UE that has received the RRC connection reconfiguration message prepares for the CA process on the cell1 and the cell2 and, in Step ST3002, notifies the cell1 of an RRC connection reconfiguration complete message.

The cell1 or eNB that has received the RRC connection reconfiguration complete message performs CA on the cell2 in addition to the cell1. The cell1 serves as PCell.

In Step ST3003, downlink communication and uplink communication are performed between the UE and the cell1. In Step ST3004, downlink communication and uplink communication are performed between the UE and the cell2.

The downlink communication and uplink communication of Step ST3003 are performed using the DL CC1 and UL CC1.

The downlink communication and uplink communication of Step ST3004 are performed using the DL CC2 and UL CC2. The uplink control information for the downlink data of the cell2, for example, the CQI for downlink data and Ack/Nack for downlink data may be transmitted by the UE using the UL CC1 of the cell1 in a case where there is no uplink data or may be transmitted by the UE using the UL CC2 of the cell2. Whether transmission is performed in the PCell or is performed per serving cell may be predetermined in, for example, specifications.

According to the CA method disclosed in the present embodiment, asymmetrical CA is allowed without reserving a resource for UL in the same frequency band as that of a resource for DL in a communication system. This enables to allocate needless resource for UL to another cell, another operator, another system, or the like. Therefore, the use efficiency of frequency resources can be improved.

In a case where a cell in which a UL CC is configured in a frequency band different from that of a DL CC is used in CA, only the DL CC of the cell may be configured for CA, and the UL CC associated with this DL CC may not be configured for CA. In this case, by the DL/UL link (UE specific link) through dedicated RRC signaling, a UE for which CA is performed may be notified of the information that the DL CC of the cell is a resource for DL for CA, and the information indicating that there is no configuration of a UL CC to be associated with this DL CC.

This enables to use a UL CC configured by the DL/UL link of this cell as a resource for UL of another UE. Accordingly, it is possible to further improve the use efficiency of frequency resources.

While the CA in which the cell1 serves as PCell has been described with reference to FIG. 36, CA in which the cell2 serves as Pcell is also allowed over the method disclosed in the present embodiment.

In this case, similarly in the case where the cell1 serves as PCell, the UE camps on the cell2 in which a UL CC is configured in a frequency band different from that of a DL CC, performs RRC connection with the cell2, and is notified of the information of the cell1 being a serving cell in which CA is performed in the RRC connection reconfiguration message from the cell2. Specifically, the information of the cell1 that is notified from the cell2 includes the information indicating the addition of the DL CC1, the system information regarding the cell1, the information regarding a UL CC (here, UL CC1) to be associated with the DL CC1, the resource information of the UL CC1, for example, the frequency band information and the carrier frequency information of the UL CC1.

Through the above, a cell such as the cell2 in which a DL CC and a UL CC are configured in different frequency bands is caused to serve as PCell. This increases a possibility that a cell having higher communication quality will be selected in cell selection by a UE. Further, frequency resources can be used more flexibly.

First Modification of Second Embodiment

In the present modification, the configuration is made such that for allowing more flexible use of frequencies over different frequency bands, at least one cell in which a resource for UL is configured in a frequency band different from that of a resource for DL is located and one or more cells configured by the resource for UL and another resource for DL different from the above-mentioned resource for DL are located. The cell notifies UEs being served thereby of the resource information for UL using each resource for DL.

FIG. 37 is a diagram showing the concept of two cells which are configured by associating the same UL CC with two DL CCs in different frequency bands.

A cell1 is configured by a DL CC1 and a UL CC1 in the same frequency band, specifically, in a band A. The carrier frequency of the UL CC1 to be associated with the DL CC1 is shown in the DL/UL link information of the cell1. A cell2 is configured by a DL CC2 and a UL CC1 in a frequency band different from that of the DL CC2. The DL CC2 is located in a frequency band B (band B). The resource information for UL such as the frequency band and carrier frequency of the UL CC1 to be associated with the DL CC2 are shown in the DL/UL link information of the cell2. The cell1 is equivalent to a symmetrical cell, whereas the cell2 is equivalent to an asymmetrical cell.

The resource information and RACH configuration of the UL CC1 shown in the cell1 and the resource information and RACH configuration of the UL CC1 shown in the cell2 may be identical to each other or different from each other. For example, the frequency bandwidth of the UL CC1 may be varied. Alternatively, the RACH configuration configured in the UL CC1 may be varied. It is possible to set an optimum resource for UL per cell by varying the frequency bandwidth and the RACH configuration.

As the method in which a cell broadcasts the resource information for UL using the resource for DL to UEs being served thereby, the methods disclosed in the second embodiment above are applicable, and similar effects to those of the second embodiment can be achieved. Further, in a cell in which a resource for DL and a resource for UL are configured in the same frequency band, the conventional method of notifying a frequency band over the SIB1 or the conventional method of notifying the DL/UL link via SIB2 is applicable. The methods disclosed in the second embodiment above are applicable as the method of limiting access, CA method, and the like.

FIG. 38 is a diagram showing an example of a sequence of CA in a case where two cells are configured by associating the same UL CC with two DL CCs in different frequency bands. FIG. 38 shows a case in which a UE camps on the cell1. The sequence shown in FIG. 38 is similar to the sequence of FIG. 29, and the same steps are denoted by the same reference symbols and the common description is not given here.

As described in Non-Patent Document 1 above, in the current specifications, each resource for UL belongs to only one serving cell for one UE. Therefore, in a case of the configuration as shown in FIG. 37, such a problem arises that the UL CC1 cannot take both of the cell1 and the cell2 as serving cells in CA. In order to solve this problem, it suffices that the configuration of the UL CC corresponding to any one of DL CCs is not provided by a UE specific link.

In the present modification, in Step ST2504 of FIG. 38, the eNB or cell1 determines to perform CA on the cell2 for the UE. Here, it suffices that the eNB or cell1 makes a decision in consideration of whether or not the UL CC of the cell2 is identical to the UL CC of the cell1. Here, the UL CC of the cell2 is identical to the UL CC of the cell1, and thus the eNB or cell1 determines to perform CA on only the DL CC2 of the cell2.

In Step ST3201, the cell1 notifies the UE of an RRC connection reconfiguration message for CA. The RRC connection reconfiguration message contains the information of the cell2 being a serving cell on which CA is performed, specifically, contains the information indicating the addition of the DL CC2, the system information regarding the cell2, the information indicating that a UL CC is not configured, and the like.

The UE that has received the RRC connection reconfiguration message prepares for the CA process on the cell1 and the DL CC2 and, in Step ST3202, notifies the cell1 of the RRC connection reconfiguration complete message.

The cell1 or eNB that has received the RRC connection reconfiguration complete message performs CA on the DL CC2 in addition to the cell1. The cell1 serves as PCell.

In Step ST3203, downlink communication and uplink communication are performed between the UE and the cell1. In Step ST3204, downlink communication is performed between the UE and the DL CC2.

The downlink communication and uplink communication of Step ST3203 are performed using the DL CC1 and the UL CC1. The downlink communication of Step ST3204 is performed using the DL CC2. That is, downlink communication is performed using the cell1 and the cell2, and uplink communication is performed using the cell1. The UE transmits the uplink control information for downlink data of the cell2, for example, the CQI for downlink data, Ack/Nack for downlink data, and the like, using the cell1 in which a UL CC is configured.

The above-mentioned method enables CA also in a case where two cells are configured by associating the same UL CC with two DL CCs in the different frequency bands by a DL/UL link of a cell. Accordingly, the frequency resource can be used more flexibly.

FIG. 39 is a diagram showing another example of the sequence of CA in the case where two cells are configured by associating the same UL CC with two DL CCs in different frequency bands. Differently from FIG. 38, FIG. 39 shows the case in which the UE camps on the cell2.

In Step ST3301, the UE that has camped on the cell2 notifies the cell2 of an RRC connection request. The cell2 is allowed uplink access because the UL CC1 is configured therein.

In Step ST3302, the cell2 notifies the UE of an RRC connection setup message. In Step ST3303, the UE that has received the RRC connection setup message and performed the setup process for RRC connection notifies the cell2 of the RRC connection setup complete message.

In Step ST3304, the eNB or cell2 determines to perform CA on the cell1 for the UE. Here, it suffices that the eNB or cell2 makes a decision in consideration of whether or not the UL CC of the cell1 is identical to the UL CC of the cell2. In this case, the UL CC of the cell1 is identical to the UL CC of the cell2, and thus, the eNB or cell2 determines to perform CA on only the DL CC1 of the cell1.

In Step ST3305, the cell2 notifies the UE of an RRC connection reconfiguration message for CA. The RRC connection reconfiguration message contains the information of the cell1 being a serving cell on which CA is performed, specifically, contains the information indicating the addition of the DL CC1, the system information regarding the cell1, the information indicating that a UL CC is not configured, and the like.

The UE that has received the RRC connection reconfiguration message prepares for the CA process on the cell2 and the DL CC1 and, in Step ST3306, notifies the cell2 of an RRC connection reconfiguration complete message.

The cell2 or eNB that has received the RRC connection reconfiguration complete message performs CA on the DL CC1 in addition to the cell2. The cell2 serves as PCell.

In Step ST3307, downlink communication and uplink communication are performed between the UE and the cell2. In Step ST3308, downlink communication is performed between the UE and the DL CC1.

The downlink communication and uplink communication of Step ST3307 are performed using the DL CC2 and the UL CC1.

The downlink communication of Step ST3308 is performed using the DL CC1. The UE transmits the uplink control information for downlink data of the cell1, for example, the CQI for downlink data and Ack/Nack for downlink data, and the like, using the cell2 in which a UL CC is configured.

This enables to achieve similar effects to those in the case of the sequence shown in FIG. 38 described above. Besides, the UE can perform CA on whichever cell it camps, which increases the possibility that a UE may select a cell with a link of excellent communication quality.

With the use of the methods disclosed in the first embodiment and the second embodiment as described above, in a case where a frequency band for downlink and a frequency band for uplink to be paired therewith have been configured, it is possible to efficiently use frequency resources so as not to cause unused carrier frequency.

The methods disclosed in the first embodiment to the first modification of the second embodiment may be appropriately combined with each other. This allows flexible use of frequency resources, and thus, use efficiency of frequency resources can be more increased.

Third Embodiment

The present embodiment discloses the configuration of a frequency band for allowing more efficient use of frequency resources. In the present embodiment, a frequency band configured by one or more resources for DL without a resource for UL to be associated therewith.

FIG. 40 is a diagram showing the concept of the frequency band configured by one or more resources for DL without a resource for UL to be associated therewith. The DL CC1 and DL CC2 are configured in the frequency band for downlink A as resources for DL. The lower cut-off frequency ($F_{DL\_low}$) of the frequency band for downlink A is FB_DL_1, and the upper limited frequency ($F_{DL\_high}$) thereof is FB_DL_h. There is no configuration of a UL CC being a resource for UL to be associated with the DL CC1. That is, there is no UL CC configured by the DL/UL link of the cell of the DL CC1. Similarly, there is no configuration of the UL CC being a resource for UL to be associated with the DL CC2. That is, there is no UL CC configured by the DL/UL link of the cell of the DL CC2.

The frequency band for downlink A is configured by one or more resources for DL without a resource for UL to be associated therewith. In other words, one or more resources for DL without a resource for UL are configured in the frequency band for downlink A. The one or more resources for DL are the DL CC1 and DL CC2 in this case. In this manner, the frequency band for downlink A includes resources for DL but does not include a resource for UL.

The resources for DL may be contiguous or non-contiguous, or may have different bandwidths. There is no resource for UL, which means that a frequency band for uplink corresponding to a frequency band for downlink is not required. This enables to configure a frequency band for downlink in which a frequency band for uplink to be paired therewith is not configured.

FIG. 41 is a diagram showing a setting example of a frequency band configured by one or more resources for DL without a resource for UL to be associated therewith. There is no frequency band for uplink (UL operating band) as the frequency band (band) A. There exists a frequency band for downlink (DL operating band), and the lower cut-off frequency ($F_{DL\_low}$) and the upper limited frequency ($F_{DL\_high}$) thereof are set as FB_DL_1 and FB_DL_h, respectively. Only the frequency band for downlink is set as a frequency band, and a frequency band for uplink is not set. This is effective in a case where the configuration of a frequency band is predetermined.

Through the above, only a frequency band for downlink is required as an actual frequency resource. This eliminates the need to allocate a frequency band for uplink as an actual frequency resource and reserve the frequency band for uplink, though there is no use of the frequency band for uplink. Therefore, also in a case where, for example, there is one narrow-band frequency resource, it is possible to configure a frequency band for downlink only. This allows efficient use of frequency resources in a case where there are discrete and narrow-band frequency resources.

In a case of the frequency band for downlink disclosed in the present embodiment, the DL/UL link information of a cell may be reduced in a DL CC configured in that band. In addition, the DL/UL link information of the cell is not required to be broadcasted UEs being served by the cell. The frequency band for downlink is shown in the DL CC configured in the band, specifically, is included in the SIB1. In a case where the configuration of a frequency band is predetermined in, for example, specifications as shown in FIG. 41, a UE can recognize the configuration in advance.

Therefore, even if not having received the DL/UL link information of a cell from that cell, a UE can recognize the configuration of a frequency band in which that cell is configured, and can recognize that a frequency band for uplink is not configured in that frequency band. This enables to recognize that there is no UL CC to be associated with a DL CC of that cell. As a result, the system information of a cell can be reduced, which enables to reduce a signaling amount from a cell to a UE.

Fourth Embodiment

The first embodiment has disclosed the method of providing a cell configured by only a resource for DL without a resource for UL to be associated with the resource for DL. In the present embodiment, a cell configured by only a resource for UL without a resource for DL to be associated with the resource for UL is provided.

FIG. 42 is a diagram showing the concept of a cell configured by only a UL CC without a DL CC to be associated with the UL CC. The cell shown in FIG. 42 is a cell including only a UL CC without a DL CC to be associated with the UL CC1, which is a cell in which only a resource for UL is reserved. That is, the cell shown in FIG. 42 does not include a DL CC to be associated with a UL CC by the DL/UL link of the cell. With the cell configuration as described above, communication in only uplink can be performed in that cell, which is effective. The cell shown in FIG. 42 is equivalent to a non-associated cell.

In the LTE, the UE cannot perform uplink access in a cell in which a DL CC being a resource for DL is not configured. The UE cannot perform communication in the cell. In the first place, there is no cell in which a DL CC is not configured in the LTE.

Therefore, disclosed below is a method in which a UE having the capability of supporting CA is allowed communication with a cell in which a DL CC is not configured. That cell may be used as a cell for CA (serving cell). On that occasion, CA may be performed such that at least one serving cell in which a DL CC is configured is included. The downlink access is allowed with a serving cell in which a DL CC is configured, which allows a UE to perform communication.

The eNB may notify the UE of the system information regarding the serving cell including only a UL CC, downlink control information, uplink scheduling information, HARQ for uplink data, and the like, using the serving cell in which a DL CC is configured.

This allows an eNB to use a cell in which a DL CC is not configured for the communication with a UE.

In this case, a cell in which a DL CC is not configured may be prohibited from serving as PCell. This is because a DL CC is required for PCell. A UE does not normally select or reselect a cell in which a DL CC is not configured, and thus, that cell does not serve as PCell. Accordingly, it is not particularly required to explicitly prohibit that cell from serving as PCell.

FIG. 43 is a diagram for describing cells for use in CA in the fourth embodiment of the present invention. A cell1 is configured by a DL CC1 and a UL CC1. The carrier frequency of the UL CC1 to be associated with the DL CC1 is shown in the DL/UL link information of a cell. A cell2 is configured by only a DL CC2 and does not include a UL CC. It is shown as the DL/UL link information of a cell that a UL CC is not configured. A cell3 is configured by only a UL CC3 and does not include a DL CC.

Figure 44:
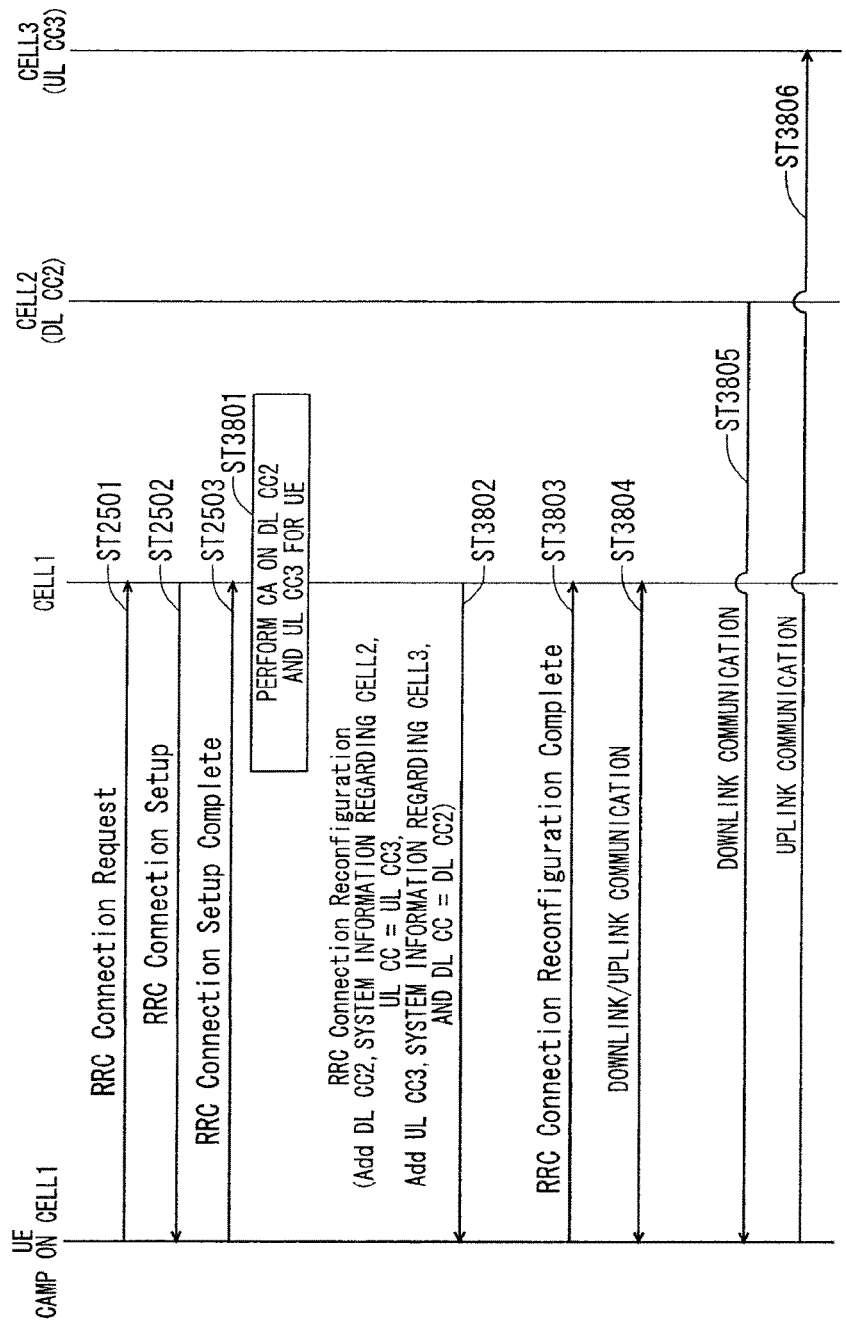
FIG. 44 is a diagram showing an example of a sequence of CA in a case where a cell in which a DL CC is not configured is used.

FIG. 44 is a diagram showing an example of a sequence of CA in a case where a cell in which a DL CC is not configured is used. FIG. 44 shows a case in which a UE camps on the cell. The sequence shown in FIG. 44 is similar to the sequence of FIG. 29, and the same steps are denoted by the same reference symbols and the common description is not given here.

In the present embodiment, the process of Step ST3801 is performed after the UE notifies the cell1 of an RRC connection setup complete message in Step ST2503. In Step ST3801, the eNB or cell1 determines to perform CA on the DL CC2 and the UL CC3 for the UE. The eNB or cell1 associates the DL CC2 and the UL CC3 with each other and sets those.

In Step ST3802, the cell1 notifies the UE of an RRC connection reconfiguration message for CA. The RRC connection reconfiguration message contains the information of the cell2 being a serving cell on which CA is performed and the information of the cell3 being a serving cell on which CA is performed. Included as the information of the cell2 are, for example, the information indicating the addition of the DL CC2, the system information regarding the cell2, and the information indicating that the UL CC3 is set as a corresponding UL CC. Included as the information of the cell3 are, for example, the information indicating the addition of the UL CC3, the system information regarding the cell3, and the information indicating that the DL CC2 is set as a corresponding DL CC.

The UE that has received the RRC connection reconfiguration message prepares for the CA process on the cell1, the DL CC2, and the UL CC3 and, in Step ST3803, notifies the cell1 of an RRC connection reconfiguration complete message.

The cell1 or eNB that has received the RRC connection reconfiguration complete message performs CA on the DL CC2 and the UL CC3, in addition to the cell1. The cell1 serves as PCell.

In Step ST3804, downlink communication and uplink communication are performed between the UE and the cell1. In Step ST3805, downlink communication is performed between the UE and the DL CC2. In Step ST3806, uplink communication is performed between the UE and the UL CC3.

The downlink communication and uplink communication of Step ST3804 are performed using the DL CC1 and the UL CC1. The UE transmits the uplink control information for downlink data of the DL CC2, for example, the CQI for downlink data, Ack/Nack for downlink data, and the like, using the cell1 in which a UL CC is configured, or UL CC3.

The control information for uplink data of the UL CC3, for example, the resource scheduling information and the like are transmitted using the DL CC2 or the DL CC1 of the cell1.

The above-mentioned method enables CA also in a case where a cell including only a UL CC without a DL CC to be associated with the UL CC, which has been disclosed in the present embodiment, is configured. This allows communication with the UE using that cell. Accordingly, in a case where there is space only in the frequency resource for uplink, more flexible use of frequency resources, such as the use of the present embodiment, is allowed, which more increases the use efficiency of frequency resources.

Fifth Embodiment

The present embodiment discloses the configuration of a frequency band for allowing more efficient use of frequency resources. In the present embodiment, a frequency band configured by one or more resources for UL without a resource for DL to be associated therewith is provided.

Figures 45, 46:
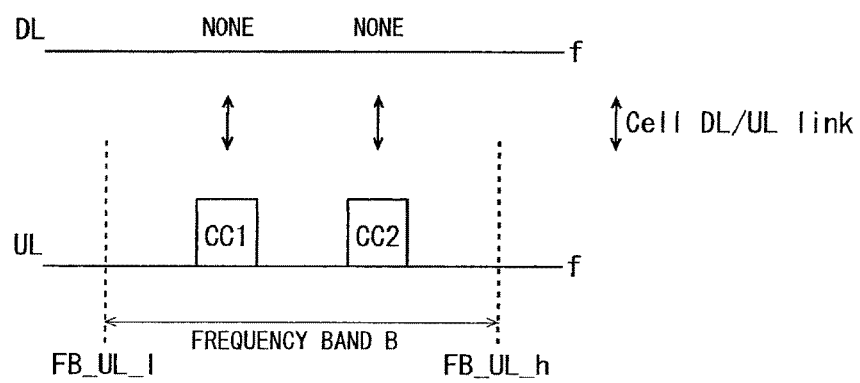
FIG. 45 is a diagram showing the concept of a frequency band configured by one or more resources for UL without resources for DL to be associated therewith.
FIG. 46 is a diagram showing a setting example of a frequency band configured by one or more resources for UL without a resource for DL to be associated therewith.

FIG. 45 is a diagram showing the concept of a frequency band configured by one or more resources for UL without a resource for DL to be associated therewith. The UL CC1 and the UL CC2 are configured in the frequency band for uplink B as resources for UL. The lower cut-off frequency ($F_{UL\_low}$) and upper limited frequency ($F_{UL\_high}$) of the frequency band for uplink B are FB_UL_1 and FB_UL_h, respectively. There is no configuration of the DL CC being a resource for DL to be associated with the UL CC1. Similarly, there is no configuration of the DL CC being a resource for DL to be associated with the UL CC2.

The frequency band for uplink B is configured by one or more resources for UL without a resource for DL to be associated therewith. In other words, one or more resources for UL without a resource for DL are configured in the frequency band for uplink B. The one or more resources for UL are the UL CC1 and UL CC2 in this case. In this manner, the frequency band for uplink B includes a resource for UL but does not include a resource for DL.

The resources for UL may be contiguous or non-contiguous, or may have different bandwidths. There is no resource for DL, which means that a frequency band for downlink corresponding to a frequency band for uplink is not required. This enables to configure a frequency band for uplink in which a frequency band for downlink to be paired therewith is not configured.

FIG. 46 is a diagram showing a setting example of a frequency band configured by one or more resources for UL without a resource for DL to be associated therewith. There exists a frequency band for uplink (UL operating band) as the frequency band B, and the lower cut-off frequency ($F_{UL\_low}$) and upper limited frequency ($F_{UL\_high}$) thereof are set as FB_UL_1 and FB_UL_h, respectively. There is no frequency band for downlink (DL operating band). In this manner, only the frequency band for uplink is set as a frequency band and a frequency band for downlink is not set. This is effective in a case where the configuration of the frequency band is predetermined.

Through the above, only a frequency band for uplink is required as an actual frequency resource. This eliminates the need to allocate a frequency band for downlink as an actual frequency resource and reserve the frequency band for downlink, though there is no use of the frequency band for downlink. Therefore, also in a case where, for example, there is one narrow-band frequency resource, it is possible to configure a frequency band for uplink only. This allows efficient use of frequency resources in a case where there are discrete and narrow-band frequency resources.

The methods disclosed in the first embodiment to the fifth embodiment may be appropriately combined with each other. Accordingly, also in a case where there are discrete and narrow-band frequency resources, the use efficiency of frequency resources can be increased.

The present invention is also applicable to a system (hereinafter, referred to as "downlink communication service system" in some cases) that provides services in which only downlink communication is performed, such as ETWS, CMAS, and multimedia broadcast multicast services (MBMS). The downlink communication service system may be supported in a resource for DL in which a corresponding resource for UL is not configured. This allows a UE having the capability corresponding to a downlink communication service system to provide a downlink communication service using the resource for DL.

The frequency band for downlink that is configured by a resource for DL and does not include a resource for UL may be provided for a downlink communication service system. This allows a UE, which supports a frequency band for downlink for a downlink communication service system and has the capability corresponding to a downlink communication service system, to provide a downlink communication service using the resource for DL in the frequency band for downlink. Accordingly, the use efficiency of frequency resources can be improved.

The methods disclosed in the present invention are applicable not only to eNBs/NBs, but also to so-called local nodes such as HeNB, HNB, pico eNB (LTE pico cell (EUTRAN pico cell)), pico NB (WCDMA pico cell (UTRAN pico cell)), node for hotzone cells, relay node, and remote radio head (RRH). The present invention is also applicable to cases in which a carrier frequency differs and a frequency band differs per, for example, node type. This enables to improve the use efficiency of frequency resources.

While each embodiment has mainly described the LTE-A system, the communication system of the present invention is also applicable to another communication system.

For example, only a frequency band for downlink is allocated in a broadcast system. The use of the present invention enables to use the frequency band for a broadcast system for a communication system, whereby the both systems can be used mutually. The present invention may be applied to so-called white space. This enables to improve the use efficiency of frequency resources. The white space is described in Non-Patent Document 12 below.

Non-Patent Document 12: Radio Policy Division, Ministry of Internal Affairs and Communications, "Efforts to realize the use of white space", 21st Meeting papers of broadcast system Committee, [online] Oct. 29, 2010, Information and Communications Technology Sub-Council, Information and Communications Council, retrieved Dec. 9, 2010 from http://www.soumu.go.jp/main_content/000087579.pdf While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS

71 user equipment device (UE), 72 base station device, 72-1 eNB, 72-2 Home-eNB, 73 MME/S-GW unit (MME unit), 74 HeNBGW, CC component carrier, DL downlink, UL uplink.

The invention claimed is:

1. A communication system comprising a base station and a communication terminal device that performs radio communication with the base station, wherein
  the base station configures a primary cell (PCell) using an associated cell including both a resource for downlink and a resource for uplink, the resource for downlink being allocated to downlink communication to the communication terminal device, the resource for uplink being allocated to uplink communication from the communication terminal device,
  the base station configures a secondary cell (SCell) using a non-associated cell including only another resource for downlink, the other resource for downlink being allocated to downlink communication to the communication terminal device, and
  the communication terminal device performs carrier aggregation with the PCell and the SCell.

2. A base station performing radio communication with a communication terminal device, wherein
  the base station configures a primary cell (PCell) using an associated cell including both a resource for downlink and a resource for uplink, the resource for downlink being allocated to downlink communication to the communication terminal device, the resource for uplink being allocated to uplink communication from the communication terminal device, and
  the base station configures a secondary cell (SCell) using a non-associated cell including only another resource for downlink, the another resource for downlink being allocated to downlink communication to the communication terminal device.

3. A communication terminal device performing radio communication with a base station wherein
  the communication terminal device performs carrier aggregation with a primary cell (PCell) and a secondary cell (SCell), the PCell is configured using an associated cell including both a resource for downlink and a resource for uplink, the resource for downlink being allocated to downlink communication from the base station, the resource for uplink being allocated to uplink communication to the base station, the SCell is configured using a non-associated cell including only another resource for downlink, the another resource for downlink being allocated to downlink communication from the base station.

* * * * *